(12) United States Patent
Nogawa et al.

(10) Patent No.: US 7,769,837 B2
(45) Date of Patent: Aug. 3, 2010

(54) WIRELESS LAN SETTING SYSTEM AND COMMUNICATION TERMINAL

(75) Inventors: Hideki Nogawa, Nagoya (JP); Sunao Kawai, Toyoake (JP); Takao Seki, Nagoya (JP); Takeshi Izaki, Nagoya (JP); Atsushi Kojima, Kasugai (JP); Masaaki Hibino, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1343 days.

(21) Appl. No.: 11/007,537

(22) Filed: Dec. 9, 2004

(65) Prior Publication Data

US 2005/0148326 A1 Jul. 7, 2005

(30) Foreign Application Priority Data

Dec. 12, 2003 (JP) ............................. 2003-415456
Dec. 12, 2003 (JP) ............................. 2003-415457
Dec. 12, 2003 (JP) ............................. 2003-415521

(51) Int. Cl.
*G06F 15/177* (2006.01)
*G06F 15/16* (2006.01)
*H04W 4/00* (2009.01)

(52) U.S. Cl. ........................ 709/222; 709/228; 370/338

(58) Field of Classification Search ........................ None
See application file for complete search history.

(56) References Cited

U.S. PATENT DOCUMENTS

| 7,072,326 | B2 * | 7/2006 | Wong et al. ................. 370/343 |
| 7,363,358 | B2 * | 4/2008 | Sullivan ..................... 709/222 |
| 7,451,222 | B2 * | 11/2008 | Sullivan ..................... 709/227 |
| 2002/0118664 | A1 | 8/2002 | Ishibashi et al. |
| 2003/0091015 | A1 | 5/2003 | Gassho et al. |
| 2003/0100335 | A1 * | 5/2003 | Gassho et al. ................. 455/552 |
| 2003/0115339 | A1 | 6/2003 | Hodoshima |
| 2003/0169728 | A1 | 9/2003 | Choi |

(Continued)

FOREIGN PATENT DOCUMENTS

EP 1 307 003 A2 5/2003

(Continued)

OTHER PUBLICATIONS

Sep. 8, 2009 Office Action issued in Japanese Patent Application No. 2007-061902 (with translation).

(Continued)

*Primary Examiner*—Wen-Tai Lin
(74) *Attorney, Agent, or Firm*—Oliff & Berridge, PLC

(57) ABSTRACT

A computer program product for a wireless LAN system is configured such that connection settings necessary for a first communication terminal to connect with a wireless access point are made in accordance with an instruction from a second communication terminal, the second communication terminal being capable of performing data communication with the first communication terminal, the computer program product comprising computer readable instructions that cause a computer to function as the second communication terminal, the instructions defining procedures of determining, with performing data communication with the first communication terminal, whether the first communication terminal is capable of realizing a predetermined process regarding the connection settings by itself, and instructing the first communication terminal by sending the instruction for the connection settings to the first communication terminal in accordance with a result of determination made by the determining procedure.

27 Claims, 49 Drawing Sheets

U.S. PATENT DOCUMENTS

| | | |
|---|---|---|
| 2003/0217126 A1* | 11/2003 | Polcha et al. ............... 709/220 |
| 2004/0003060 A1 | 1/2004 | Asoh et al. |
| 2004/0006648 A9* | 1/2004 | Kita et al. .................. 709/250 |
| 2004/0015575 A1* | 1/2004 | Motoyama ................. 709/222 |
| 2004/0103204 A1* | 5/2004 | Yegin ........................ 709/229 |
| 2005/0066072 A1 | 3/2005 | Nakamura |
| 2005/0147073 A1* | 7/2005 | Hietalahti et al. ........... 370/338 |
| 2005/0188067 A1 | 8/2005 | Kawashima |

FOREIGN PATENT DOCUMENTS

| | | |
|---|---|---|
| EP | 1 309 127 A1 | 5/2003 |
| JP | A 11-327830 | 11/1999 |
| JP | A 2001-014234 | 1/2001 |
| JP | A 2002-252620 | 9/2002 |
| JP | A 2002-351766 | 12/2002 |
| JP | A 2003-091467 | 3/2003 |
| JP | A 2003-143156 | 5/2003 |
| JP | A 2003-163668 | 6/2003 |
| JP | A 2003-204335 | 7/2003 |
| JP | A 2003-218730 | 7/2003 |
| JP | A-2003-256301 | 9/2003 |
| JP | A 2003-316676 | 11/2003 |
| JP | A 2003-333054 | 11/2003 |
| JP | A-2003-345687 | 12/2003 |
| JP | A 2005-115926 | 4/2005 |

OTHER PUBLICATIONS

Japanese Office Action issued in Japanese Application No. 2007-061905, dated Feb. 9, 2010 with English Translation.

* cited by examiner

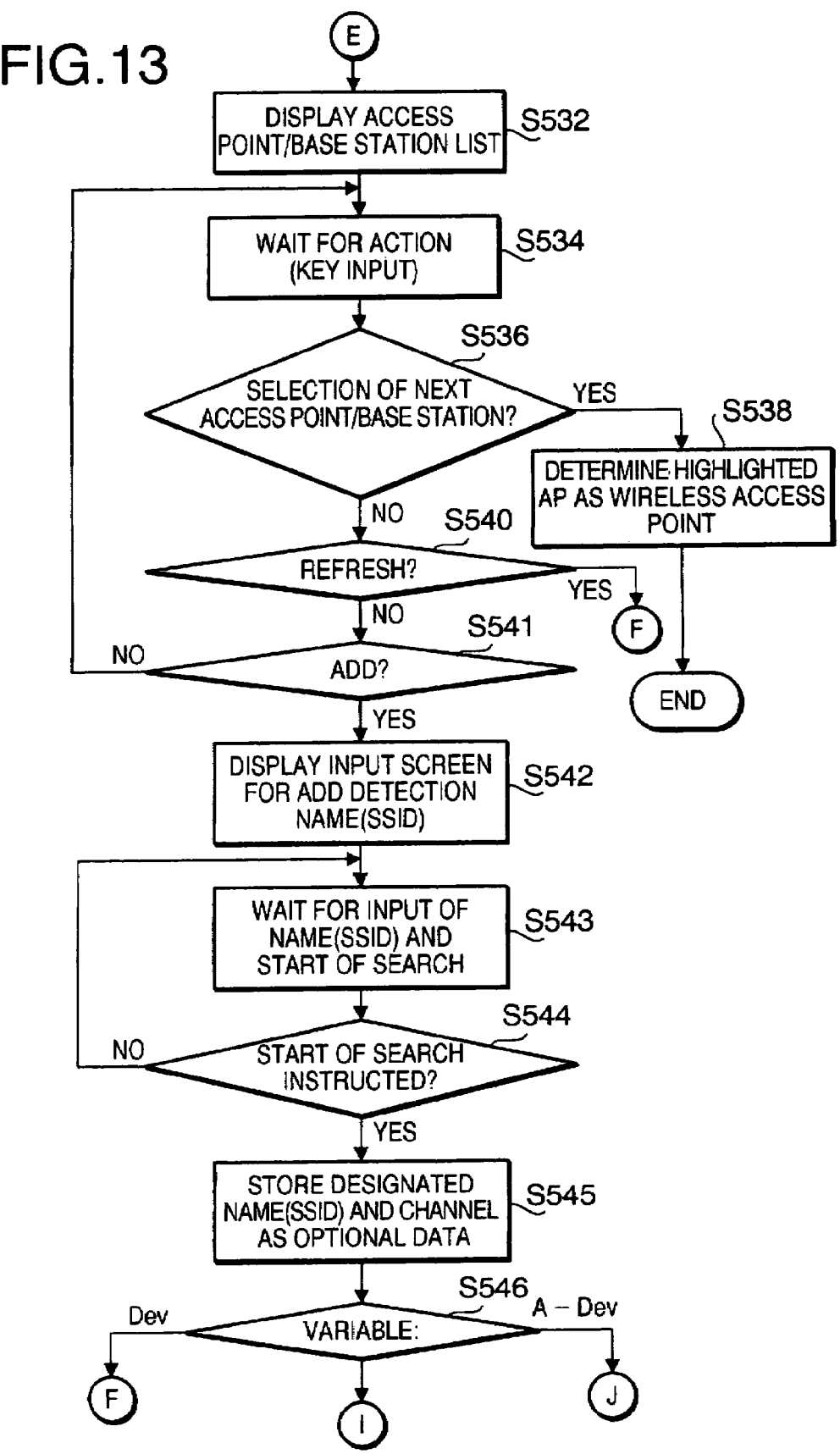

WIRELESS LAN SETTING SYSTEM AND COMMUNICATION TERMINAL

BACKGROUND OF THE INVENTION

The present invention realties to a wireless LAN setting system in which a connection setting of a target communication terminal with respect to a wireless access point is made in accordance with instructions by another communication terminal capable of executing data communication with the target communication terminal.

Nowadays, the so-called wireless LANs realizing data communication among a plurality of wireless stations (communication terminals) or data communication between a wireless station and an external network by use of radio waves, have become widespread.

In the wireless LANs, various communication methods, such as "infrastructure mode" in which each wireless station carries out radio communication (wireless communication) via a repeater station and "ad-hoc mode" in which the communication terminals functioning as wireless stations directly communicate with each other by radio, are employed. Each wireless station, configured to be able to switch its communication method depending on the purpose, is generally used in the "infrastructure mode".

In a network employing the "infrastructure mode", the communication terminal can access a wireless access point after various settings have been completed. The settings to be made include, for example, settings of a wireless LAN standard (e.g., IEEE802.11-b, -a or -g), a frequency range (i.e., a so-called channel) for the wireless connection, SSID (Service Set IDentifier) or ESSID (Extended SSID), and a WEP (Wired Equivalent Privacy).

The above various settings of each communication terminal would be completed easily if the communication terminal has a user interface of high operability like that of a personal computer (hereinafter abbreviated as "PC").

However, with communication terminals equipped with a user interface which is less operability than that of a PC (e.g. printers providing services via a network), adjustment of the settings through the user interface becomes an extremely complex and troublesome task.

To avoid the problem, there exist some communication terminals configured to support "remote setup". For example, the communication method of the communication terminal (a target communication terminal) is changed to the "ad-hoc mode" together with another communication terminal, and the settings of the target communication terminal are made indirectly from the other communication terminal (remote setup) by exchanging data regarding the settings between the communication terminals. Another exemplary method is that the target communication terminal is directly connected to a PC and the settings of the target communication terminal are made indirectly from the PC by exchanging data regarding the settings between the communication terminal and the PC.

An example of such a technique is suggested in Japanese Patent Provisional Publication No. P2003-143156A. According to the publication, a communication device (network device) such as a printer functioning as a wireless station is configured to function as a wireless access point (relay station), and an independent wireless network is established by the function (relay function unit). From another communication terminal (wireless station) connected to the target communication terminal via the wireless network, settings necessary for establishing connection with another wireless network using its wireless station function (terminal function unit) are adjusted indirectly (i.e., the remote setup is done), and thereafter, the function the wireless access point is stopped. By such a technique, the time and trouble necessary for the adjustment of various settings can be reduced for communication terminals that are not equipped with a user interface of high operability.

According to the method described above, most of the processes regarding the settings that enable the target communication terminal to connect with the wireless access point are performed via the other communication terminal. If the target communication terminal has a function of executing processes regarding the settings such as a process of obtaining (or detecting) a parameter (e.g., SSID) necessary for the setting operation from wireless access points around the target communication terminal as suggested in Japanese Patent Provisional Publication P2003-204335A, it is preferable that the process is shared by the target communication terminal. In such a case, a burden to the setting communication terminal can be reduced.

In order to have the target communication terminal execute a part of the process for the settings, the communication terminal on the setting side may issue instructions, which are to be transmitted to the target terminal.

However, if the target communication terminal does not have a capability, the part of the setting procedure would remain unexecuted. In the worst case, both the target communication device and the setting communication device are stopped since no process is performed in the target communication device, and the communication between the target communication device and the setting communication device is terminated.

Further, according to second publication (i.e., P2003-204335A), a communication terminal receives a beacon signal which is periodically transmitted from each of the wireless access points around the device, and obtains the necessary parameters from the received beacon signal.

With this technology, it becomes possible to display the received parameters corresponding to the wireless access points as a list, and allow the user to select a desired one from the list and the parameters displayed on the list are automatically set. In such a configuration, the operability is greatly improved since troublesome setting operation can be simplified.

In such a case, however, when a part of the parameters (e.g., SSID) is not contained in the beacon signal, the remaining parameters are displayed. When such an access point is selected, since a part of the parameters are missing, the connection setting cannot be completed automatically. That is, if such an access point is included in the list, the user needs to perform the selecting operation again to select another access point since the setting based on the incomplete set of parameters will not work. Such a condition is not preferable in view of the operability.

In particular, an administrator of the access point may intentionally exclude the SSDI in the beacon signal, in view of security, so that the existence of the wireless access point is closed to the public but is open only to a limited users. In such a case, even the remaining parameters should not be displayed.

Conventionally, a so-called wizard which is interactive software used for performing the settings as above has been known. An example of such technology is taught in Japanese Patent Provisional Publication No. HEI 11-327830. The software in this publication is for setting a printer and printer driver. By use of such software, the user can complete the setting simply by inputting data in response to a sequentially displayed plurality of pieces of guidance one by one.

Incidentally, a PC provided with a plurality of I/F (interface) units for the wireless communication is conventionally know. An example of such a PC is disclosed in Japanese Patent Provisional Publication No. P2003-91467. According to this publication, a user of the PC can select a desired one of the I/F units. When one I/F unit is selected, an SSID is obtained using the selected I/F unit. Then, based on the SSID, predetermined setting information is extracted from among a plurality of sets setting information. In accordance with the thus selected information, the setting of the wireless connection is made.

Incidentally, when the settings of a network device are made using the operation of the PC, as disclosed in the JP publication P2003-143156, if the user intends to use the PC having the I/F unit as disclose din the JP publication P2003-91467, an appropriate I/F unit should be selected from among a plurality of I/F units.

It is, however, troublesome to select an appropriate one of the plurality of I/F units. Further, if a wrong I/F unit is selected, remaining operation of the setting procedure may not be performed or the setting operation man not be completed correctly.

SUMMARY OF THE INVENTION

The present invention is advantageous in that the above-described deficiency of the conventional wireless LAN system can be resolved.

According to an aspect of the invention, there is provided a computer program product for a wireless LAN system which is configured such that connection settings necessary for a first communication terminal to connect with a wireless access point are made in accordance with an instruction from a second communication terminal, the second communication terminal being capable of performing data communication with the first communication terminal, the computer program product comprising computer readable instructions that cause a computer to function as the second communication terminal, the instructions defining procedures of determining, with performing data communication with the first communication terminal, whether the first communication terminal is capable of realizing a predetermined process regarding the connection settings by itself, and instructing the first communication terminal by sending the instruction for the connection settings to the first communication terminal in accordance with a result of determination made by the determining procedure.

Optionally, the determining procedure may include judging whether the first communication terminal has an acquiring function that obtains setting items for the connection settings from wireless access points located around the first communication terminal.

In this case, the instruction procedure may include a first parameter requesting procedure that requests, when the first communication terminal is determined to have the acquiring function, for parameter groups obtained by the first communication terminal with the acquiring function, a first parameter selecting procedure that allows a user to select one parameter group of one or more parameter groups transmitted from the first communication terminal in response to the request in the first parameter requesting procedure, and a first change instructing procedure that instructing the first communication terminal to change the connection settings thereof to values represented by the parameter group selected in the first parameter selecting procedure.

Optionally, the instructing procedure may includes an acquisition instruction procedure that instructs the first communication terminal to obtain the parameter groups with the acquiring function, and wherein the first parameter requesting procedure request the first communication terminal for the parameter groups obtained from the wireless access points by the first communication terminal in response to the instruction by the acquisition instruction procedure.

Further, the first parameter selecting procedure may allow the user to one of parameters constituting the parameter group.

Further optionally, the computer program product may further include a notifying/confirming procedure that notifies the user of the progress of the connection settings by displaying images one by one with interrupting execution of the connection settings and allowing the user to perform a confirming operation, the connection settings being continued upon the confirming operation of the user. The notifying/confirming procedure may display a notifying screen allowing the user to select one parameter group among one or more parameter groups, in the first parameter selecting procedure, on a display of the second communication terminal.

Still optionally, the instructing procedure may include a parameter inputting procedure that allows the user to input a parameter group representing the setting items for the connection settings and corresponding to a specific access point when the determining procedure determines that the first communication terminal dose not have the acquiring function, and a change instructing procedure that instructs the first communication terminal to change the setting items for the connection settings to the values represented by the parameter group input in the parameter inputting procedure.

Alternatively, when the second communication terminal has an acquiring function to obtain parameter groups representing setting items for the connection settings from wireless access points around the second communication terminal, the instructing procedure may includes a parameter obtaining procedure in which the second communication terminal obtains the parameter groups with the acquiring function thereof when the determining procedure determines that the first communication terminal does not have the acquiring function, a second parameter selecting procedure in which the user is allowed to select one of the parameter groups in accordance with the parameter groups obtained in the parameter obtaining procedure, and a second change instructing procedure that instructs the first communication terminal to change the setting items for the connection settings to the values represented by the parameter group selected in the second parameter selecting procedure.

In this case, the user may be allowed to select one of the parameters of respective parameter groups in the second parameter selecting procedure.

Optionally, the computer program product may further include a notifying/confirming procedure that notifies the user of the progress of the connection settings by displaying images one by one with interrupting execution of the connection settings and allowing the user to perform a confirming operation, the connection settings being continued upon the confirming operation of the user. The notifying/confirming procedure may display a notifying screen allowing the user to select one parameter group among one or more parameter groups, in the second parameter selecting procedure, on a display of the second communication terminal.

Further optionally, the instructing procedure may include an acquisition requesting procedure that request a third communication terminal which is capable of performing a data communication with the second communication terminal and has the acquisition function to obtain the parameter groups with its acquisition function when the determining procedure determines that the first communication terminal dose not have the acquiring function, a second parameter requesting procedure that requests the third communication terminal for the parameter groups obtained in response to the request in the acquisition requesting procedure, and a third change instructing procedure that instructs the first communication terminal to change the setting items for the connection settings to the values represented by the parameter group transmitted from the third communication terminal in response to the request by the second parameter requesting procedure.

In a particular case, the user may be allowed to select one of the parameters of respective parameter groups in the third parameter selecting procedure.

Still optionally, the instructing procedure may include an inquiry transmitting procedure that transmits an inquiry data to devices around the second communication terminal to inquire whether there are communication terminals that has the acquiring function and is capable of performing a data communication with the second communication terminal, and the requesting procedure may determine a communication terminal transmitting reply data notifying that the terminal has the acquiring function in response to the inquiry data as the third communication terminal, and requests the third communication terminal to obtain the parameter groups.

In this case, the instructing procedure may include a terminal selecting procedure that allows the user to select one of the communication terminals which transmit the reply data in response to the inquiry data, and the acquisition requesting procedure may determine the selected one of the communication terminals as the third communication terminal and requests the third communication terminal to obtain the parameter groups.

Furthermore optionally, the third communication terminal which can perform data communication with the second communication terminal, may be configured to transmit the reply data in accordance with a predetermined communication standard, and the acquisition requesting procedure may transmit the inquiry data to the third communication terminal in accordance with the predetermined communication standard, and receives the reply data which is transmitted from the third communication terminal in response to the inquiry data.

Also in this case, the computer program product may further include a notifying/confirming procedure that notifies the user of the progress of the connection settings by displaying images one by one with interrupting execution of the connection settings and allowing the user to perform a confirming operation, the connection settings being continued upon the confirming operation of the user, and the notifying/confirming procedure may display a notifying screen allowing the user to select one parameter group among one or more parameter groups on a display of the second communication terminal.

Optionally, the determining procedure may inquire communication terminals whether the acquisition function is available and determines the communication terminal which replies in response to the inquiry as the communication terminal having the acquiring function.

In this case, the data communication between the second communication terminal and the first communication terminal when the determining procedure makes a determination may be performed in accordance with a predetermined communication standard, and determining procedure may request the first communication terminal for a function data representing whether the fist communication terminal has the acquiring function in accordance with the predetermined communication standard, the determining procedure determining that the first communication terminal that transmits the function data in response to the request has the acquiring function.

Optionally, the communication terminal capable of performing the data communication with the second communication terminal may receive the parameter groups obtained by the acquiring function in accordance with a predetermined communication standard, and the parameter requesting procedure may include a parameter requesting procedure that request the communication terminal for the parameter group in accordance with the predetermined communication standard, the parameter requesting procedure obtaining the parameter group transmitted from the communication terminal in response to the request.

Still optionally, the parameter requesting procedure may be configured to request for the parameter group again if information indicating that the acquisition of the parameter group in response to a previously made request by the parameter requesting procedure has not been done.

Further optionally, the computer program product may further includes a notifying/confirming procedure that notifies the user of the progress of the connection settings by displaying images one by one with interrupting execution of the connection settings and allowing the user to perform a confirming operation, the connection settings being continued upon the confirming operation of the user, and the notifying/confirming procedure may display a notifying screen allowing the user to select one parameter group among one or more parameter groups on a display of the second communication terminal.

According to another aspect of the invention, there is provided a computer program product for a wireless LAN system which is configured such that connection settings necessary for a first communication terminal to connect with a wireless access point are made in accordance with an instruction from a second communication terminal, the second communication terminal being capable of performing data communication with the first communication terminal, the computer program product comprising computer readable instructions that cause a computer to function as the first communication terminal. The instructions may define a parameter obtaining procedure that obtains a parameter group with an acquiring function to obtain parameter group indicative, of setting items for the connection settings when it receives the instruction to obtain the parameter group from the second communication terminal, a parameter transmitting procedure that transmits a parameter group obtained in the parameter obtaining procedure to the second communication terminal when the first communication terminal receives a request for the parameter group from the second communication terminal, and a setting changing procedure that changes setting items for the connection settings when it receives an instruction from the second terminal to change the setting items for the connection settings in response to the instruction.

Optionally, the instructions may further define a function data returning procedure that returns, when a request for function data representing that the first communication has the acquiring function is received from the second communication terminal in accordance with a predetermined communication standard, to the second communication terminal in accordance with the predetermined communication terminal.

Further, when the first communication terminal receives a request for the parameter group from the second communication terminal, the parameter transmitting procedure may transmit the parameter group which is obtained in the parameter obtaining procedure to the second communication terminal in accordance with the predetermined communication standard.

Still optionally, when the first communication terminal receives a request for the parameter group from the second communication terminal and the parameter group has not been obtained in the parameter obtaining procedure, information indicating that the parameter group has not been obtained may be transmitted to the second communication terminal in response to the request.

According to a further aspect of the invention, there is provided a computer program product comprising computer readable instructions that cause a communication terminal to perform a wireless LAN setting, wherein, when inquiry data inquiring whether the communication terminal has an acquiring function that obtains parameter groups representing setting items for connection setting with wireless access points around the communication terminal from the wireless access points is received from another communication terminal with which data communication can be performed, and if the communication terminal has the acquiring function, the communication terminal executes a first replying procedure in which reply data indicating that the communication terminal has the acquiring function is returned.

If the communication terminal does not have the acquiring function, the communication terminal may execute a non-replying procedure in which the communication terminal does not reply to the inquiry data.

Optionally, when the inquiry is transmitted in accordance with a predetermined communication standard, the second replying procedure may return the reply data in accordance with the predetermined communication standard.

According to a furthermore aspect of the invention, there is provided a computer program product which has computer readable instructions that cause a communication terminal to perform a wireless LAN setting, wherein, when inquiry data inquiring whether the communication terminal has an acquiring function that obtains parameter groups representing setting items for connection setting with wireless access points around the communication terminal from the wireless access points is received from another communication terminal with which data communication can be performed, and if the communication terminal does not have the acquiring function, the communication terminal executes a second replying procedure in which reply data indicating that the communication terminal does not have the acquiring function is returned.

Optionally, when the inquiry is transmitted in accordance with a predetermined communication standard, the second replying procedure may return the reply data in accordance with the predetermined communication standard.

According to another aspect of the invention, there is provided a computer program product that includes computer readable instructions that cause a computer to function as a communication terminal which makes settings for a wireless LAN having a plurality of wireless communication terminals and a wireless access point relaying data communication among the communication terminals. The instructions may define a collecting procedure that collects, from the access point, parameter groups necessary to realize the relaying among the communication terminals, and a list displaying procedure that displays a list of the parameter groups collected by the collecting procedure. Further, the list displaying procedure may display the parameter groups each including a predetermined parameter used by the wireless access point for determining whether each communication terminal can communicate through the access point. Furthermore, the list displaying procedure does not displays the parameter groups which do not contain the predetermined parameter.

Optionally, the computer readable instructions may be executed by the communication terminal which can perform data communication with another communication through the access point.

Further optionally, the list displaying procedure may display, from among the parameter groups collected by the collecting procedure, ones each contains the predetermined parameter representing that the communication terminal corresponding thereto can perform the data communication through the access point.

Still optionally, the instructions further define an inputting procedure the allows a user to input at least a part of the parameter group, and a connection checking procedure that checks whether a wireless connection of the communication terminal with the access point in accordance with the parameter group can be realized. The list displaying procedure may display parameter groups each of which is determined, by the connection checking procedure, to realize the wireless connection with the access point.

In this case, the list displaying procedure may display the parameter groups collected by the collecting procedure together with the parameter groups determined to realize the wireless connection with the access point by the connection checking procedure.

Still optionally, the connection checking procedure may instruct an other communication terminal, which can perform a data communication with the communication terminal, to detect a wireless access point in accordance with the parameter group input by the inputting procedure around the other communication terminal, the connection checking procedure determining whether the wireless connection with the wireless access point can be realized based on a result of detection by the other communication terminal, the result being transmitted in response to the instruction.

In this case, the connection checking procedure may transmit a request the other communication terminal for the result of the detection and receives the result of detection that is returned in response to the request.

Further, when the connection checking procedure receives information representing that the detection has not been finished in response to the request, the connection checking procedure may resend the request for the detection result.

In a particular case, the instructions may further define a notifying/confirming procedure that notifies the user of the progress of the procedures by displaying images one by one with interrupting execution of the procedures, the notifying/confirming procedure including a user confirming procedure that allows the user to perform a confirming operation, the procedures being continued upon the confirming operation of the user. Further, the user confirming procedure including a process that displays a notifying screen allowing the user to input the at least part of the parameter group on a display of the communication terminal.

Optionally, the instructions further define a selecting procedure that allows a user to select a desired wireless access point with which the wireless communication is to be established in accordance with the parameter groups listed in the list displaying procedure, and a first setting procedure that executes a connection setting to establish the wireless connection with the selected wireless access point in accordance with the parameter group corresponding to the selected wireless access point selected by the selecting procedure.

In this case, the first setting procedure may instruct an other communication terminal, which can perform data communication with the communication terminal and functions as the wireless station, to make the connection setting in accordance with the parameter group corresponding to the selected wireless access point.

Further, the instructions may further define a notifying/confirming procedure that notifies the user of the progress of the procedures by displaying images one by one with interrupting execution of the procedures, the notifying/confirming procedure including a user confirming procedure that allows the user to perform a confirming operation, the procedures being continued upon the confirming operation of the user. Further, the user confirming procedure may include a process that displays a selection screen allowing the user to select a wireless access point.

Further, the instructions may further define an inputting procedure the allows a user to input at least a part of the parameter group, a connection checking procedure that checks whether a wireless connection of the communication terminal with the access point in accordance with the parameter group can be realized, and a second setting procedure that effects a connection setting realizing the wireless connection with the wireless access point in accordance with the parameter group which is determined, by the connection checking procedure, to enable the wireless connection with the access point.

In this case, the second setting procedure may instruct an other communication terminal, which can perform data communication with the communication terminal and functions as the wireless station, to make the connection setting in accordance with the parameter group.

Further optionally, the connection checking procedure may instruct an other communication terminal, which can perform a data communication with the communication terminal, to detect a wireless access point in accordance with the parameter group input by the inputting procedure around the other communication terminal, the connection checking procedure determining whether the wireless connection with the wireless access point can be realized based on a result of detection by the other communication terminal, the result being transmitted in response to the instruction.

Further, the connection checking procedure may transmit a request the other communication terminal for the result of the detection and receives the result of detection that is returned in response to the request.

In particular, when the connection checking procedure receives information representing that the detection has not been finished in response to the request, the connection checking procedure may resend the request for the detection result.

Also in this case, the instructions may further define a notifying/confirming procedure that notifies the user of the progress of the procedures by displaying images one by one with interrupting execution of the procedures, the notifying/confirming procedure including a user confirming procedure that allows the user to perform a confirming operation, the procedures being continued upon the confirming operation of the user. The user confirming procedure may include a process that displays a notifying screen allowing the user to input the at least part of the parameter group on a display of the communication terminal.

Further optionally, the collecting procedure may request an other communication terminal, which can perform a data communication with the communication terminal, to obtain the parameter groups from wireless access points located around the other communication terminal, the collecting procedure collecting the parameter groups transmitted from the other communication terminal in response to the request for the parameter groups.

Furthermore, the collecting device may send a request, in accordance with a predetermined communication standard, to the other communication terminal to obtain the parameter groups, and the collecting device may send a request for the obtained parameter groups, in accordance with the predetermined communication standard, to the other communication terminal.

Optionally, the instructions may further define a notifying/confirming procedure that notifies the user of the progress of the procedures by displaying images one by one with interrupting execution of the procedures, the notifying/confirming procedure including a user confirming procedure that allows the user to perform a confirming operation, the procedures being continued upon the confirming operation of the user.

According to a further aspect of the invention, there is provided a computer program product having computer readable instructions that cause a computer to function as a communication terminal which makes settings for a wireless LAN, having a plurality of wireless communication terminals and a wireless access point relaying data communication among the communication terminals. The instructions defining a parameter obtaining procedure that obtains parameter group from the wireless access point located around the communication terminal in response to an instruction transmitted from an other communication terminal which can perform a data communication with the communication terminal, the parameter group being necessary for realizing a wireless communication between the wireless point and the other communication terminal, and a parameter transmitting procedure that transmits the parameter group obtained by the parameter obtaining procedure to the other communication terminal in response to a request for the parameter group transmitted from the other communication terminal.

Optionally, the parameter transmitting procedure may transmit other parameter groups for realizing a wireless communication between the communication terminal and the wireless access point, which are stored in a storage of the communication terminal, to the other communication terminal together with the parameter group obtained from the wireless access point.

Further optionally, when the request for the parameter group is received from the other communication terminal, if the parameter obtaining procedure has not obtained the parameter group, the parameter transmitting procedure may transmit information indicating that the parameter group has not been obtained to the other communication terminal.

Still optionally, the parameter transmitting procedure may transmit the obtained parameter group in accordance with a predetermined communication standard when the request for the parameter group is received from the other communication terminal.

Further, when a predetermined parameter of the obtained parameter group has not been obtained, the parameter transmitting procedure may transmit the parameter group as one with which the communication terminal cannot determine whether the wireless communication with the wireless access point can be established, when the request for the parameter group is received from the other communication terminal.

Furthermore, the instructions may further define a connection setting procedure that performs a connection setting in response to a request transmitted from the other communication terminal and requesting that the wireless connection with the wireless access point is established using a predetermined parameter.

According to a further aspect of the invention, there is provided a computer program product including computer readable instructions that cause a computer to function as a setting device which makes settings of a target network device of at least one network device on a wireless LAN, the setting device having a plurality of communication interfaces respectively connectable to different networks, the setting device is capable of communicating with the at least one network device, the setting device being capable of connecting with the at least one network device through one of the plurality of the communication interfaces, the settings of the target network device being done by transmitting setting data from the setting device to the target device. The instructions may define an examining procedure that examines whether the setting device can communicate with the target device using each of the plurality of communication interfaces, an interface identifying procedure that identifies an interface capable of communicating with the target device, and a transmitting procedure that transmits the setting data from the setting device to the target device through the identified interface.

Optionally, the examining procedure may include a reply request transmitting procedure that transmits a request for reply thereto to determine whether the target device is on a network using the plurality of interfaces, and a reply receiving procedure that receives the reply to the request transmitted by the reply request transmitting procedure. Further, the interface identifying procedure may include a judging procedure that determines whether a device transmitted the received reply is the target device based on information contained in the received reply, and an identifying procedure that identifies an interface that is used for transmitting the reply request and for receiving the reply to the rely request as the interface capable of communicating with the target device.

In a particular case, the target device may be an unconfigured device to which the settings have not been made.

Further, the information contained in the reply received in the examining procedure may include a flag indicating unconfigured sate which is set when the device returning the reply has not yet been configured, and the interface identifying procedure may determine a device as the unconfigured device when the flag contained in the reply received by the examining procedure indicates the unconfigured sate, the interface used for communicating with the unconfigured device is identified as the identified interface which can communicate with the unconfigured device.

Optionally, the information contained in the reply received by the examining procedure including a plurality of items, all the items having predetermined initial values when the device returned the reply is the unconfigured device, at least one of the plurality of items having a value other than the initial value when the device returned the reply is not the unconfigured device, and the interface identifying procedure determines a device as the unconfigured device when all the items of the information contained in the received reply have the initial values, the interface used for communicating with the unconfigured device is identified as the identified interface which can communicate with the unconfigured device.

In a particular case, the examining procedure may perform transmission of the reply request and reception of the reply to the reply request in accordance with a predetermined communication standard.

Still optionally, the examining procedure may include a reply request transmitting procedure that transmits a request for reply thereto to determine whether the target device is on a network using the plurality of interfaces, and a reply receiving procedure that receives the reply to the request transmitted by the reply request transmitting procedure. Further, the interface identifying procedure may include an identifying procedure that identifies an interface used for transmitting the reply request and receiving the reply to the reply request as the interface capable of communicating with the target device.

Further, the examining procedure may perform transmission of the reply request and reception of the reply to the reply request in accordance with a predetermined communication standard.

Still optionally, the instructions may further define a selection inputting procedure that allows a user to input a selection of one of the plurality of communication interfaces when a plurality of interfaces are detected as the interfaces capable of communicating with the target device, and an identification supporting procedure that identifies the selected one of the plurality of interfaces as the identified communication interface which is capable of communicating with the target device.

In this case, the selection inputting procedure may include a displaying procedure that displays, when a plurality of interfaces are detected as interfaces capable of communicating with the target device, an interface selection screen allowing a user to select one of the plurality of communication interfaces, and an accepting procedure that accepts input of the user through the interface selection screen.

Further optionally, the instructions may further define a notifying procedure that notifies, when a plurality of interfaces are detected as the interfaces capable of communicating with the target device, that erroneous detection should be avoided by turning off unnecessary interfaces.

Still optionally, the instructions may further define a setting data inputting procedure that displays a data input screen and allows a user to input the setting data using the data input screen. The transmitting procedure may include a procedure of transmitting the setting data input by the user through the data input screen fro the setting device to the target device, and the interface identifying procedure may include a procedure of identifying the communication interface capable of communication with the target device before the transmitting procedure is executed.

In a particular case, the communication interface identifying procedure may identify the communication interface capable of communicating with the target device before the setting data inputting procedure is executed.

Still optionally, the instructions may further define a target device information displaying procedure that displays a target device information displaying screen displaying the information regarding the target device to allow a user to confirm the target device information, the transmitting procedure may include a procedure of transmitting the setting data from the setting device to the target device after the target device information displaying procedure is executed, and the communication interface identifying procedure may include a procedure of identifying the communication interface capable of communicating with the target device before the target device information displaying procedure is executed.

According to another aspect of the invention, there is provided a computer program product comprising computer readable instructions that cause a computer to function as a target device included in a plurality of network devices on a wireless LAN, each of the plurality of network devices being connected with the wireless LAN via wireless access point, a connection setting of the target device being made as setting data is transmitted to the target device from an other network device which can perform wireless data communication with the target device. The instructions may define a judging procedure that determines whether the connection setting has been made to the target device when a request for reply inquiring whether the target device is an unconfigured device is received from the other network device and a reply transmitting procedure that transmits a reply to the reply request containing a flag indicating that the terminal device is the unconfigured device to the other network device when the judging procedure determines that the connection setting has been made to the target device.

According to a further aspect of the invention, there is provided a computer program product having computer readable instructions that cause a computer to function as a target device included in a plurality of network devices on a wireless LAN, each of the plurality of network devices being connected with the wireless LAN via wireless access point, a connection setting of the target device being made as setting data is transmitted to the target device from an other network device which can perform wireless data communication with the target device. The instructions may define a judging procedure that determines whether the connection setting has not been made to the target device when a request for reply inquiring whether the target device is an unconfigured device is received from the other network device, and a reply transmitting procedure that transmits a reply to the reply request to the other network device when the judging procedure determines that the connection setting has been made to the target device. The replay transmitting procedure may be configured not transmit a reply to the reply request to the other network device when the judging procedure determines that the connection setting has been made to the target device.

In a particular case, the reply transmitting procedure may perform transmission of the reply request in accordance with a predetermined communication standard.

According to a furthermore aspect of the invention, there is provided a computer program product having computer readable instructions that cause a second terminal on a wireless LAN to execute a connection setting of a first terminal of the wireless LAN, each of the first terminal and the second terminal being connectable with the wireless LAN via a wireless access point. The instructions define a first setting procedure that effects a connection setting of the second terminal so that the second terminal communicates with the first terminal via a wireless communication, a second setting procedure that sets a connection setting necessary for the first terminal to connect with a wireless access point of the wireless LAN via a data communication between the second terminal and the first terminal, and a setting restoring procedure that restores a connection setting of the second terminal to the setting before the first setting procedure is executed.

According to another aspect of the invention, there is provided a computer program product having computer readable instructions that cause a second terminal on a wireless LAN to execute a connection setting of a first terminal of the wireless LAN, each of the first terminal and the second terminal being connectable with the wireless LAN via a wireless access point. The instructions define a setting procedure that sets a connection setting of the first terminal so that the first terminal can connect with the access point of the wireless LAN by transmitting at least a part of a connection setting of the second terminal used to connect with the access point of the wireless LAN to the first terminal.

According to a further aspect of the invention, there is provided a computer program product having computer readable instructions that cause a second terminal to set a connection setting of a first terminal of the wireless LAN, the first terminal being connectable with the wireless LAN via a wireless access point. The instructions define an inputting procedure that inputs at least part of the connection setting of the first terminal which is necessary for the first terminal to connect with the wireless access point of the wireless LAN, a confirming procedure that confirms whether there exists a wireless access point to which the first terminal can connect using the connection setting, and an ad hoc setting procedure that sets a connection setting necessary for the first access point to connect with an ad hoc network using the connection setting via a data communication between the first terminal and the second terminal if the confirming procedure fails to confirm the existence of the wireless access point to which the first terminal can connect using the connection setting.

BRIEF DESCRIPTION OF THE ACCOMPANYING DRAWINGS

FIGS. 11-13 shows a flowchart illustrating a network determining procedure;

DETAILED DESCRIPTION OF THE EMBODIMENTS

Hereinafter, network configurations in which a plurality of network devices (hereinafter, occasionally referred to simply as devices) communicates with each other in accordance with a wireless LAN standard (e.g., IEEEE 802.11), according to embodiments of the invention will be described.

First Embodiment

Figure 1:
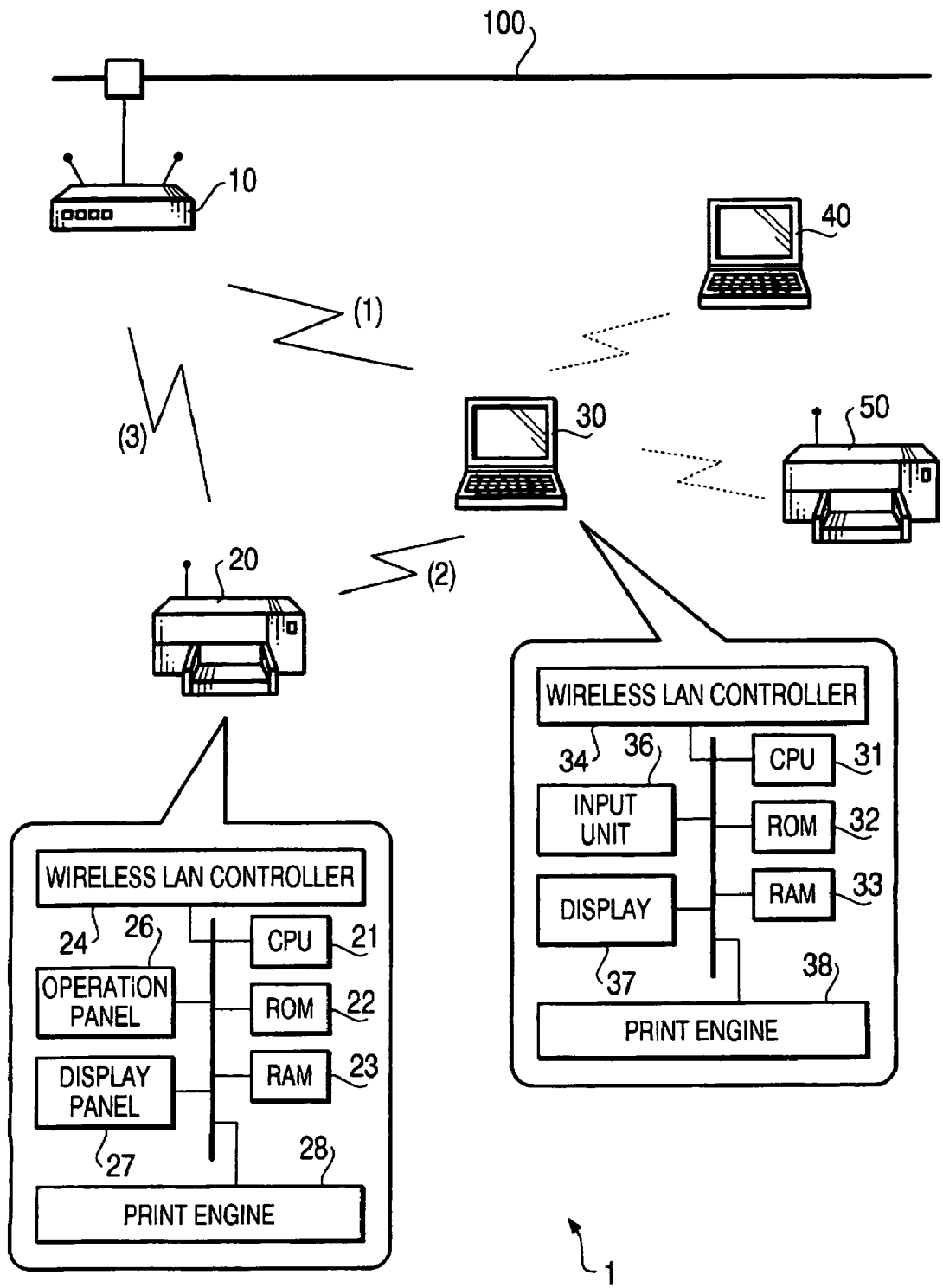
FIG. 1 shows a configuration of a network according to an embodiment of the present invention.

FIG. 1 shows a network configuration according to a first embodiment of the invention. The network configuration shown in FIG. 1 includes an access point 10, network printers (hereinafter, occasionally referred to simply as printer) 20 and 50, personal computers (PC) 30 and 40, which perform wireless communication with each other.

The access point 10 is a generally known wireless access point, which relays data communication between other devices (or external networks) connected therewith through the wireless stations and/or a cable 100. The wireless point 10 allows a wireless station that accesses the wireless point 10 using an SSID (Service Set IDentifier) which is the same SSID or ESSID (extended SSID) set to the wireless point 10 (i.e., stored in a not shown memory of the wireless point 10) to communicate as a wireless station.

When the access point 10 retains a parameter relating to security in its memory, the access point 10 executes the data communication with applying security measure in accordance with the parameter. Examples of parameters relating to the security are authentication method (e.g., common key method, WPA-PSK method, Wi-Fi Protected Access Pre-Shared Key, etc.), and encryption key for encrypting data to be transmitted in accordance with a certain encrypting method (e.g., WEP key: Wired Equivalent Privacy; TKIP key: Temporal Key Integrity Protocol, etc.).

The encryption key is stored together with a flag indicative of whether data communication is to be performed with encrypting the data. If the flag is set to "1" which indicates the encrypted communication, the access point 10 performs the data communication with the wireless station in an encrypted condition making use of the encryption key. If the flag is set to "0" which indicates that no encryption is made, the communication is performed without encryption.

It should be noted that, the access point 10 exchanges data with another device by the wireless or wired communication so that sittings of the access point 10 are indirectly made by the device (remote setup). After the remote setup, the parameters (i.e., SSID, the encryption key and the encryption flag) are generated and stored in the memory.

The printer 20 functions also as a wireless station. The printer 20 include CPU 21, ROM 22, RAM 23, wireless LAN controller 24, operation panel 26, display panel 27 and print engine 28.

The CPU 21 controls the entire operation of the printer 20 in accordance with the procedures stored in the ROM 22 with occasionally storing processing results in the RAM 23 and transmitting respective elements.

The ROM 22 is a non-volatile readable/writable memory. The ROM 22 has storage areas for the SSID to be used when the printer 20 performs the wireless communication, parameters related to the security in communication and parameters indicative of communication modes of the wireless communication.

In particular, among the parameters stored in the ROM 22, the SSID includes ones corresponding to the wireless communication modes. That is, the SSID includes a first SSID corresponding to the infrastructure mode, which is a mode where the printer 20 communicates with another wireless station via the wireless access point, and a second SSID corresponding to the ad-hoc mode, which is a mode where the printer 20 directly communicate with another wireless station.

The parameter indicative of the communication mode indicates whether the printer 20 itself communicates in the infrastructure mode or the ad-hoc mode.

The wireless LAN controller 24 is an interface that realizes the wireless communication in accordance with a wireless LAN standard in accordance with the parameters stored in the ROM 22. When the parameter indicative of the communication mode represents the infrastructure mode, the printer 20 (CPU 21) utilizes the first SSID from among the SSID stored in the ROM 22, while if the parameter represents the ad-hoc mode, the printer 20 (CPU 21) utilizes the second SSID in the ROM 22. By establishing the connection with the wireless access point or the wireless station, in accordance with the mode represented by the parameter indicative of the communication mode, via the wireless LAN controller 24, the communicating function as the wireless station is realized.

In the above case, if the parameters related to the security are stored in the ROM 22, the communication is performed with the security measure being applied. Examples of the parameters related to the security may include the encryption key to executes the communication with the encrypted condition. The encryption key is, similarly in the access point 10, stored together with the encryption flag. If the encryption key is stored together with the encryption flag indicating the encrypted communication, the printer 20 (CPU 21) performs the communication with the encrypted manner in accordance with the encryption key. If the encryption key is stored with the encryption flag which indicates the non-encrypted communication, the printer 20 (CPU 21) performs the communication without encryption.

According to the first embodiment, one example will be described, in which initially stored parameters are as follows: the first SSID indicates unset (i.e., blank); the second SSID indicates "wireless"; the encryption key is unset (blank); the encryption flag is "0"; and the communication mode is "ad-hoc". Some of the parameters will be generated in accordance with an external instructions (e.g., from PC 30) and stored (or updated) as new values.

The printer 20 is implemented with application software that enables the printer 20 to function as an SNMP (Simple Network Management Protocol) agent (i.e., such application software is stored in the ROM 22). The printer 20, by the SNMP agent function, when receives an SNMP GET request command requesting certain parameters, replies thereto by transmitting an SNPM reply command including the parameters requested by the SNMP GET request command. In the embodiment, the parameters requested by the SNMP GET request command are read out of a data base, MIB (Management Information Base) stored in the ROM 22. In this data base (MIB), various parameters related to the printer 20 have been stored in advance. Some predetermined parameters can be newly registered (or updated) in accordance with the instructions by the PC 30.

The PC 30 is a device that functions as a wireless station. The PC 30 includes CPU 31, ROM 32, RAM 33, wireless LAN controller 34, input unit 36 provided with a keyboard and a pointing device, display 37, hard disk drive (HD) 38 and network controller 39.

The CPU 31 controls the entire operation of the PC 30 in accordance with the procedures stored in the ROM 32 with occasionally storing processing results in the RAM 33 and transmitting respective elements.

The ROM 32 is a non-volatile readable/writable memory. The ROM 32 has storage areas for the SSID to be used when the PC 30 performs the wireless communication, parameters related to the security in communication and parameters indicative of communication modes of the wireless communication.

In particular, among the parameters stored in the ROM 32, the SSID includes ones respectively corresponding to the wireless communication modes. That is, the SSID includes the first SSID corresponding to the infrastructure mode, and the second SSID corresponding to the ad-hoc mode.

The wireless LAN controller 34 is an interface that realizes the wireless communication in accordance with a wireless LAN standard in accordance with the parameters stored in the ROM 32. When the parameter indicative of the communication mode represents the infrastructure mode, the PC 30 (CPU 31) utilizes the first SSID from among the SSID stored in the ROM 22, while if the parameter represents the ad-hoc mode, the PC 30 (CPU 31) utilizes the second SSID in the ROM 32. By establishing the connection with the wireless access point or the wireless station, in accordance with the mode represented by the parameter indicative of the communication mode, via the wireless LAN controller 34, the communicating function as the wireless station is realized.

In the above case, if the parameters related to the security are stored in the ROM 32, the communication is performed with the security measure being applied. Examples of the parameters related to the security may include the encryption key to executes the communication with the encrypted condition. The encryption key is, similarly in the access point 10, stored together with the encryption flag. If the encryption key is stored together with the encryption flag indicating the encrypted communication, the PC 30 (CPU 31) performs the communication with the encrypted manner in accordance with the encryption key. If the encryption key is stored with the encryption flag which indicates the non-encrypted communication, the PC 30 (CPU 31) performs the communication without encryption.

In the PC 30, by operating the input unit 36 to input settings related to the wireless communication, respective parameters (i.e., SSID, encryption key and encryption flag) are generated and stored in the ROM 32. According to the first embodiment, an example in which respective parameters have been set (i.e., stored) so that the wireless connection can be made with respect to the access point 10 (see (1) of FIG. 1) will be described.

The network controller 39 functions as an interface for connecting the PC 30 by the wired connection.

Further, the PC 30 is implemented with application software that enables the PC 30 to function as an SNMP manager. By the function of the SNMP manager, the PC 30 (CPU 31) is capable of transmitting SNMP GET request commands requesting certain parameters to other devices, and receiving and collecting the SNMP reply commands replied by the devices that received the SNMP GET request commands.

Incidentally, in FIG. 1, in order to show that all the devices are connected, all of the three possible wireless communication paths (1)-(3) are indicated. It should be noted that each of the communication paths (1)-(3) is established/disconnected during procedures described below, and FIG. 1 is not intended to show that all the devices are always connected.

<Remote Setup Procedure by PC 30>

A remote setup procedure executed by the PC 30 will be described with reference to FIG. 2. The remote setup procedure is for indirectly make settings of a device (which is the printer 20 in this embodiment) for realizing the wireless connection with respect to the access point 10 fro the PC 30. The remote setup procedure is started when application software for the remote setup, which is stored in the HD 38 is started.

In the embodiment, the remote setup is executed using a wizard. That is, the application software for the remote setup procedure provides an interactive interface, and by replaying (inputting answers) to inquiries made by the wizard, the remote setup can be performed.

It should be noted that, prior to the start up of the application software, the user should set the second SSID to "Wireless", the encryption flag to "0", and the communication mode to "ad-hoc mode" so that the wireless communication of the PC 30 with respect to the printer 20 is enabled in the ad-hoc mode.

After the above change of the settings, the PC 30 is ready to execute the wireless communication with the printer 20 via the wireless LAN controller 34. In FIG. 1, the communication path is changed from (1) to (2).

Figure 3:
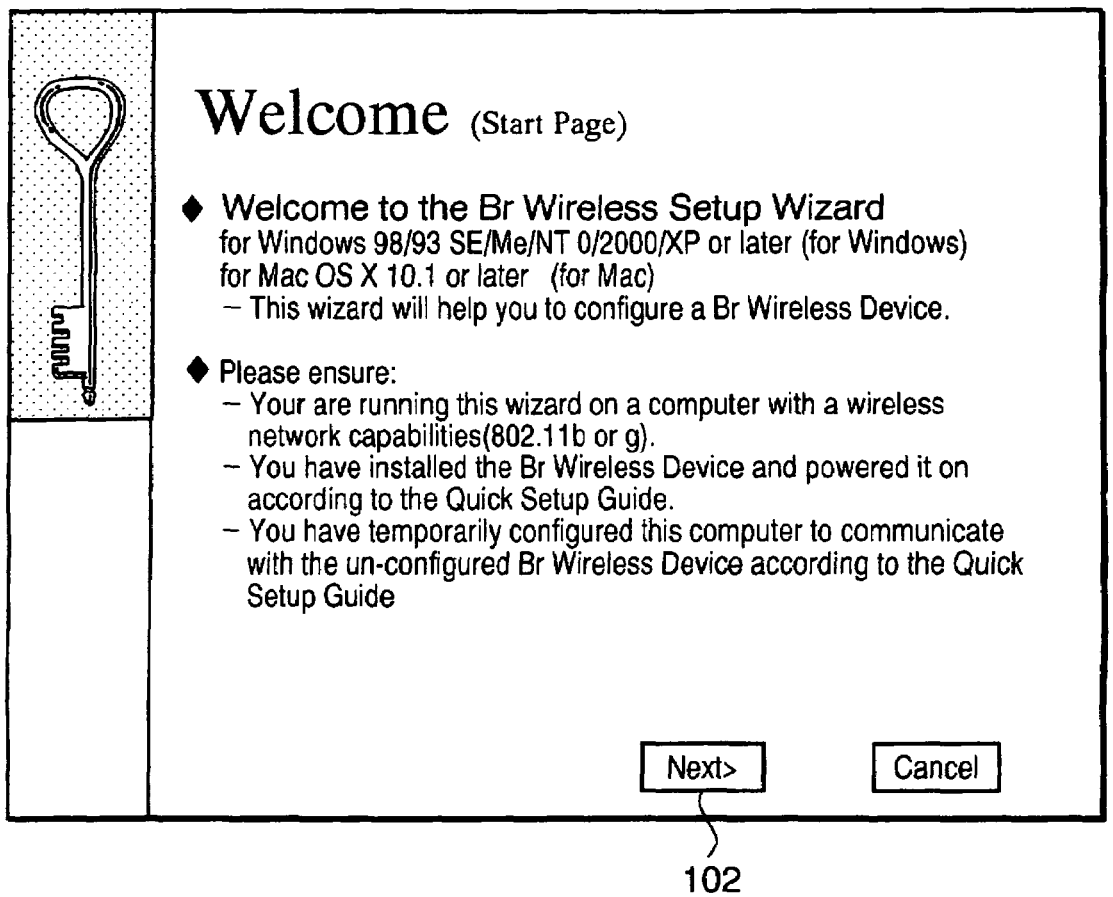
FIG. 3 shows an example of a start page of a setup wizard.

When the remote setup procedure is started, an image indicating the start of the remote setup (i.e., the wizard startup image shown in FIG. 3) is displayed on the display 27. Then, the CPU 31 is ready to acquire an operation of the user (e.g., clicking of the "NEXT" button 102 in FIG. 3) in S100.

In images showing progression of the remote setup, which will be shown hereinafter, when a "Back" button and/or "Cancel" button are displayed, control proceeds such that, if an operation to select the "Back" button is performed, the image immediately before the current image is displayed, and if an operation to select the "Cancel" button is performed, the remote setup procedure is forcibly terminated.

The user's operation is acquired and confirmed in S100, control proceeds to S300 in which control determines a target device which is subjected to the remote setup. This procedure (i.e., target device determining procedure)-is for determining the device whose settings should be remotely set from among the wireless stations around the PC 30.

Figure 4:
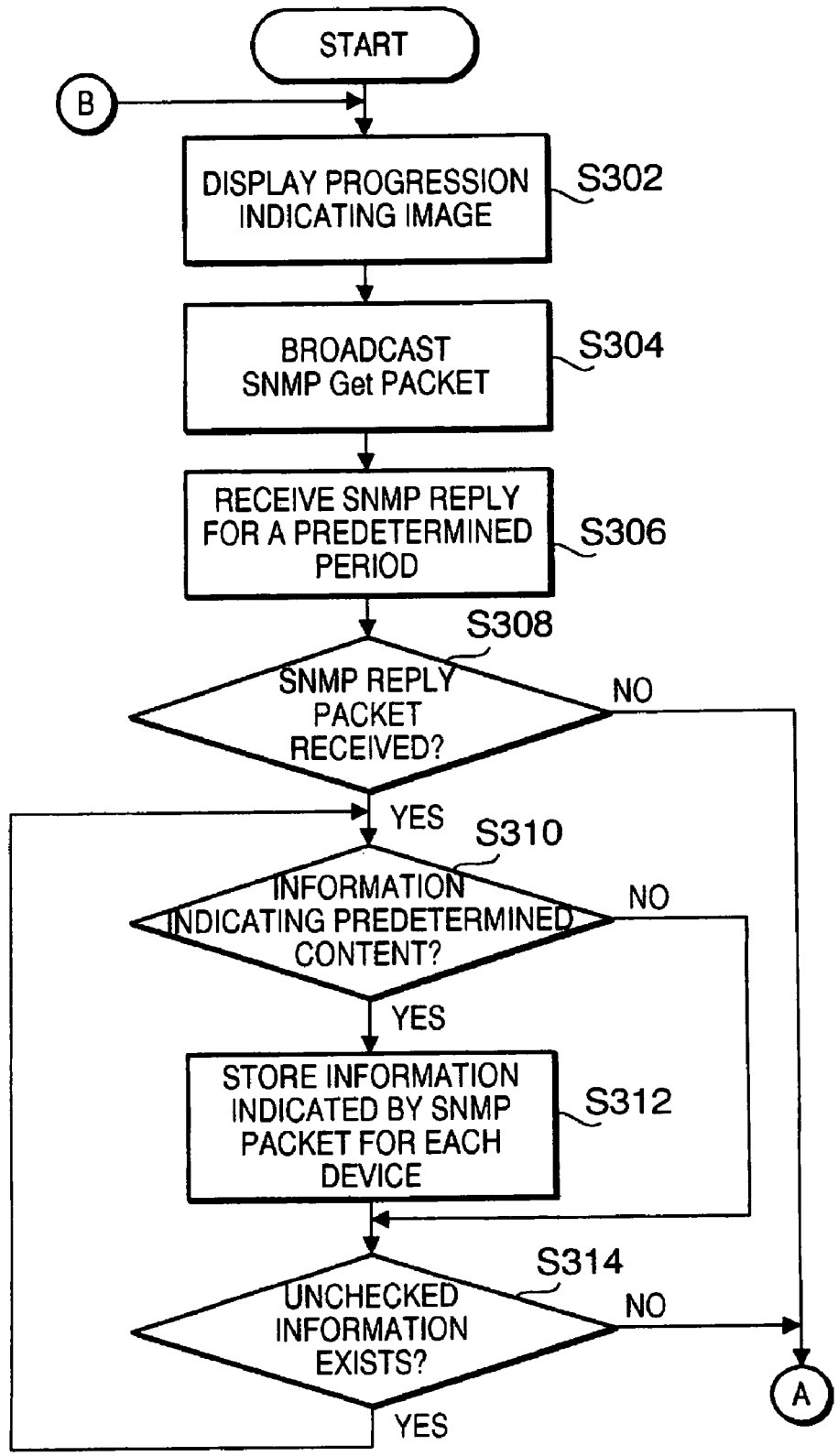
FIGS. 4 and 5 show a flowchart illustrating a target device determining procedure.
Figure 5:
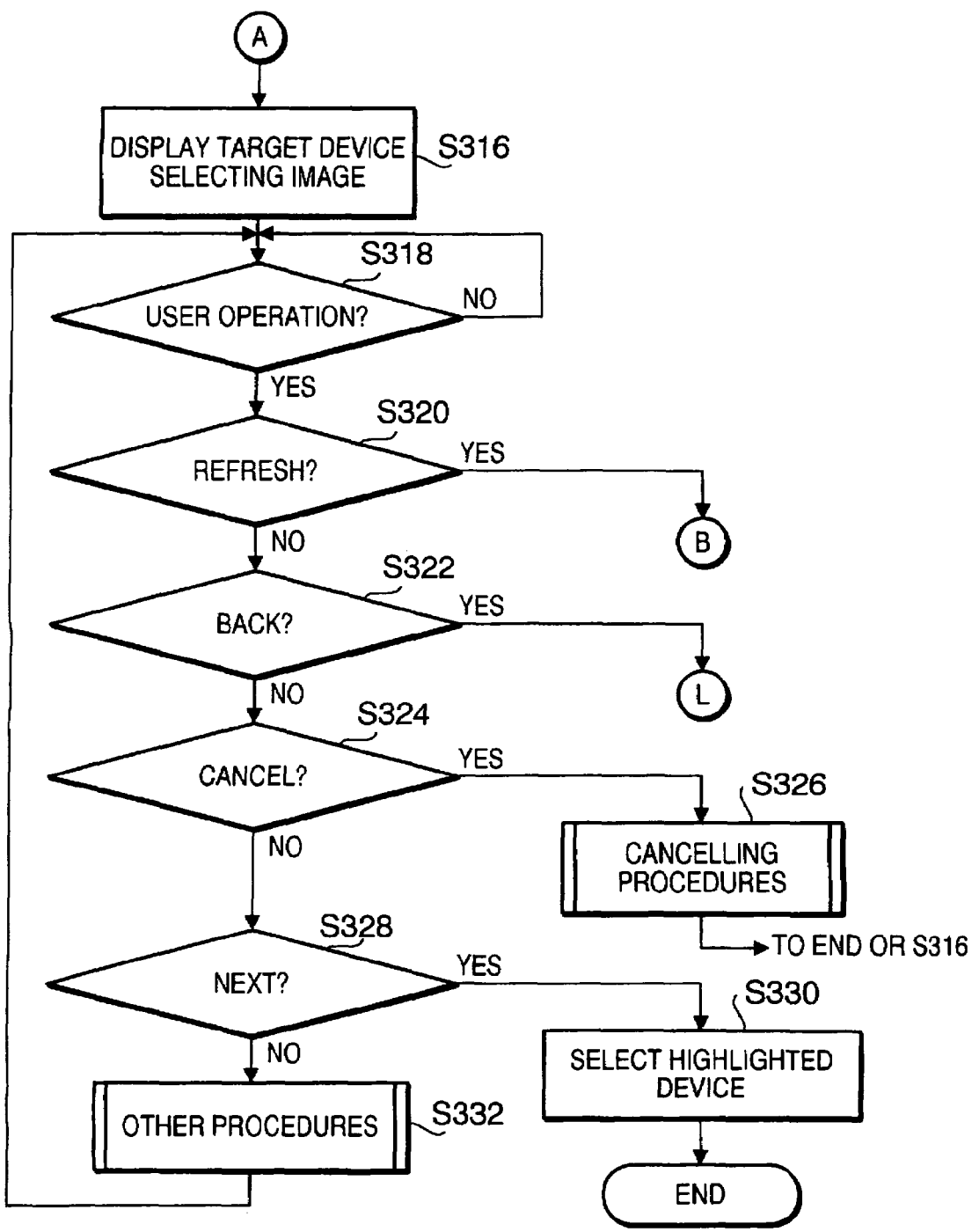

FIGS. 4 and 5 shows a flowchart of the target device determining procedure according to the first embodiment.

Figure 6:
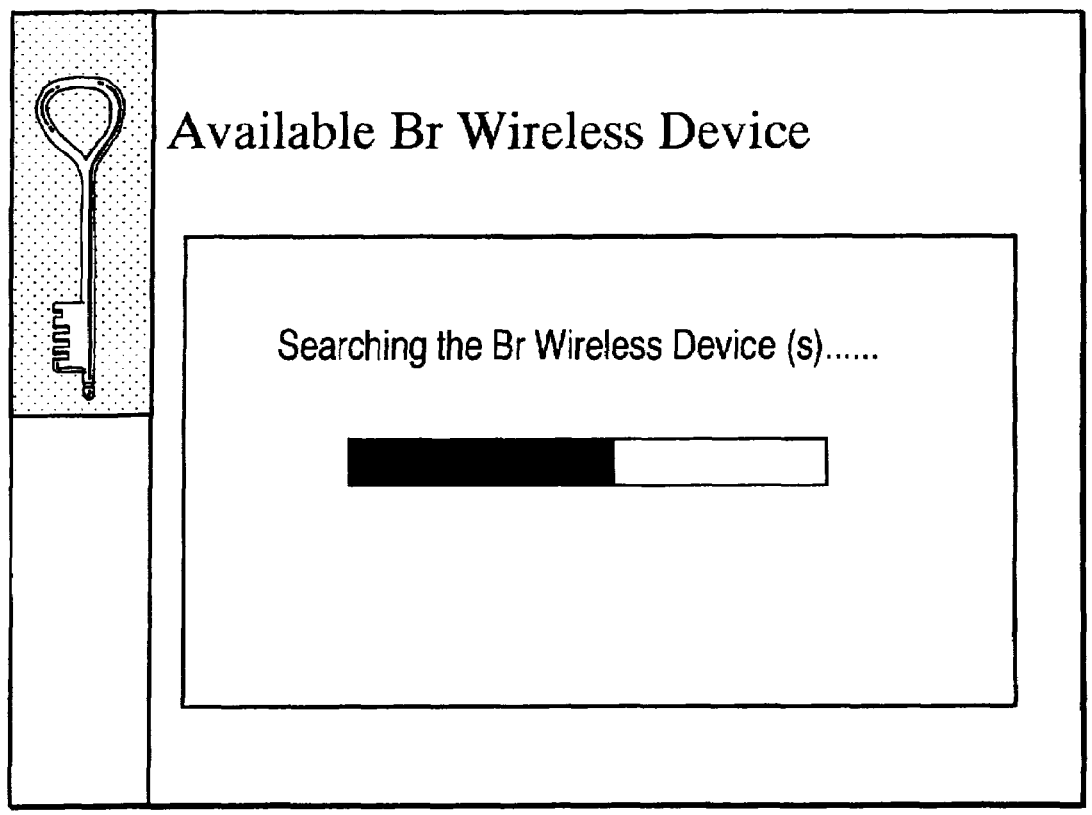
FIG. 6 shows an example of a progression display.

Firstly, control displays a progression indicating image (see FIG. 6) indicating that devices (i.e., wireless stations) around the PC 30 are being searched on the display 37 (S302). Then, control requests for notification of settings related to the wireless communication to the devices around the PC 30 by broadcasting an SNMP GET request packet (S304). Specifically, the SNMP GET request packet includes requests for device name, IP address, MAC address, device type information, availability of acquisition function, wireless LAN standard usable for the wireless communication, communication channel usable for the wireless communication, information (object) such as one for discrimination.

From the devices that receive the SNMP GET request packet broadcast by the PC 30 in S304, SNMP reply (REPLY) packets containing the requested information are returned if the necessary information is stored in the data base.

Among the information requested using the SNMP GET request packet, the "availability of the acquisition function" is a function of identifying parameter groups (e.g., SSID) necessary for realizing the wireless communication with the wireless access point based on a beacon or probe replay transmitted by the wireless access point.

The "wireless LAN standard usable for the wireless communication" is one of the standards such as the IEEE 802.11a, -1b, -11g, with which each device can perform the wireless communication. The "communication channel" usable for the wireless communication indicates a channel (frequency range) which can be used in accordance with the currently selected wireless LAN standard. The "discrimination information" indicates information for identifying respective devices which returned the SNMP packets. In the embodiment, the "discrimination information" is information for identifying the make of each device.

In S304, the SNMP GET request packet is broadcast. Then, control collects the SNMP reply packets which have been returned within a predetermined time period (two seconds in this embodiment) in S306.

Next, in S308, control judges whether the SNMP reply packets have been collected (received) in S306.

If the SNMP reply packets have been received (S308: YES), control checks contents of the information for the SNMP packets whose contents have not been checked (S310).

If an SNMP reply packet has the "discrimination information" indicative of a predetermined content (a predetermined manufacturer in the present embodiment) (S310: YES), control stores the information indicated by the SNMP reply packet in the RAM 33 per respective devices that returned the SNMP reply packets (S312).

After S312 has finished, or if the "discrimination information" does not indicate the predetermined content (S310: NO), control judges whether there are SNMP reply packets which have been collected in S306 and whose content has not been checked (S314).

If there are SNMP reply packets which have not bee checked (S314: YES), control returns to S310. Until all the SNMP reply packets are examined, steps S310-S314 are repeated. When all the SNMP reply packets have been examined (i.e., the contents have been checked) in S314, and if there is only one parameter group (which has stored in S312), steps S316 onwards may not be skipped and control may proceeds to S400, assuming that the device corresponding the only one parameter group is selected by the procedure which is similar to the procedure of S330.

Figure 7:
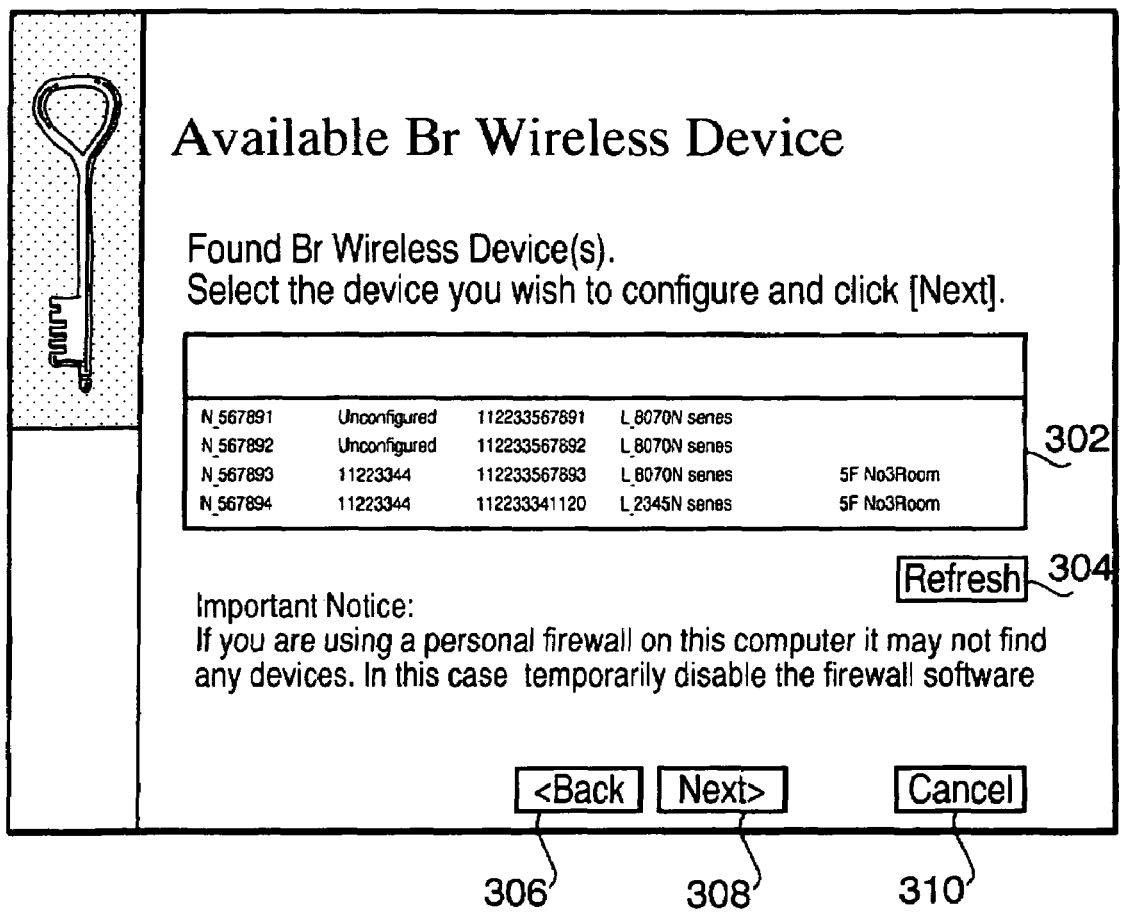
FIG. 7 shows an example of a target device selection screen.

When the contents of the information of all the SNMP reply packets have been checked in S314 (S314: NO) or no SNMP replay packet has been received (S308: NO), control displays, in S316, a target device selecting screen showing a list of information of respective devices stored in the RAM 33 in S312. An example of the target device selecting screen is shown in FIG. 7. As shown in FIG. 7, the screen shows a list 302 indicating the devices and corresponding information. The user can select a device to which the remote setup is applied by operating to select one of the devices indicated in the list 302. The selected device is highlighted in the screen.

In the target device selecting screen a "Refresh" button 304, a "Back" button 306, a "Next" button 308, a "Cancel" button 310 are displayed.

The user is allowed to select one of the "Refresh" button 304 and "Back" button 306 to highlight one device in the list, "Next" button 308 when one of the devices is highlighted, and "Cancel" button 310.

After the target device selecting screen is displayed in S316, control pauses until the user performed one of the above operations (S318: NO). When the user operation is performed (S318: YES), control proceeds as follows.

If the user operation is the "Refresh" operation (S320: YES), control returns S302 and the target device determination procedure is started from the beginning. If the user operation is the "Back" operation (S320: NO, S322: YES), control returns to S100 and re-executes the procedure from display of the wizard starting screen.

Figure 8:
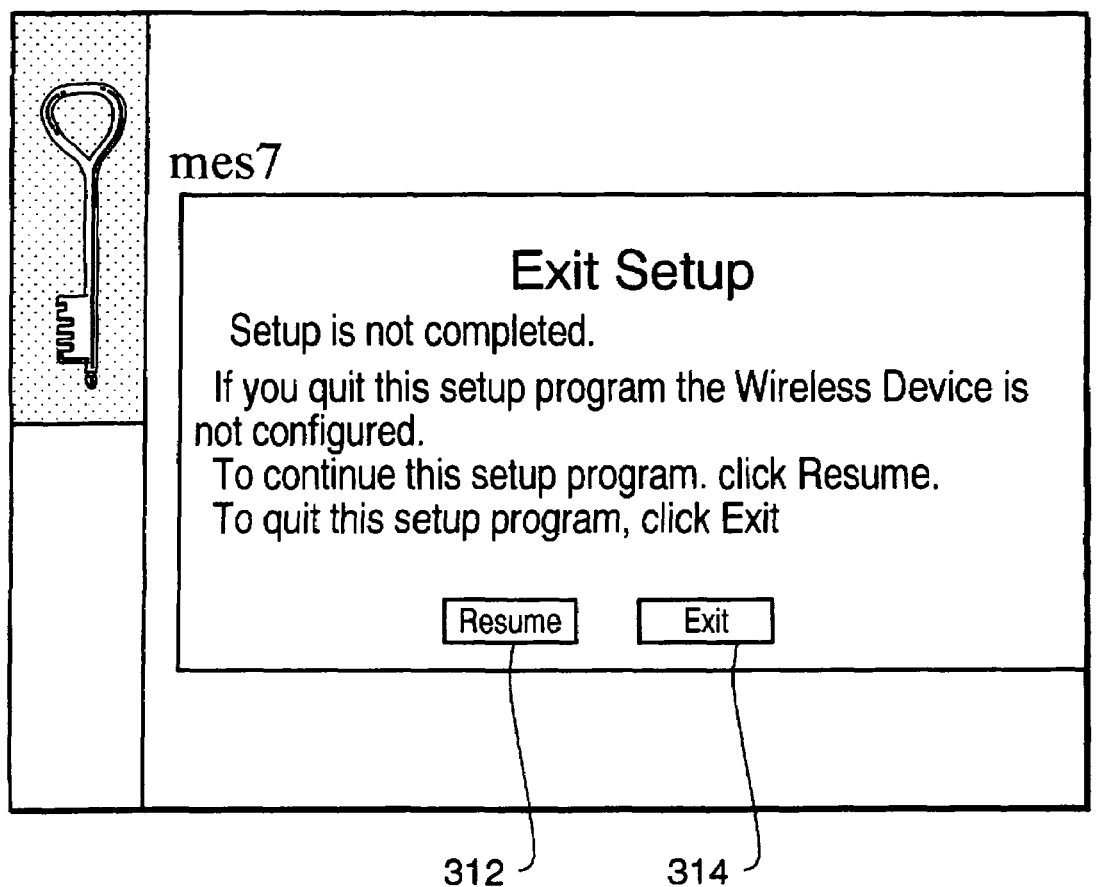
FIG. 8 shows an example of a screen which is displayed when the setup is forcible interrupted.

If the user operation is "Cancel" operation (S320: NO, S322: NO, S324: YES), a canceling process is executed in S326. In the canceling process, a forcibly terminating screen as shown in FIG. 8 is displayed. On the forcibly terminating screen, the "Resume" button 312 and "Exit" button 314 are displayed. The user can select the "Resume" button 312 (Resume operation) or the "Exit" button 314 (Exit operation). If the resume operation is performed, control returns to S316, while if the exit operation is performed, the target device determining procedure is terminated forcibly.

If the user operation after S316 is "Next" operation (S320: NO, S322: NO, S324: NO, S328: YES), control determines the selected (highlighted) device in S302 as the target device which is remotely set up in S330, and terminates the target device determining procedure. Then, control proceeds to S400 onwards in FIG. 2. Incidentally, in S330, when the target device is determined, the MAC address of the target device is stored in the RAM 33.

If an operation of the user after S316 is none of the above-indicated operations (S320: NO, S322: NO, S324: NO, S328: NO), an operation corresponding to the user operation (S332) and control returns to S318.

Figure 2:
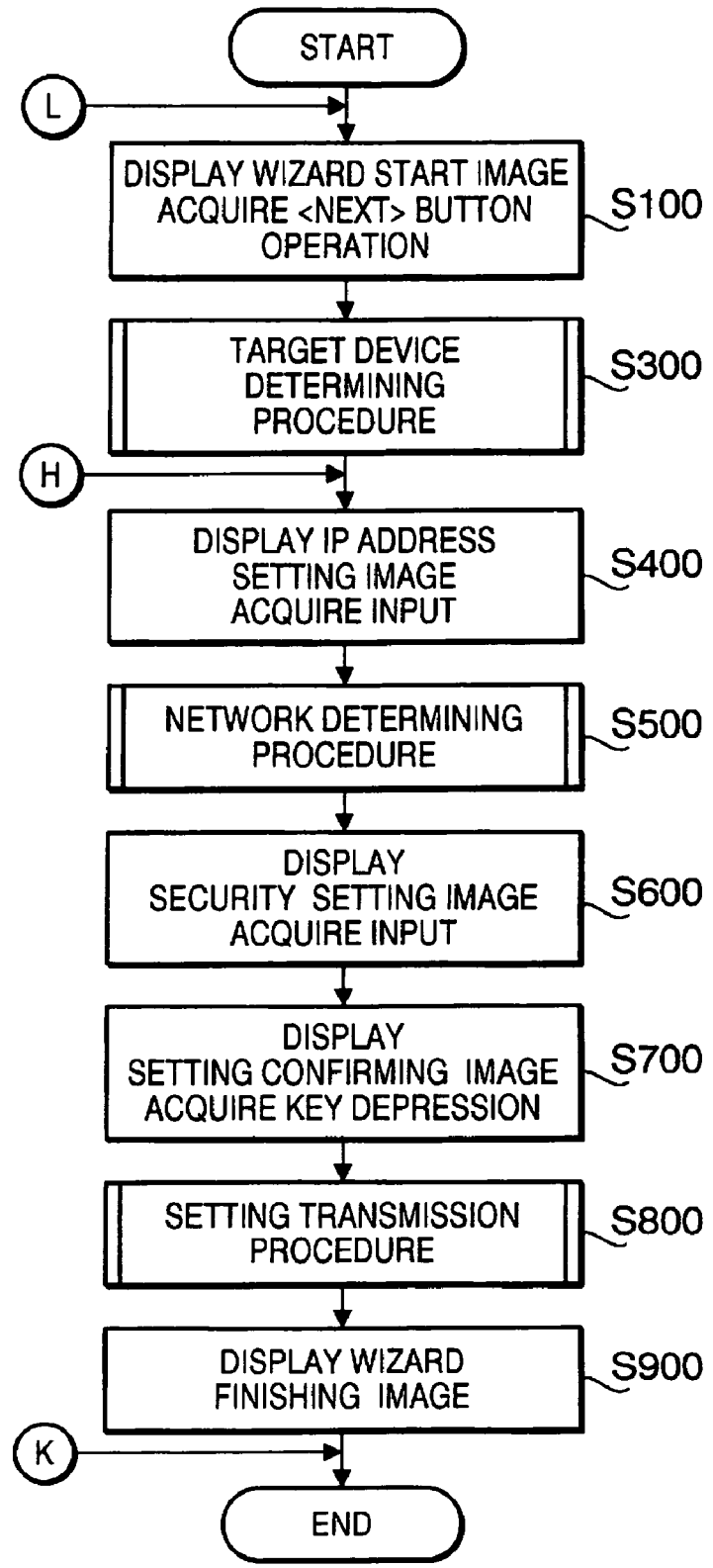
FIG. 2 is a flowchart illustrating a remote setup procedure.

After the target device determining procedure has been finished, control proceeds to S400 of FIG. 2, in which an IP address setting screen (FIG. 9) for requesting the user to input the IP address to be assigned to the target device determined in S330 on the display 37, and waits for an accepting operation (i.e., operation of the "Next" button 422).

The user can select a radio button 416 for allowing the system to automatically obtain the IP address in accordance with a predetermined communication protocol (DHCP: Dynamic Host Configuration Protocol) or select a radio button 418 to input the IP address (i.e., set the IP address statically). When the user selects the radio button 418, the user can input the IP address (including a subnet mask and default gateway) in input boxes 420. After the above operations are performed and then the "Next" button 422 is operated, information related to the above IP address (to obtain statically or dynamically, and IP address itself in the case of static setting) is generated and stored in the RAM 33.

Figure 10:
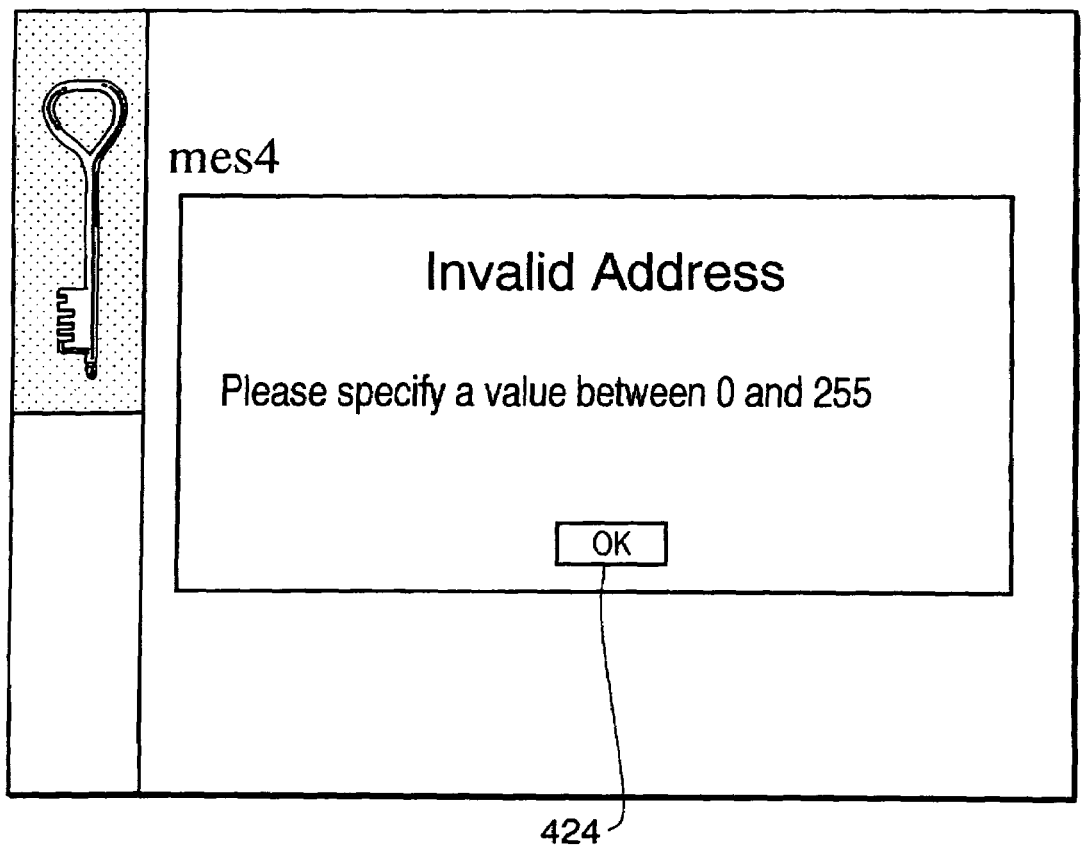
FIG. 10 shows an example of an error notification screen.

In S400, if the values input in the input boxes 420 are not included in the range defined by a predetermined communication standard (IP: Internet Protocol), and the "Next" button 422 is operated, an error notifying screen as shown in FIG. 10 is displayed. The error notifying screen is kept displayed until the "OK" button 424 is selected. When the "OK" button 424 is selected, the procedure of S400 is re-executed.

The confirming operation is executed after S400, control determines the wireless network in which the target device is included (S500). The procedure in S500 is a network determining procedure, which realizing the wireless communication between the target device and a network.

Figure 11:
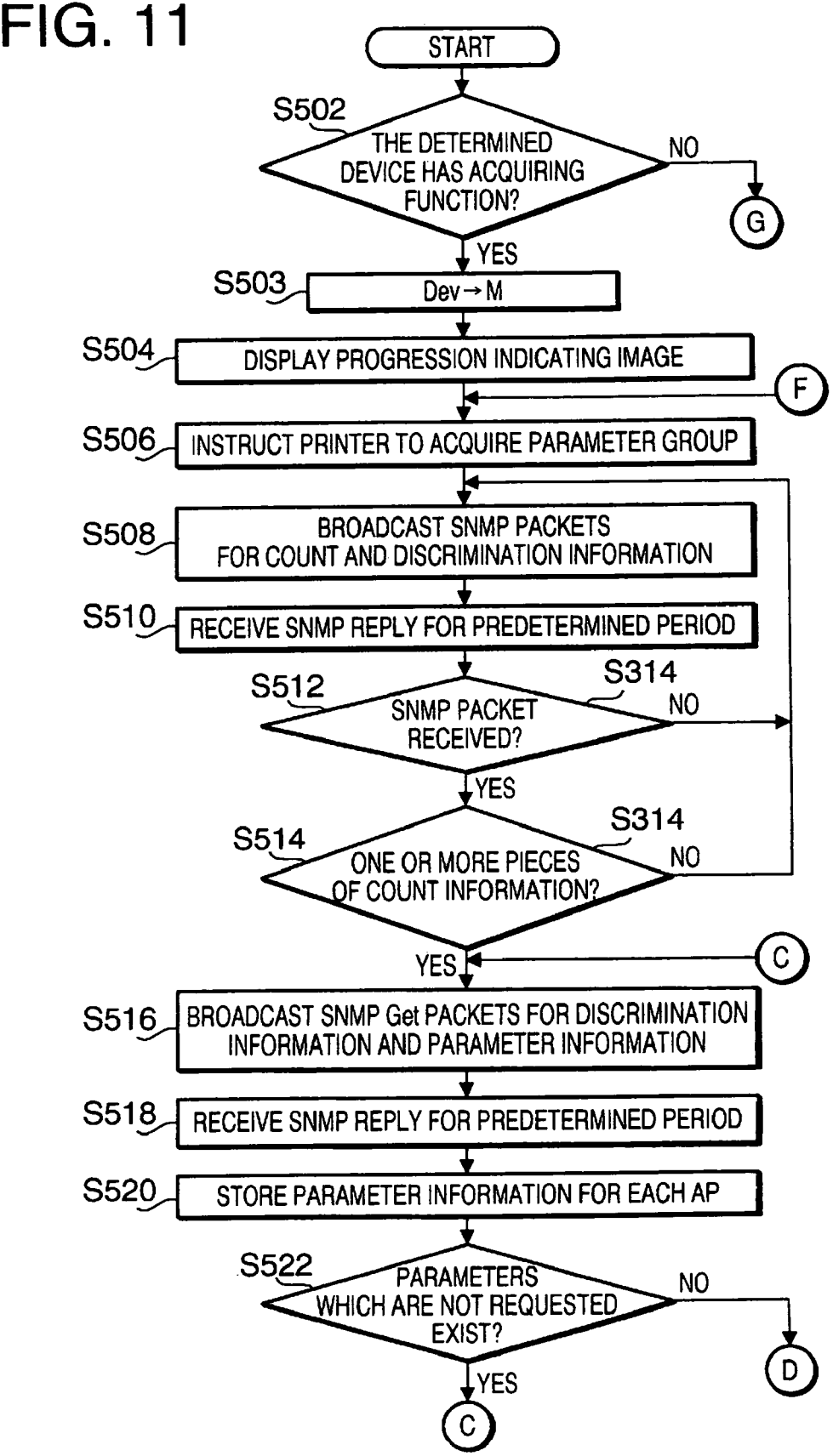

FIG. 11 and some subsequent drawings show the network determining procedure according to the present embodiment.

As shown in FIG. 11, control examines the information included in the SNMP reply packet which is transmitted from the target device selected in S330 (and is stored n the RAM 33 in S312) to check the "availability of the acquiring function" (S502).

In S502, if the "availability of the acquiring function" indicates that the acquiring function is available (S502: YES), control set "Method Variable M" to "Dev" (S503). The "Method Variable M" represents a variable to be set with a value indicative of a method of obtaining a parameter group in a process described later. The value "Dev" represents a method that asks the target device to obtain the parameters. Values which may be set to the "Method Variable M" in processes described later include "PC" indicating that the parameter group is obtained by the PC 30 itself, and "A-Dev" indicating that the PC 30 asks another device which can perform a data communication to obtain the parameters.

Next, control displays a progression indicating screen (similar to FIG. 6) which shows a progression of an operation for instructing the target device to obtain the parameter group on the display 37 (S504).

Control then instructs the target device (printer 20) to obtains the parameter group with use of its acquiring function (S506).

According to the embodiment, the printer 20 is configured such that the registration of a predetermined information with the database initiates the operation of obtaining the parameter groups. Therefore, in the procedure in S506, to obtain the parameter group is instructed by transmitting the SNMP setting (SET) packet for registering the predetermined information of the target device with the database is transmitted to the target device. The SNMP setting packet is broadcast so that it includes the MAC address of the target device. The target device examines the MAC address to determine that the SNMP setting packet is for the target device, and if so, the registration with the database is performed.

The target device, which receives the SNMP setting packet, starts obtaining the parameter groups (which includes the wireless LAN standard used for the wireless communication, the communication channel for the wireless communication, the discrimination information) with its acquiring function. The pieces of information (first through n-th pieces of information) indicative of respective parameter groups as obtained are registered with the database for respective wireless access points, and count information (representing the value "n") representing the number of pieces of the obtained information is also registered with the database.

Among the thus obtained parameter groups, the "wireless LAN standard to be used for the wireless communication" indicates which one of the plurality of wireless LAN standards is used in the target device corresponding to the collected parameter groups, and the "communication channel of the wireless communication" represents which channel is used by the target device when it performs the wireless communication.

When S506 is executed after option data is stored in S545 (described later), the SNMP setting packet including the option data is broadcast. In this case, the target device is instructed to obtain the parameter group from a specified wireless access point.

In S508, control requests the target device for the "Count information" and the "discrimination information" among the information registered with the data base by the SNMP GET request packet. In this step, the SNMP GET request packet for requesting the count information and the discrimination information is broadcast. From the devices received the SNMP GET request packet broadcast in S508, SNMP reply packets are returned if the requested information is registered with the database. It should be noted that, among the information above, the count information is set to have a value less than one (−1 in this embodiment) when the target device is currently obtaining the parameter group.

Within a predetermined period (two second, in this embodiment) after the SNMP GET request packet was broadcast in S508, control receives the SNMP reply packet transmitted from the target device (S510). In this step, from among the SNMP reply packets transmitted to the PC 30, one whose MAC address is the same as the MAC address of the target device is determined as the SNMP reply packet from the target device and received.

In S512, control judges whether the SNMP reply packet was received (collected) in S510. If it is determined that the SNMP reply packet is not collected (S512: NO) or collected (S512: YES) abut the count information contained therein is less than 1 (S514: NO), control returns to S508 and re-executes the broadcasting of the SNMP Get packet.

If the SNMP reply packet has been collected (S512: YES), and the count information is equal to or greater than one (S514: YES), control further requests (by broadcasting an SNMP Get command) for parameter information (one of 1st n-th parameter information) corresponding to any one of values represented by the count information contained in the SNMP reply packet received in S512.

The value "n" represented by the count information contained in the SNMP replay packet indicates the number of the wireless access points (i.e., the number of first to n-th wireless access points) from which the target device collects the parameter groups. Thus, in S516, an SNMP GET request packet is broadcast to request for one of the first to n-th parameter information having not requested as the parameter information indicative of one of the wireless access point as well as the "discrimination information".

From the target device that receives the SNMP GET request packet broadcast in S516, if the requested information is available, the SNMP reply packet is returned from the target device.

Within a predetermined period (two second, in this embodiment) after the SNMP GET request packet was broadcast in S516, control receives the SNMP reply packet transmitted from the target device (S518). In this step, similar to S510, from among the SNMP reply packets transmitted to the PC 30, one whose MAC address is the same as the MAC address of the target device is determined as the SNMP reply packet from the target device and received.

In S520, control stores the parameter information (parameter group) contained in the SNMP reply packet collected in S518 in the RAM 33 for each wireless access point.

After S520 is finished, control judges whether there are values corresponding to parameter groups represented by the values of the count information contained in the SNMP reply packet collected in S512.

If there are parameters which have not requested for (S522: NO), control returns to S516 and repeats steps S516-S522 until request for the parameters according to all the values indicated by the count information contained in the SNMP reply packet collected in S512 are finished.

Figure 12:
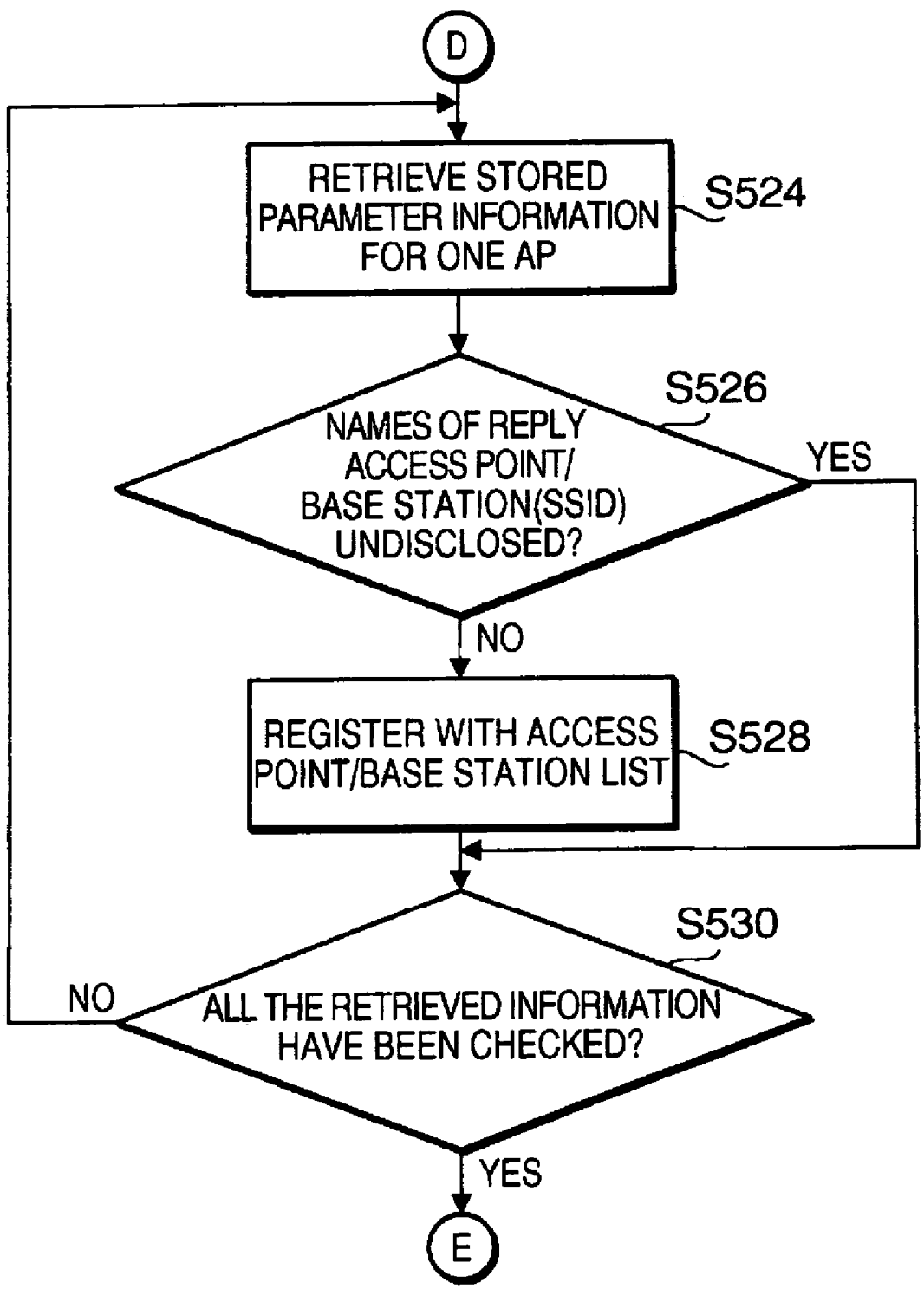

If there are parameters which have not requested for (S522: NO), as shown in FIG. 12, a parameter corresponding to the wireless access point of the parameter information stored in S520.

In S526, control judges whether the SSID is not included in the parameter information read out in S524, that is, whether the SSID assigned to the wireless access point (Access Point/Base Station) from which the parameter information is transmitted by the SNMP reply packet is closed to the public.

According to the embodiment, when the SNMP replay packet from the wireless access point whose SSID is closed to the public, the parameter corresponding to the SSID has a value (00H) having the same number of bytes of "0" as the data length of the SSID. Therefore, in S526, when the value of the parameter corresponding to the SSID consists of a plurality of "0"s, control determines that the SSID is closed to the public.

If the SSID is determined to be closed to the public (S526: NO), the parameter groups represented by the parameter information read out in S524 is registered with the Access Point/Base Station list (S528).

After registration with the list is executed in S528 or when the SSID is determined to be closed to the public (S526: YES), control examines whether there is some parameter information which has not been read out nor checked (S530).

If there are some pieces of parameter information which has not been read out nor checked (S530: NO), control returns to S524 and repeats S52-S530 until readout of the information and check thereof is finished for all the pieces of the parameter information.

Figure 14A:
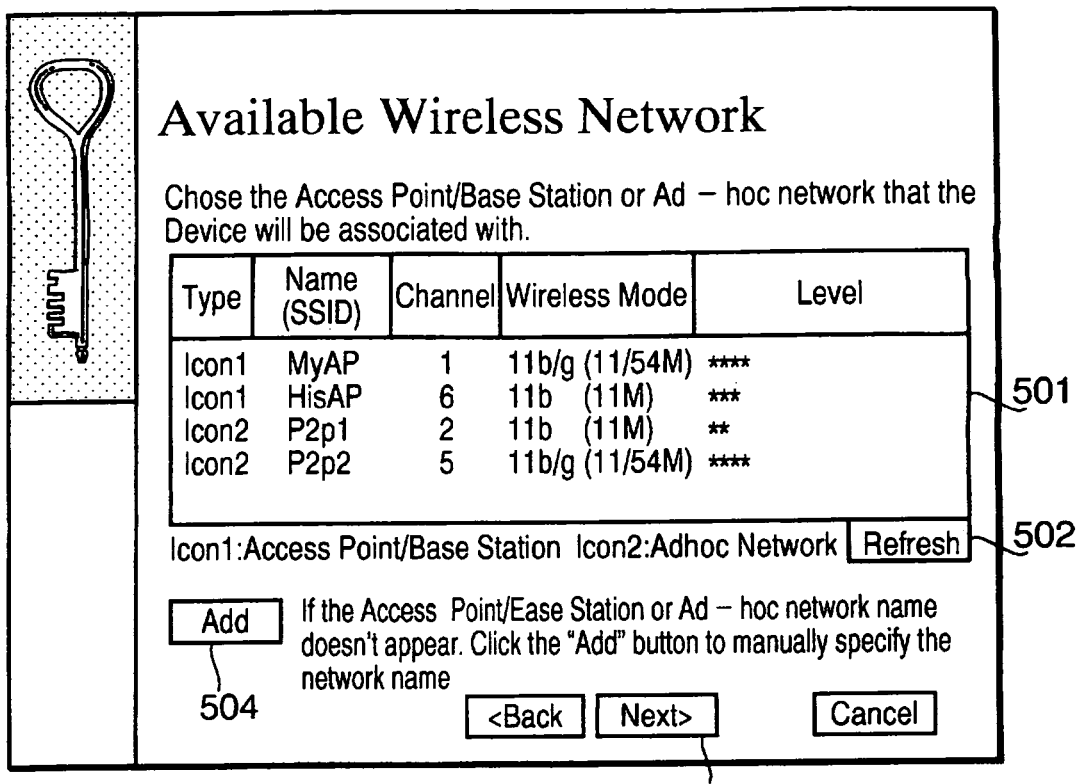
FIGS. 14A and 14B show an access point/base station selection screen.

If there is no parameter information which has not been read out nor checked (S530: YES), as in the procedure shown in FIG. 13, the Access Point/Base Station list showing a list of parameter groups represented by the parameter information corresponding to each of the wireless access point store din the RAM 33 (in S520) is displayed in S532. The Access Point/Base Station list shows, as shown in FIG. 14A, a list 501 of the parameter group corresponding to each wireless access point.

The user can select the wireless access point to which the target device is wirelessly connected by selecting a wireless access point from among the access points in the list 501. On the screen showing the Access Point/Base Station list (FIG. 14A), a "Refresh" button 502, and "Next" button 504 are also displayed. The user is allowed to (1) operate the "Refresh" button (hereinafter, occasionally referred to as a "Refresh" operation), (2) select (highlighting) one of the wireless access point from the list 501 and then operate the "Next" button (hereinafter occasionally referred to as "Next" operation), or (3) operate the "Add" button 504 (hereinafter occasionally referred to as "Add" operation).

After displaying the Access Point/Base Station list in S532, control pauses until the user performs one of the above-described actions (operations) (S534). When an action is done, if it is not the "Next" operation but the "Refresh" operation (S536: NO, S540: YES), control returns to S506.

After displaying the list in S532, if the user performs the "Next" operation (S536: YES), control determines the selected (highlighted) wireless access point in the list 501 as the wireless access point to be connected with the target device (S538). Then, control stores the parameter information (parameter group) corresponding to the selected wireless access point in the RAM 33 as the information of the wireless access point to be wirelessly connected, terminates the determining procedure, and control proceeds to S500 (FIG. 2).

Figure 14B:
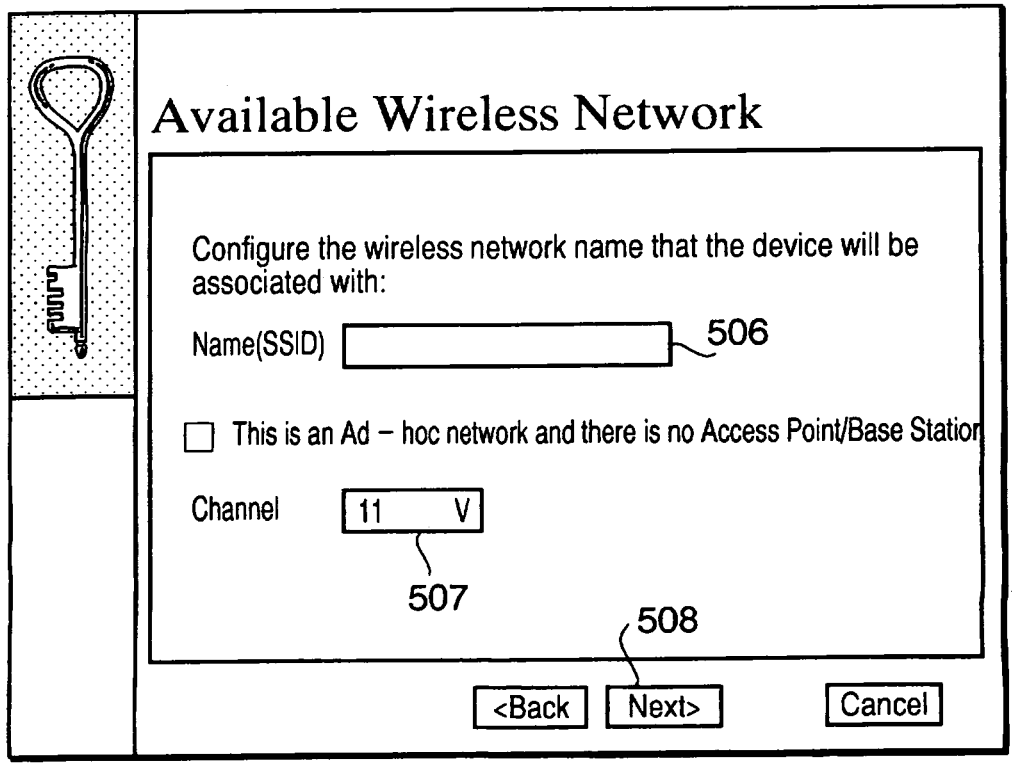

If the user performs the "Add" operation after the list 501 is displayed in S532 (S536: NO, S540: NO, S541: YES), control displays a name input screen (hereinafter referred to as ADD search name input screen) to which the SSID is to be input on the display 37 (S542). An example of the ADD search name input screen is shown in FIG. 14B. As shown in FIG. 14B, using the ADD search name input screen, the user can input the SSID ad channel to be assigned to the target device in the input boxes 506 and 507. Further, on this screen, the "Next" button 508 etc. are displayed so that the user can operate the same after inputting the SSID and the channel. When the "Next" button 508 is operated, as will be described later, control returns to S506 and turns to an instruction to search for a wireless access point corresponding to the input parameters. In this regard, the "Next" operation with respect to the input screen shown in FIG. 14B will be referred to as a Search Start operation.

After the ADD search name input screen is displayed in S542, control pauses until the user starts the search (S543, S544: NO). When the user operates the "Next" button 508 (S544: YES), control stores the parameter information including the SSID and channel designated in the screen is stored in the RAM 33 as optional data indicating that it is of the wireless access point designated by the user (S545). Thereafter, control checks a value set to the "Method variable" (S546).

As the check is performed in S546 and if the value of the "Method variable" is "Dev" (S546: Dev), control returns to S506 and repeats the process after step S506. If the value of the "Method variable" is "PC" (S546: PC), control proceeds to S576 (described later) in which access point corresponding to the parameters input by the user is searched. If the value of the "Method variable" is "A-Dev" (S546: A-Dev), control proceeds to S590, where PC 40 instructs another device capable of performing the data communication to obtain the parameter group.

If the action performed by the user after the display of the list (S532) is none of the above actins (S536: NO, S540: NO, S541: NO), control returns to S534.

Figure 15:
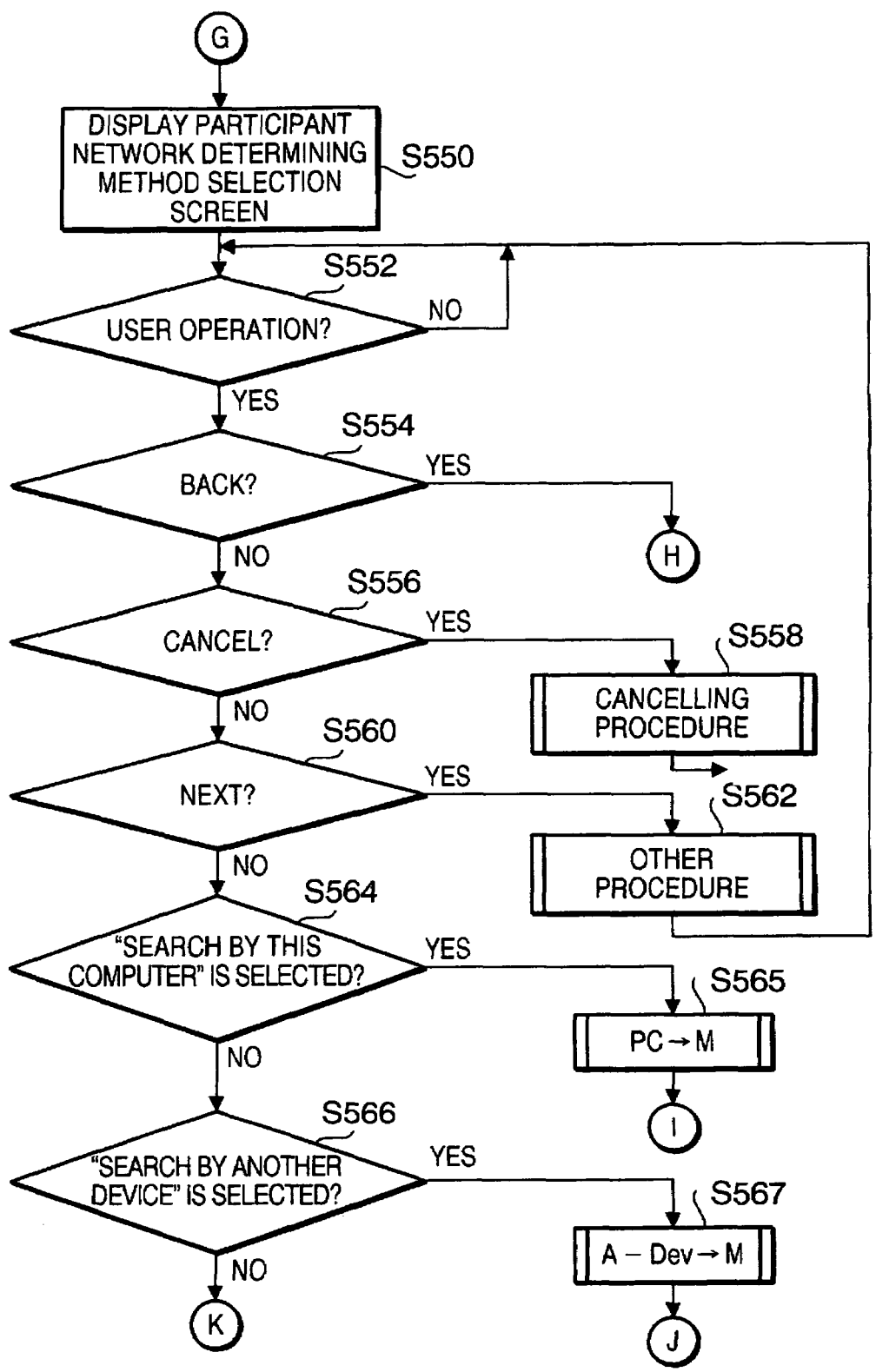
FIG. 15 shows a part of the flowchart illustrating the network determining procedure.

In S502, if "availability of acquiring function" represents that the acquiring function is not available (S502: NO), as shown in FIG. 15, a screen (participant network determining method selection screen) inquiring a setting method when the target device participates the network, i.e., when the wireless connection with the wireless access point is realized on the display 37 (S550).

Figure 16:
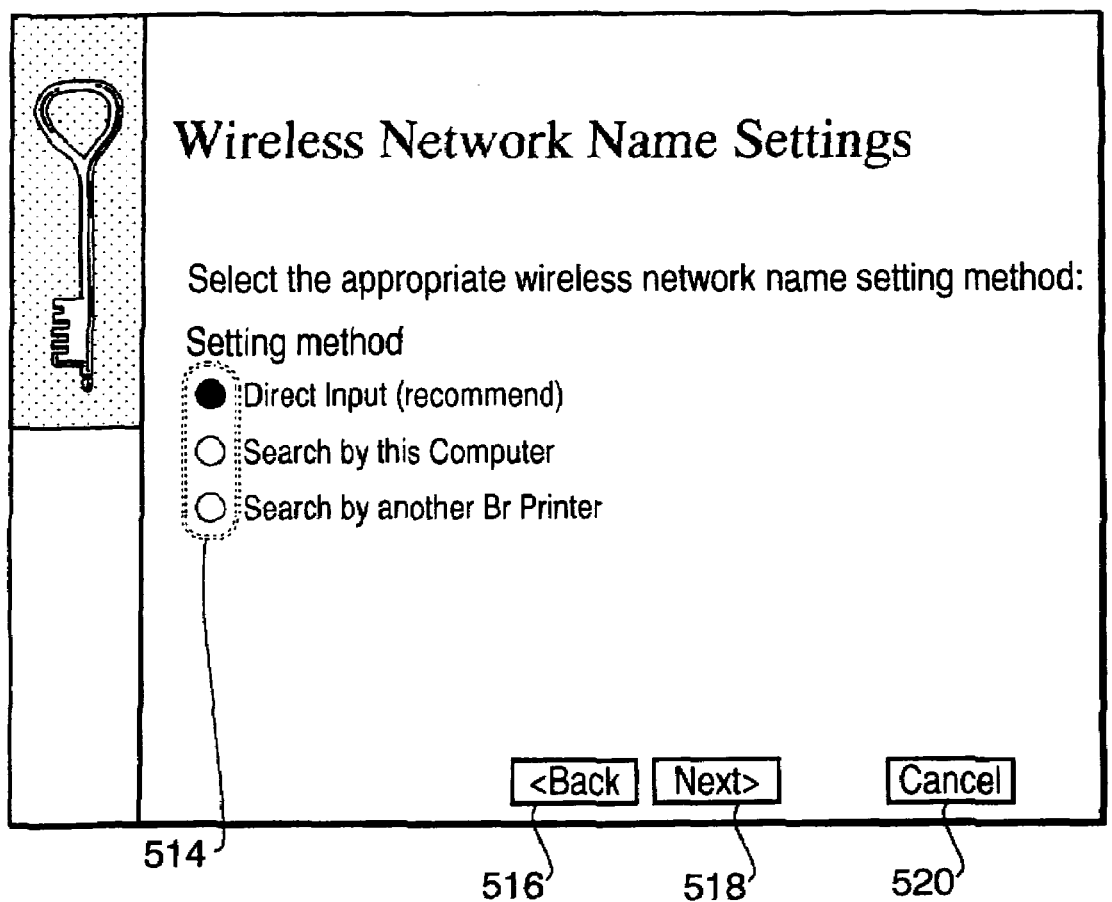
FIG. 16 shows a network name setting method selecting screen.

An example of the participate network determining method selection screen is shown in FIG. 16. In this example, the user can select one of the following determining methods using radio buttons 514.

The methods include:

(1) Direct Input: the wireless access point through which the target device is wirelessly connected is determined by the input operation of the user;

(2) Search by Computer: the wireless access point is determined among the devices searched with the acquiring function of the PC 30; and (3) Search by Another BrDevice: the wireless access point is determined among the devices searched with the acquiring function of another device that can perform the data communication with the PC 30.

On the participant network determining method selection screen, "Back" button 516, "Next" button 518 and "Cancel" button 520 are displayed. The user can perform a "Back" operation to select the "Back" button 516, a "Next" operation to select the "Next" button 518 and a "Cancel" operation to select the "Cancel" button 520.

After the participant network determining method selection screen is displayed in S550, control pauses until one of the above operations is performed by the user (S552: NO). When the user's operation is performed (S552: YES) and if the operation is the "Back" operation (S554: YES), control returns to S400, and setting is re-executed from displaying of the IP address setting screen.

If the user's operation is the "Cancel" operation (S554: NO, S556: YES), a canceling operation is executed (S558). In the canceling operation, as in step S326, the forcible terminating screen is displayed, process is paused until the user's operation. Then, when the "Resume" operation is performed by the user, control returns to S550. If the "Exit" operation is performed, the network determining procedure is terminated, and control proceeds to S600.

After the participant network determining method screen is displayed and if the user performs the "Next" operation (S554: NO, S556: NO, S560: YES), a procedure corresponding to the wireless access point determining method selected with the radio buttons 514 is executed (see FIGS. 17, 19 and 21). If the user's operation after the participant network determining method screen is displayed is none of the above operations (S554: NO, S556: NO, S560: NO), a procedure corresponding to the operation is executed (S562), and control returns to S552.

Figure 17:
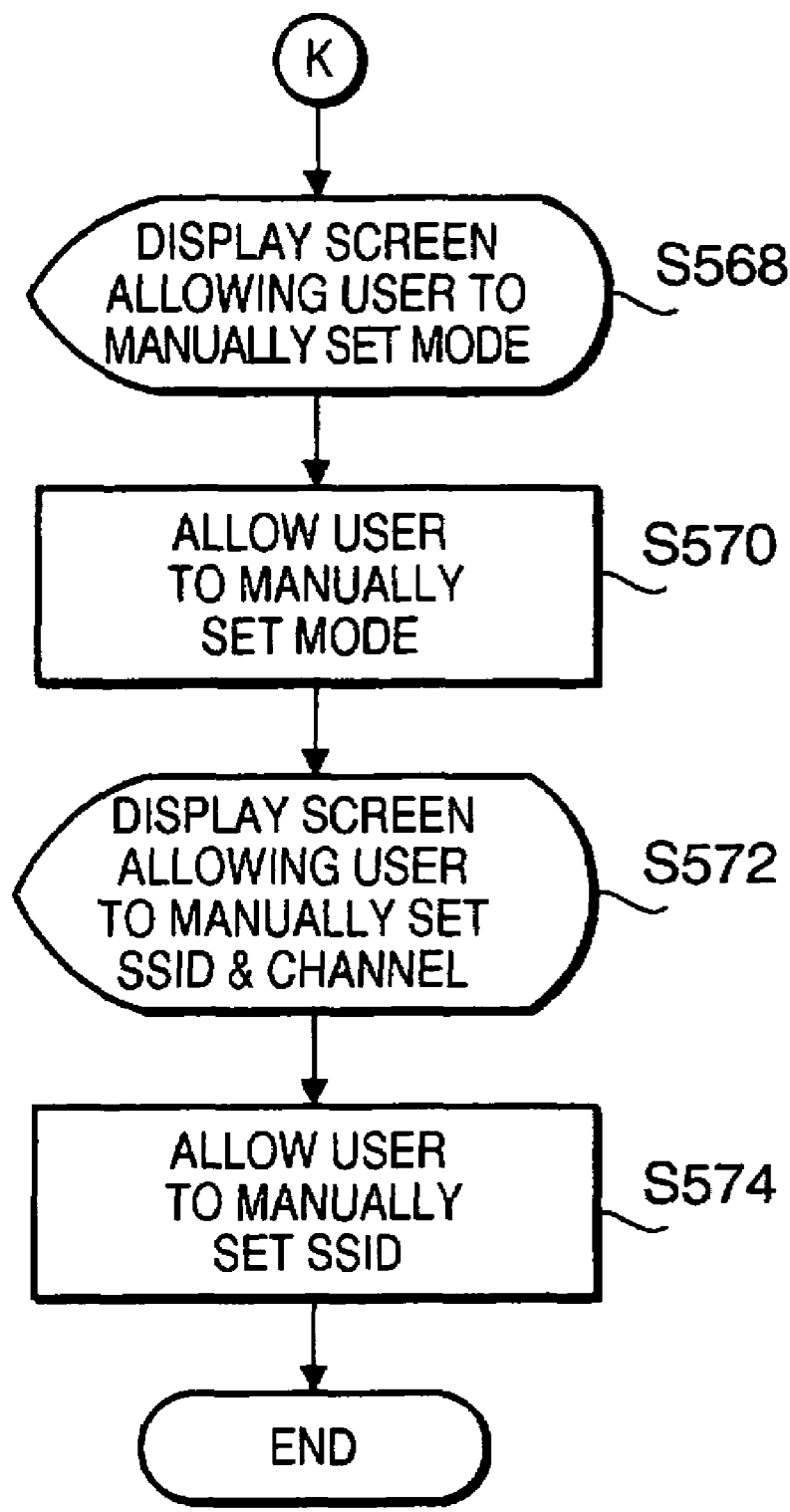
FIG. 17 is a part of the flowchart illustrating the network determining procedure.
Figure 18A:
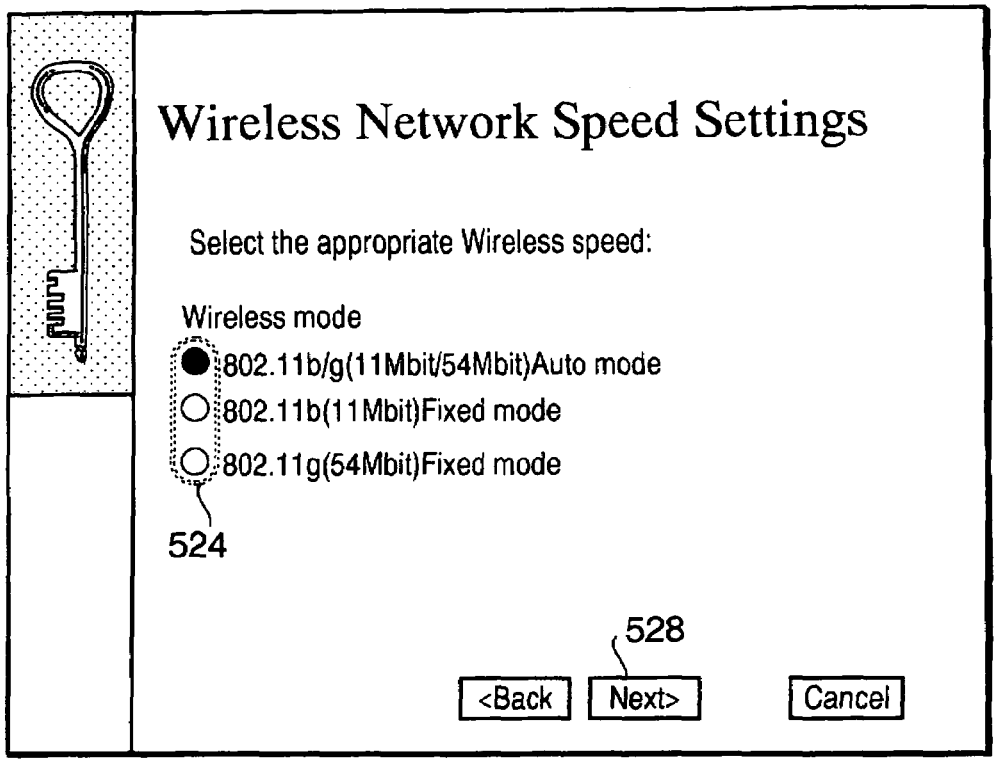
FIGS. 18A and 18B show examples of screens for setting wireless speed and wireless network name.

For example, if the user's operation is the "Next" operation and the wireless access point determining method is the "Direct Input" (S564: NO, S566: NO), as shown in FIG. 17, a screen allowing the user to manually select the wireless LAN standard (i.e., communication mode) is displayed on the display 37 (S568). An example of such a screen is shown in FIG. 18A, with which the user can select a wireless LAN standard to be set in the target deice can be set using the radio buttons 524. As shown in the drawing, on the screen, a "Next" button 528 etc. are displayed, and the user can perform the "Next" operation (to select the "Next" button 528) after selecting the wireless LAN standard to be used.

After displaying the screen in S568, if the user performs the "Next" operation (i.e., if the manual mode setting is performed) (S570), the thus set information regarding the wireless LAN standard is stored in the RAM 33.

Figure 18B:
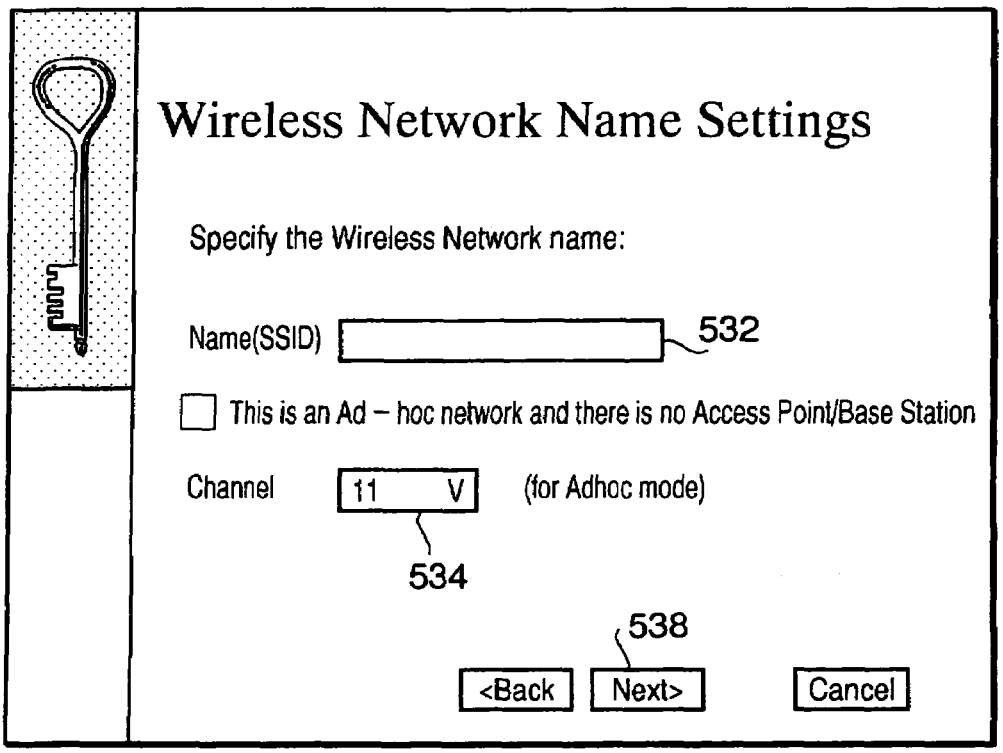

Next, a screen inquiring the user to manually input the SSID and the channel is displayed on the display 37 (S572). An example of such a screen is shown in FIG. 18B. Through which, the user can input the SSID and channel, which are to be set to the target device, in input boxes 532 and 534, respectively. Further, on this screen, a "Next" button 538 etc. are provided. If the user operates the "Next" button 538 after inputting the SSID and the channel, the user can performs the "Next" operation (to select the "Next" button 538).

After displaying of the screen in S572, if the user performs the "Next" operation, i.e., if the user manually sets the SSID and channel (S574), information regarding the thus set SSID and channel is stored in the RAM 33, the network determining procedure is terminated, and control proceeds to S600. It should be noted that the information regarding the wireless LAN standard stored in the RAM 33 in S570, and the information regarding the SSID stored in S574 are information regarding the wireless access point to which the target device is to be wirelessly connected.

Back to FIG. 15 and a concrete procedure when the user's operation is the "Next" operation will be described. If the "Search by Computer" is selected (S564), the "Method variable" is set to "PC" (S565).

Figure 19:
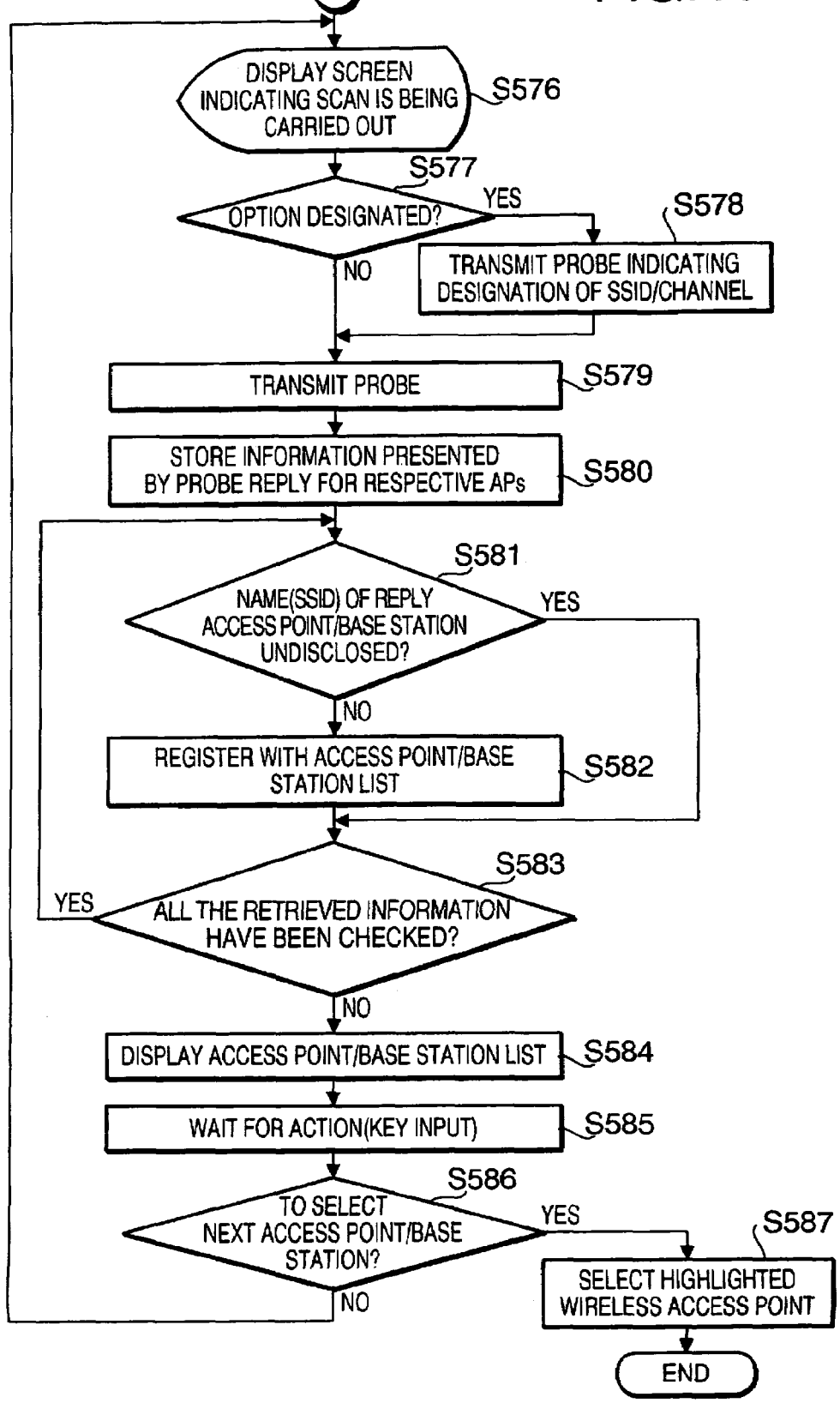
FIGS. 19 and 20 show a part of the flowchart illustrating the network determining procedure.

Then, as shown in FIG. 19, a screen (like one shown in FIG. 6) indicating that the PC 30 is searching (scanning) for a wireless access point with its acquiring function on the display 37 (S576). It should be noted that step S576 is also performed when the "Method variable" is set to "PC".

Next, control judging whether the optional data indicating that the user designated wireless access point is stored in the RAM 33 (i.e., whether the option is designated) in S577. The option data is stored in S545 as aforementioned.

If control determines that the optional data is stored in the RAM 33 (S577: YES), control broadcasts a probe request designating the parameters in order to detect a wireless access point corresponding to the parameters (SSID and channel) indicated by the optional data (S578). From the wireless access points received the probe request, probe replies indicating the parameters including the SSID, wireless LAN standard and channel are returned.

After the process in S578 is finished, or if it is determined that no optional data is stored (S577: NO), the probe request is broadcast in S579 in order to detect the wireless access point existing around the PC 30. From the wireless access points received the probe request, probe replies indicating the parameters including the SSID, wireless LAN standard and channel are returned.

As above, when the optional data is stored in the RAM 33, two-step detection is executed, that is, an active scan is executed with the parameters are identified, and then, another active scan without identifying the parameters is executed.

Incidentally, in the procedure in steps S577-S579, the parameter group included in the probe reply is obtained. This may be modified such that, as in S1060 of FIG. 27 (described later), the parameter group included in the beacon signal is obtained.

Next, the probe replies returned, within a predetermined period (two seconds in this embodiment) in response to the probe request transmitted in S578 and S579 are collected. Then the parameter information (parameter groups) represented by the thus collected probe replies are stored in the RAM 33 in relation with respective wireless access points (S580).

In S581, control judges whether any one of pieces of parameter information stored in S580 does not include the SSID. That is, control judges whether the SSID assigned to the wireless access point (Access Point/Base Station) from which the parameter information is transmitted by the probe reply is closed to the public.

According to the embodiment, when the SNMP replay packet from the wireless access point whose SSID is closed to the public, the parameter corresponding to the SSID has a value (00H) having the same number of bytes of "0" as the data length of the SSID. Therefore, in S531, when the value of the parameter corresponding to the SSID consists of a plurality of "0"s, control determines that the SSID is closed to the public.

If the SSID is determined to be closed to the public (S581: NO), the parameter groups represented by the parameter information is registered with the Access Point/Base Station list (S582).

After registration with the list is executed in S582 or when the SSID is determined to be closed to the public (S581:

YES), control examines whether there remains some parameter information which has not been checked (S533).

If there are some pieces of parameter information which has not been checked (S583: NO), control returns to S581 and repeats S581-S583 until all the pieces of the parameter information are checked.

Next, the Access Point/Base Station list is displayed (S584). At this stage, the Access Point/Base Station list shows a list 501 of the parameter groups corresponding to the wireless access points (similar to that shown in FIG. 14A.

The user is allowed to (1) operate the "Refresh" button ("Refresh" operation) or (2) select (highlighting) one of the wireless access point from the list 501 and then operate the "Next" button ("Next" operation).

After the Access Point/Base Station list is displayed in S584, control pauses until the above operation is performed by the user (S585). If the user's action is not the "Next" operation but the "Refresh" operation (S586: YES), control returns to S576.

If the user's operation is the "Next" operation (S586: YES), control determines the selected (highlighted) wireless access point in the list 501 as the one to which the target device is wirelessly connected (S587), and the parameter information (parameter group) corresponding to the selected wireless access point is stored in the RAM 33 as the information of the wireless access point to be wirelessly connected. Thereafter, control terminates the network determining procedure, and proceeds to S600 (see FIG. 2).

If a concrete process when the user's operation is the "Next" operation (S560: YES) is "Search by another BrDevice" for selecting an access point from ones searched by another device that can execute data communication with the PC 30 (S564: NO, S566: YES), control sets the "Method variable M" to "A-Dev" (S567).

It should be noted that, instead of S584, the procedure of S532 can be executed. In such a case, the same result is obtained except that the ADD input is enabled again.

Figure 20:
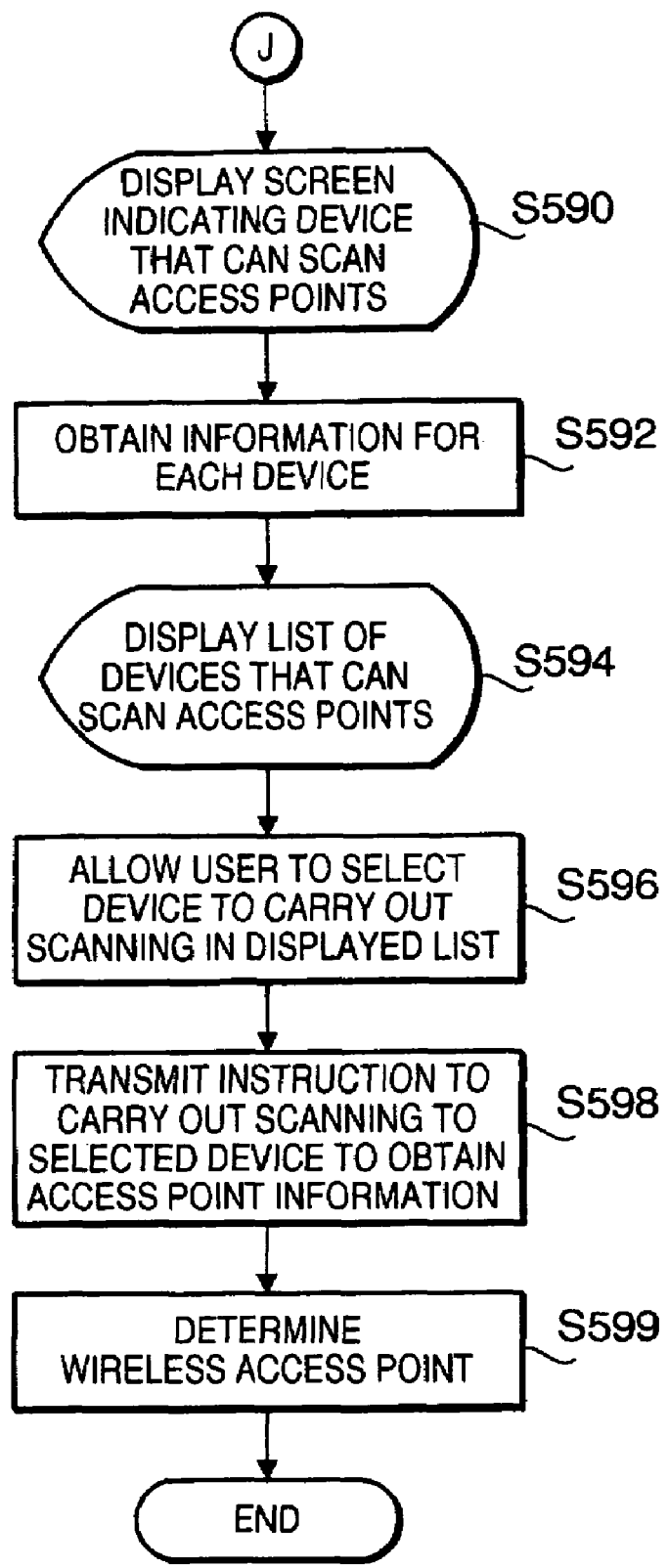

Next, as shown in FIG. 20, control displays a screen indicating that a device which can search for (scan) wireless access points is being searched on the display 37 (S590). The screen appears similar to FIG. 6. As mentioned above, the device being searched is a device which can perform data communication with the PC 30 and has the acquiring function. It should be noted that control may proceed to S590 when control determines in S546 that the "Method variable" is set to "A-Dev".

Control then inquires, by broadcast, the devices (on the network) that can perform data communication with the PC 30 whether it has the acquiring function (i.e., the function to search for the wireless access points) in S592. In this step, an SNMP GET request packet for requesting not only the information indicative of the acquiring function but the device name, IP address, MAC address, wireless LAN standards that can be used for the wireless communication, the communication channel usable for the wireless communication and the discrimination information.

From the devices that receive the SNMP GET request packet broadcast in S592 return SNMP reply packets if they have the requested information. It should be noted that, in S592, the SNMP reply packets returned within a predetermined period (two seconds in this embodiment) after the SNMP GET request packet was transmitted are received and collected. In the description below, for the sake of explanation, a case where the PC 40 having a similar configuration to the PC 30 is provided as the device that can perform data communication with the PC 30 will be described.

In S592, based on the SNMP reply packets collected after the SNMP GET request packet was transmitted, a list of the devices that returned the SNMP reply packets (i.e., the devices that can search fro wireless access points) is displayed on the display 37 (S594).

Figure 21:
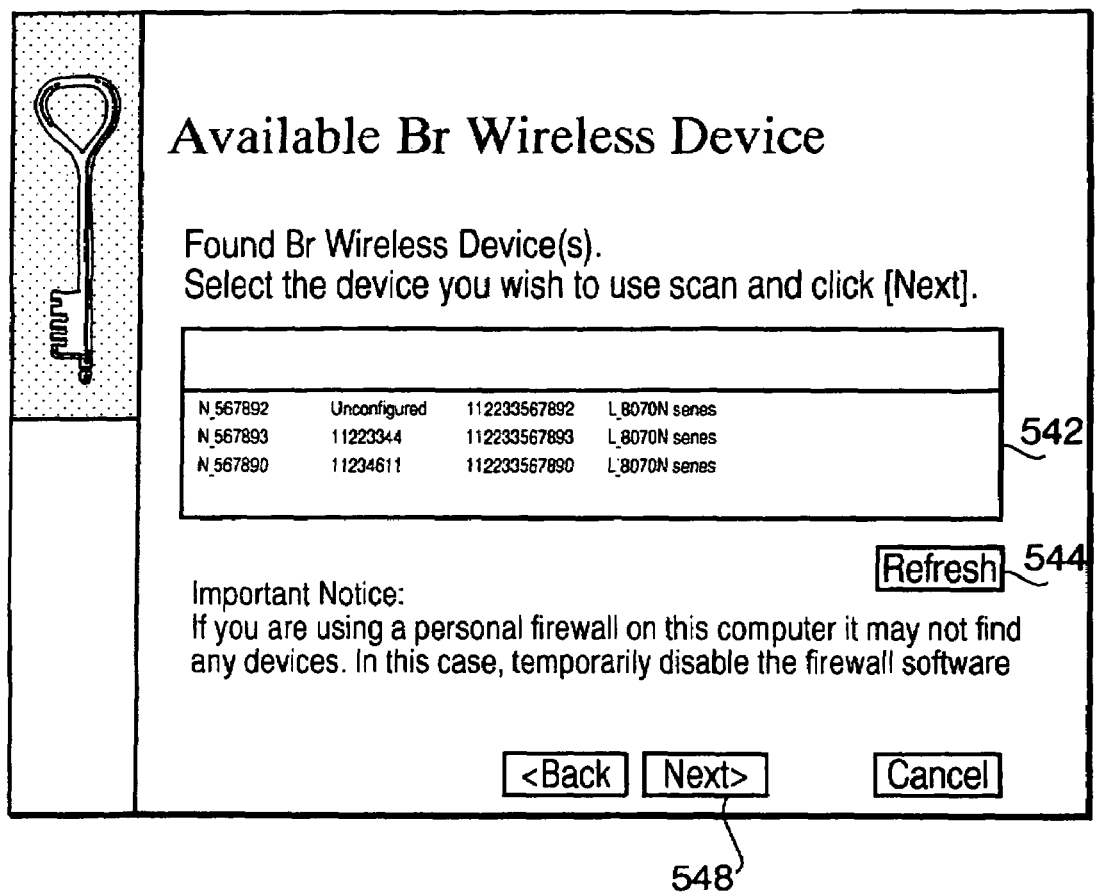
FIG. 21 shows an example of a device list.

An example of the device list is shown in FIG. 21. In this list, among the pieces of device information included in the SNMP replay packets collected in S592, parameter information corresponding to the devices that have the acquiring function and can search for the wireless access points (i.e., searchable devices) are extracted and displayed as a list 542.

The user can select one of the searchable devices by selecting one of the devices listed up in the list 542. As shown in FIG. 21, on the screen, a "Next" button 548 etc. are displayed. The user can operate the "Next" button (i.e., "Next" operation) when one of the listed devices is selected (highlighted) in S596.

After execution of S594, if the user performs the "Next" operation, control transmits an instruction to search the access points to the selected device, and obtains the access point information related to the wireless access points searched by the selected device (S598). Specifically, control transmits an SNMP set packet that causes the database of the user-selected searchable device to register information that triggers the device to start searching the wireless access, points.

When such an SNMP set packet is received, the device starts searching the wireless access points, and registers the information (parameter information) regarding the searched wireless access points with the database in relation to respective wireless access points. Incidentally, the SNMP set packet is transmitted by a unicast designating IP address of the user-selected device. This may be modified such that the SNMP set packet is broadcast with the MAC address of the user-selected device included. Then, the device firstly determines whether the received packet is directed thereto based on the MAC address, and when the packet is for the device, it is registered with the database.

By requesting for the "parameter information" registered with the database using the SNMP GET request packet, the parameter information, i.e., the information regarding the wireless access point included in the SNMP reply packet in response to the SNMP GET request packet is obtained. If control returns to S590 after the optional data is stored as in S506, by broadcasting the SNMP set packet including the optional data, the searchable device is requested to obtain the parameter group from a predetermined access point.

After the information regarding the access points obtained in S598 is stored in the RAM 33 as the information of the wireless access points to which the wireless communication can be realized. Then, in S599, I accordance with the processes shown in FIGS. 11-13, a wireless access point is determined. Then, the network determining procedure is terminated, and control proceeds to S600 of FIG. 2.

It should be noted that, when the procedure of S598 is executed by application, a procedure similar to steps S506-S522 of FIG. 11 is executed for a device selected by the user instead of the printer. Thus, the access point information is obtained through the user-selected device. Then, in S599, a procedure similar to steps S532-S538 of FIG. 13 is executed.

Figure 22:
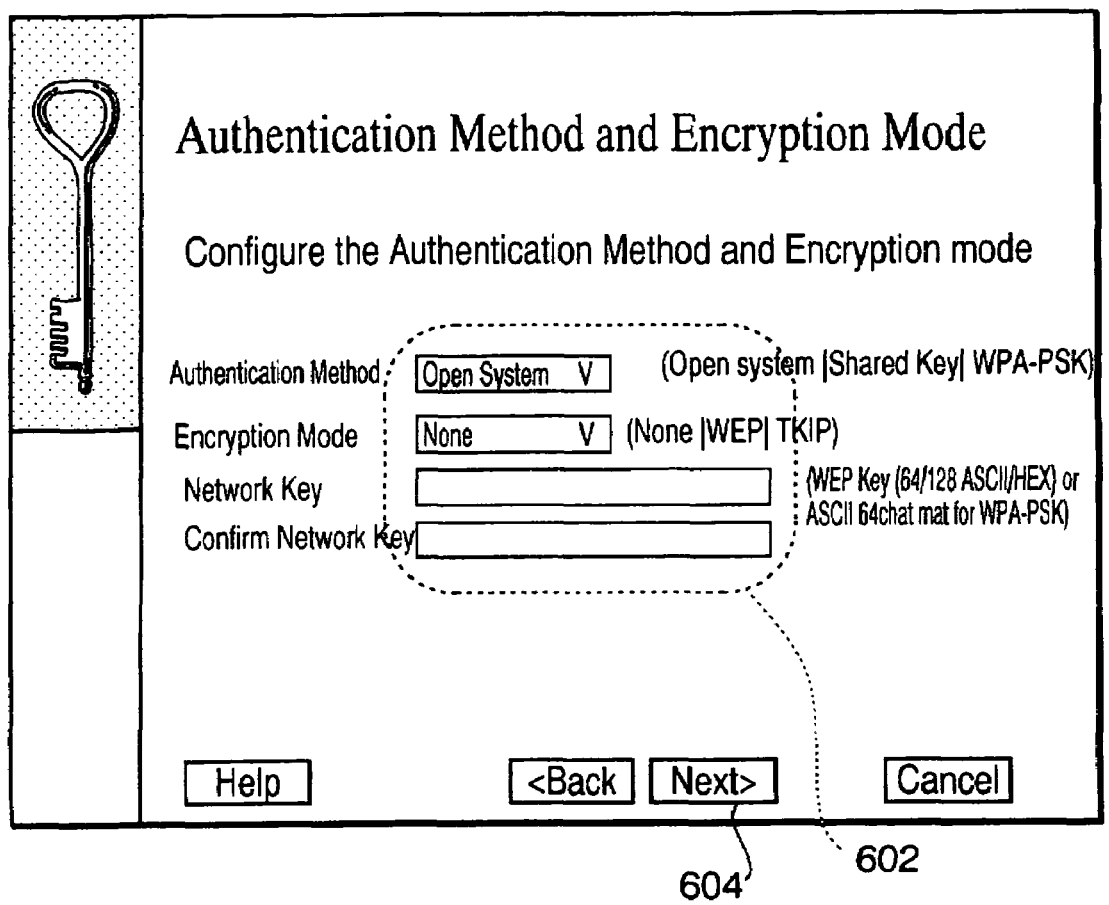
FIG. 22 shows an example of a security setting screen.

In S600, control displays a security setting screen (FIG. 22) for allowing the user to input security settings on the display 37, and allowing the user to confirm the settings (i.e., to perform the "Next" operation by operating a "Next" button 604 on the screen. When the security setting screen is displayed, the user can input various settings related to the security in the input boxes 602. When the user operates the "Help"

button, a process of displaying the explanations of the input items on the security setting screen. Such a process is well known and description will be omitted for the sake of the brevity. When the user operates the "Next" button 604, information regarding the security as set is created and stored in the RAM 33.

When the user performs a confirming operation after execution of S600, control displays a setting confirmation screen (see FIG. 23) indicating the pieces of information stored in the RAM 33 which were set by the end of S600 (i.e., the information regarding the IP address: S400, information regarding the wireless access point: S570, S574, S538, S586 and S598) and information regarding the security settings on the display 37 for the user to confirm the same, and allows the user to operate a "Next" button 704 for confirmation (S700).

According to this embodiment, the setting confirmation screen is provided with a check box 702, which is to be checked before the confirming operation if the user wishes a test print of the settings is performed by the printer 20 which is the target device.

When the confirming operation is performed, control transmits necessary instructions to the target device (S800). Specifically, this process is to transmit the instruction data for actuating a remote setup to the target device. The process (i.e., a setting transmitting procedure) will be described referring to FIG. 24.

In S802, a screen indicating the remote setup of the target device is in progress (similar to the screen shown in FIG. 6) is displayed on the display 37. Then, control generates instructions to be transmitted to the target device (S804). Specifically, control generates an SNMP set packet for registering the information stored in the RAM 33 in the processes by the end of S600, information regarding the security settings, test print information indicative of necessity of the test print which is determined in accordance with the checked condition of the check box 702 of the security setting screen shown in FIG. 23, the device identification information indicative of the MAC address of the target device etc. with the database of the target device as the information regarding the communication settings.

Next the instructions (i.e., SNMP set packet) generated in S804 are transmitted to the target device by broadcast (S806). The target device, when receives the SNMP set packet, registers the respective parameters contained in the SNMP set packet with the database as those related to the connection settings. Thereafter, the wireless communication between the target device and the wireless access point is established based on the thus stored parameters (communication path being changed from (2) to (3) in FIG. 1). Further, if the "test print information" indicates that the test print is to be performed, the printer 20 executes the test print.

As above, the SNMP set packet is for making the connection settings of the target device to the wireless access point, and by sending the SNMP set packet, the instructions to the target device can be done. It should be noted that the SNMP set packet is broadcast with the MAC address of the target device being included. The target device judges, based on the MAC address contained in the SNMP set packet, whether the packet is directed to the target device. When it is determined that the SNMP set packet is directed to the target device, the parameters are registered with the database.

In S808, control transmits an SNMP GET request packet requesting for the same information as contained in the SNMP set packet transmitted in S806 to the target device. Thereafter, control receives the SNMP reply packet for a predetermined period (two seconds in this embodiment) to collect the same.

In S810, control then determines whether the information contained in the SNMP reply packet received in S808 is exactly the same as the information contained in the SNMP set packet transmitted in S506.

Figure 25A:
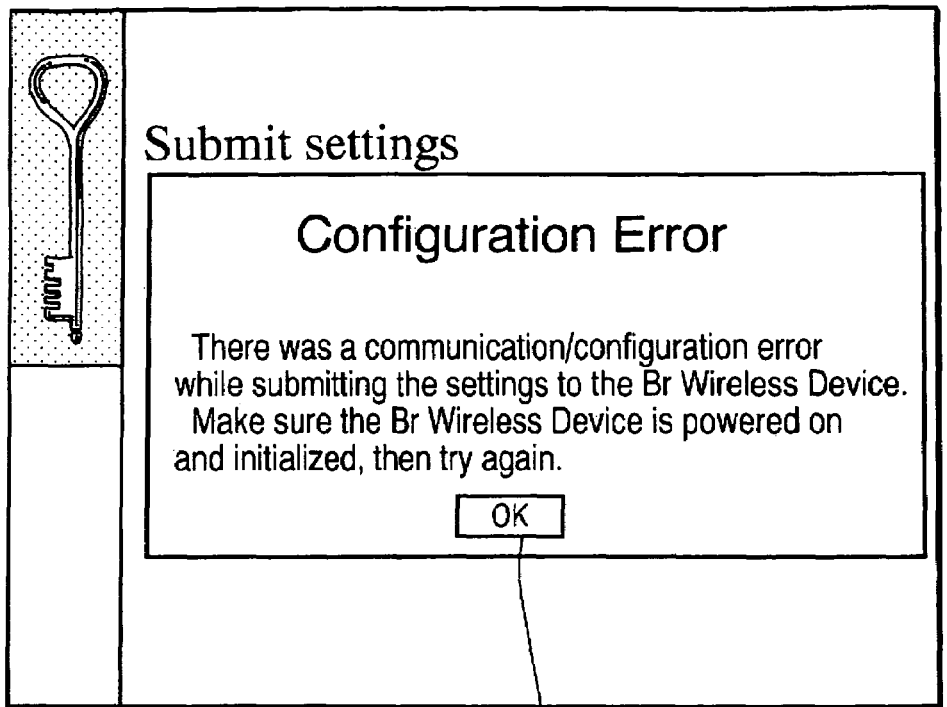
FIGS. 25A and 25B show a setup completion screen and a setup error screen.

If the information included in both packets is not the same (S810: NO), a setting error screen (FIG. 25A) indicating that the connection settings were not made correctly is displayed on the display 37, and allowing the user's operation (an operation to select an "OK" button 802) in S812. When the user operates the "OK" button 802, control terminates the remote setup operation without executing S900, which will be described later.

Figure 25B:
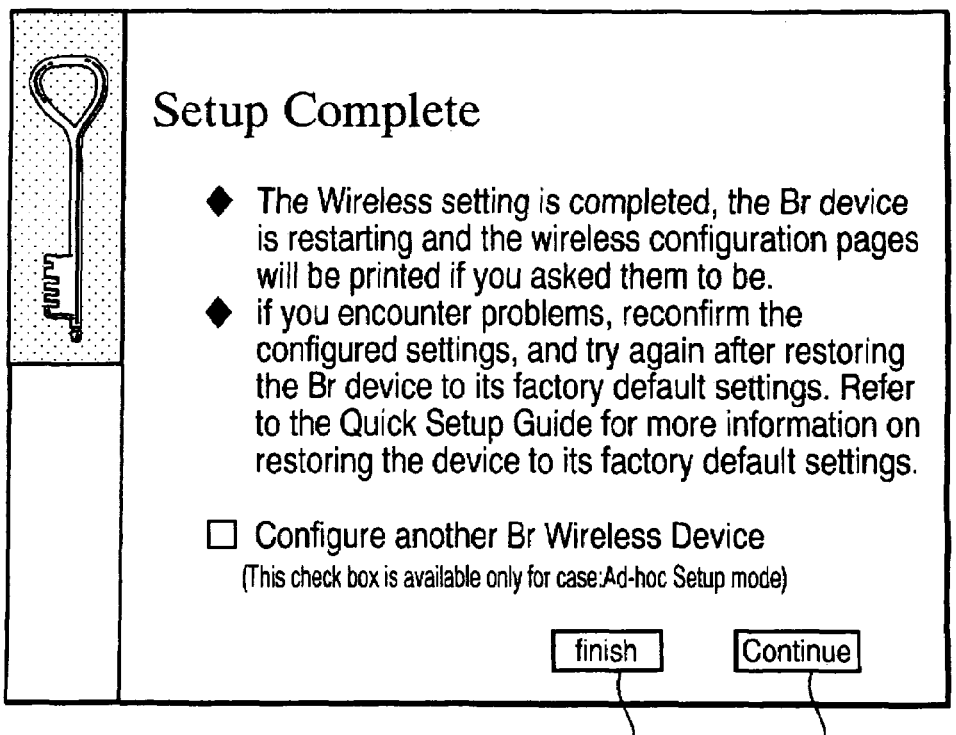

If the information of both packets are exactly the same (S810: YES), control displays a setting completion screen indicating that the connection settings are successfully made on the display 37 (S814). An example of the setting completion screen is shown in FIG. 25B. The screen is provided with a "finish" button 824 to be selected when the user finishes the remote setup with the connection settings having been made are effective, a "continue" button 828 to be selected when the user intends to continue the procedure to perform a further setting for another device, for example. The user can select one of the "finish" button 824 ("finish" operation) and the "continue" button 828 ("continue" operation).

After execution of S814, if the "continue" operation is performed (S816: NO), control returns to S100 and the remote setup procedure is executed from the beginning. If the "finish" operation is performed (S816: YES), the settings transmission procedure is terminated and control proceeds to S900.

Figure 26:
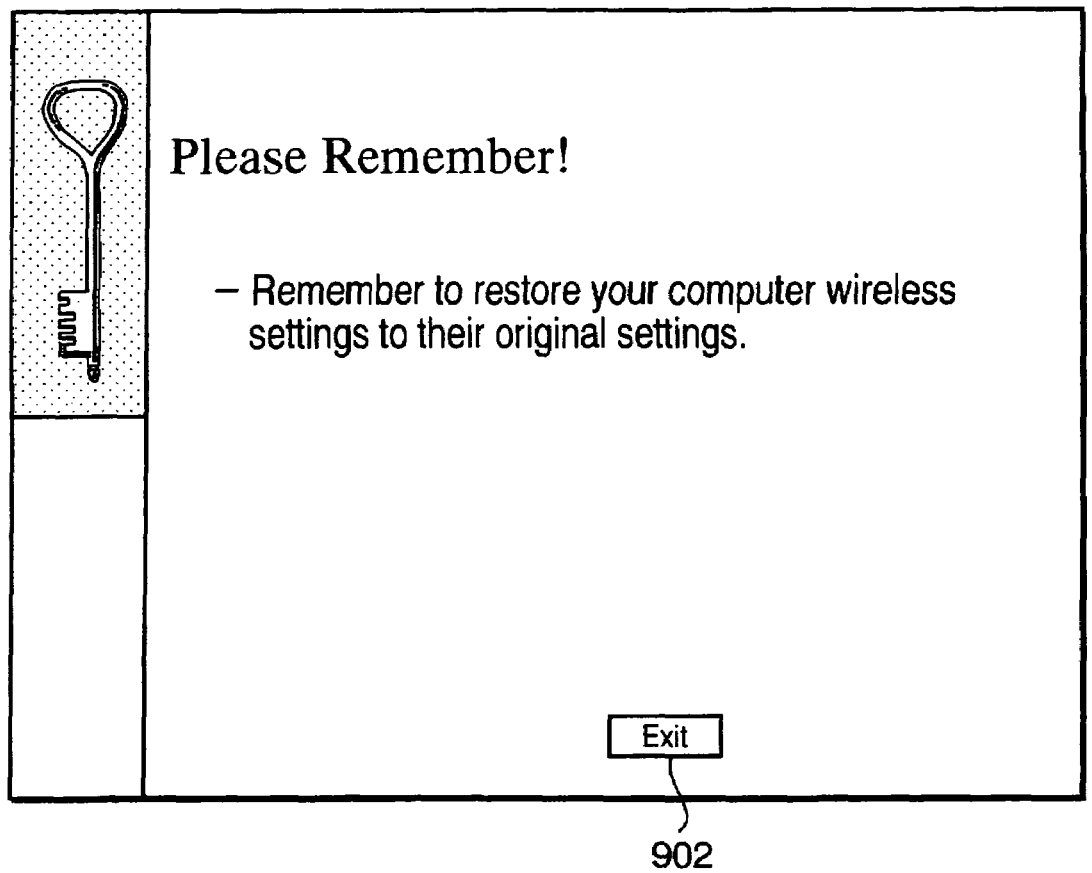
FIG. 26 shows an example of a screen display at the end of the wizard.

When the setting transmission procedure is finished, control returns the procedure shown in FIG. 2, and displays a wizard finish screen (FIG. 26) indicating that the remote setup procedure using the wizard is finished on the display 37. Then, in response to the user's confirming operation (i.e., operation of selecting an "Exit" button 902) in S900, the remote setup procedure is finished.

After the remote setup using the PC 30 is finished, if the user returns the settings relating to the wireless communication in the PC 30 to those before the remote setup procedure is executed (change the path form (2) to (1)), the wireless communication of the PC 30 with the access point 10 can be realized again.

Command Procedure of Printer 20 (or PC 40)

Figure 27:
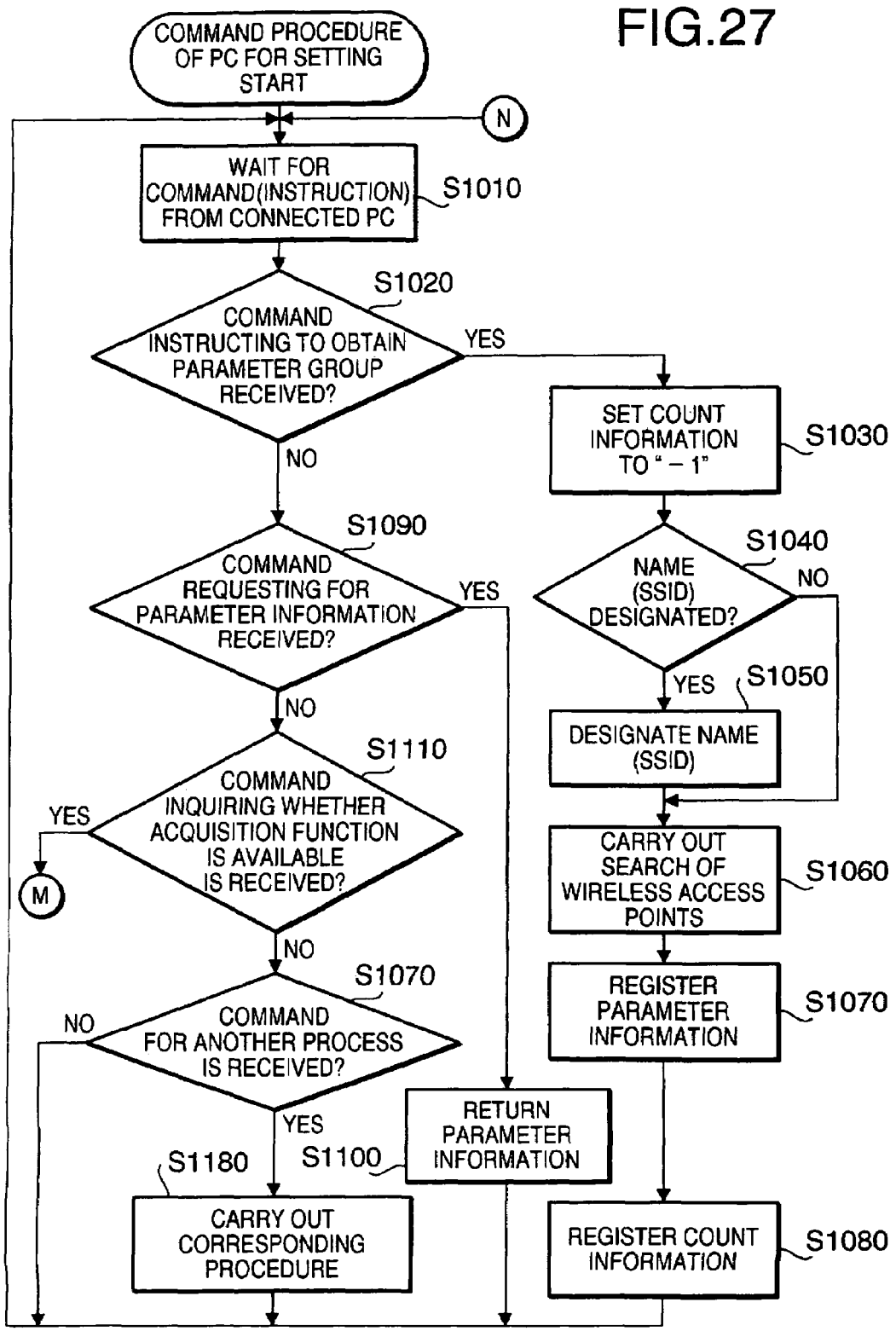
FIGS. 27 and 28 shows a flowchart illustrating a command processing procedure.
Figure 28:
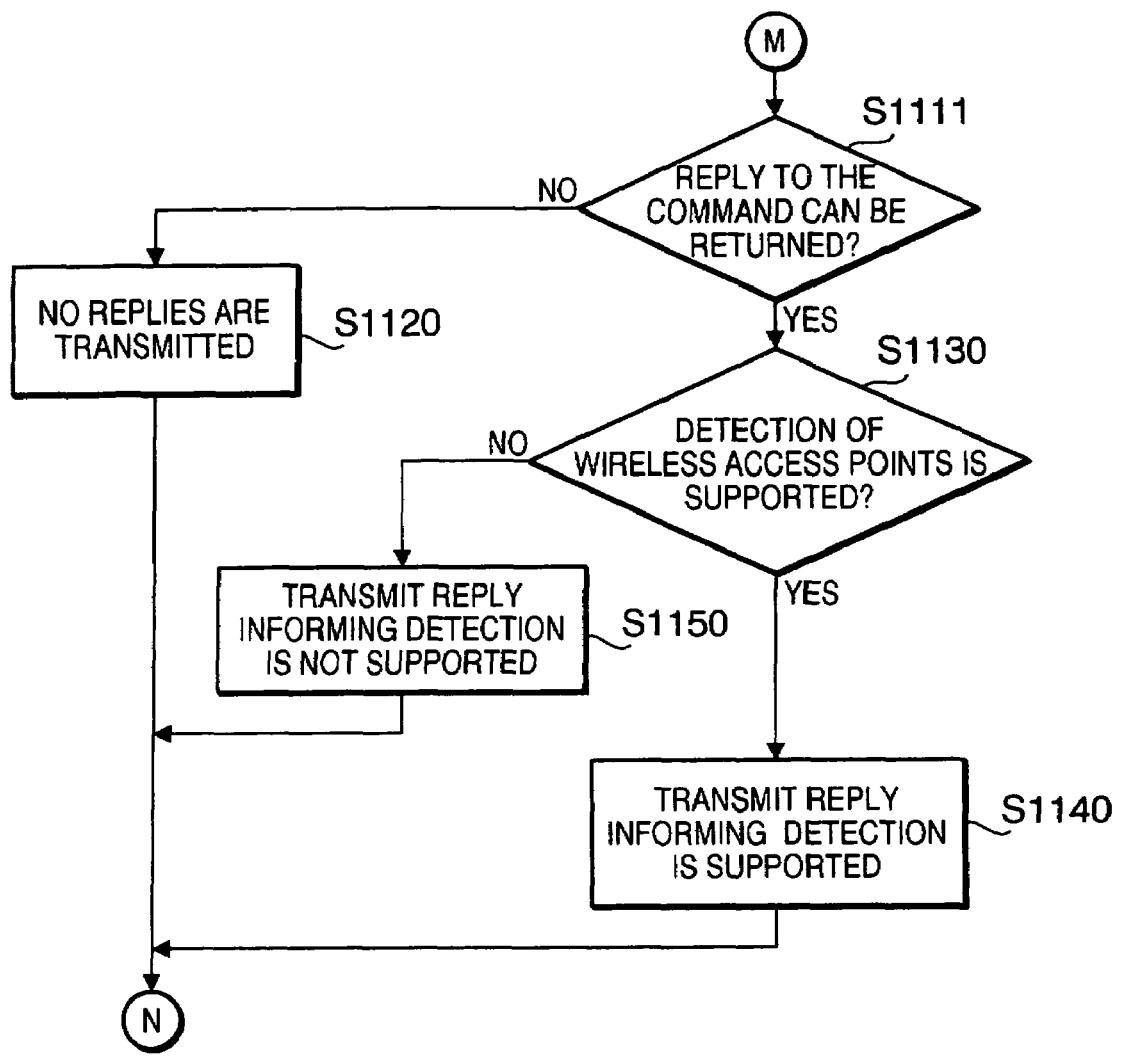

Hereinafter, a command procedure executed by the printer 20 (or the PC 40) in response to the instruction from the PC 30 will be described with reference to FIGS. 27 and 28. The command procedure is repeatedly executed after the printer 20 (or the PC 40) is started up.

In S1010, control waits for receipt of the instruction from the PC 30. Specifically, control receives the unicast packet in which the IP address of the printer 20 (or PC 40) is designated or a broadcast packet, and if the MAC address of the printer 20 (or the PC 40) is contained in the received packet, control determines that the instruction is received.

When control determines that the instruction (command) of the PC 30 is received in S1010, control proceeds to S1020 and judges whether the instruction (command) instructs to obtain the parameter group. If the command instructs to obtain the parameter group (S1020: YES), control sets the "count information" of the database to "−1" (S1030). The instruction to obtain the parameter group is, for example, the instruction issued when step S506 of FIG. 11 is executed.

When the command received from the PC 30 is to obtain the parameter group (S1020: YES), control judges whether the command designates the parameter (SSID and channel) in S1040. The command designating the parameters is, for example, the command transmitted from the PC 30 when S578 (FIG. 19) is executed.

If the parameters are designated (S1040: YES), control designates the parameters as well (s1050), while if the parameters are not designated in the command (S1040: NO), control executes searching of the wireless access points without designating the parameters (S1060).

Specifically, control receives the beacon signals that are periodically transmitted by the wireless access points around the printer 20 (or the PC 40), and obtains for each wireless access point, the parameter group including the device name, IP address, MAC address, wireless LAN standards to be used for the wireless communication and communication channel at the wireless communication. Incidentally, in S1060, similar to the procedure in S578-S580 of FIG. 19, control may transmits a probe request and obtains the parameter group included in the probe reply transmitted in response to the probe request.

In S1070, control registers the information indicative of the parameter groups obtained in the searching process of S1060 (i.e., first to n-th pieces of parameter information) with the database in relation with the access points. In this case, if the parameters are designated, only the parameter groups containing the designated parameters as a part thereof are registered with the database.

Then, control registers count information representing the number of the parameters (i.e., the number of the access points) collected by the procedure in S1060 with the database (i.e., the database is updated) in S1080, and returns to S1010.

If the command from the PC 30 requests for the parameter group of one of the wireless access points that have been registered with the database in S1070 (s 1020: NO, S1090: YES), control returns the parameter information of the requested wireless access point (i.e., one of the first to n-th pieces of the parameter information) in S1100, and control returns to S1010. The command requesting for the parameter groups is, for example, the SNMP GET request packet issued in S516 of FIG. 11.

As the parameter information to be returned in S1100, if it is the parameter information of the wireless access point designated by the command, not only the information registered with the database in S1070 at the last execution of S1070 but the information registered with the database at S1070 in the past, or the information registered with another database may be used.

If the command from the PC 30 includes an inquiry whether the printer 20 (or the PC 40) has the acquiring function (S1020: NO, S1090: NO, S1110: YES), control checks whether it can reply to the command (i.e., send a reply to the inquiry) in S1111 (FIG. 28). If the information (object) indicating the "availability of the acquiring function" in the database, control is in condition to replay to the inquiry, while no such information is registered, control is not in the condition to send a reply. It may be modified such that, if the information is not registered, a reply may be sent to indicate that the object is "No Such".

In S1110, if control cannot reply to the command (S1111: NO), control returns to S1010 without replying to the command (S1120). If control can reply (S1111: YES), it judges whether detection of the wireless access points is supported (S1130). Specifically, control determines that detection of the wireless access points is supported if control determines, based on the contents of the "availability of acquiring function" registered with the database, that the printer 20 has the acquiring function. If the "availability of acquiring function" indicates that the acquiring function is not available, control determines that the printer 20 does not support the detection of the wireless access points.

In the process in S1130, if control determines that detection of the wireless access points is supported (S1130: YES), control transmits a reply indicating that the detection of the (S1130: NO), control transmits a reply indicating that detection of the wireless access point is not supported (S1140). If it is not supported (S1150). Thereafter, control returns to S1010.

If the command from the PC 30 is none of the above (i.e., other commands) (S1020: NO, S1090: NO, S1100: NO, S1170: YES), control executes process corresponding to the received command (S1180), and returns to S1010. Specifically, the process executed in S1180 may include, for example, registration of information with the database based on the SNMP set packet transmitted from the PC 30 in S806.

Figure 23:
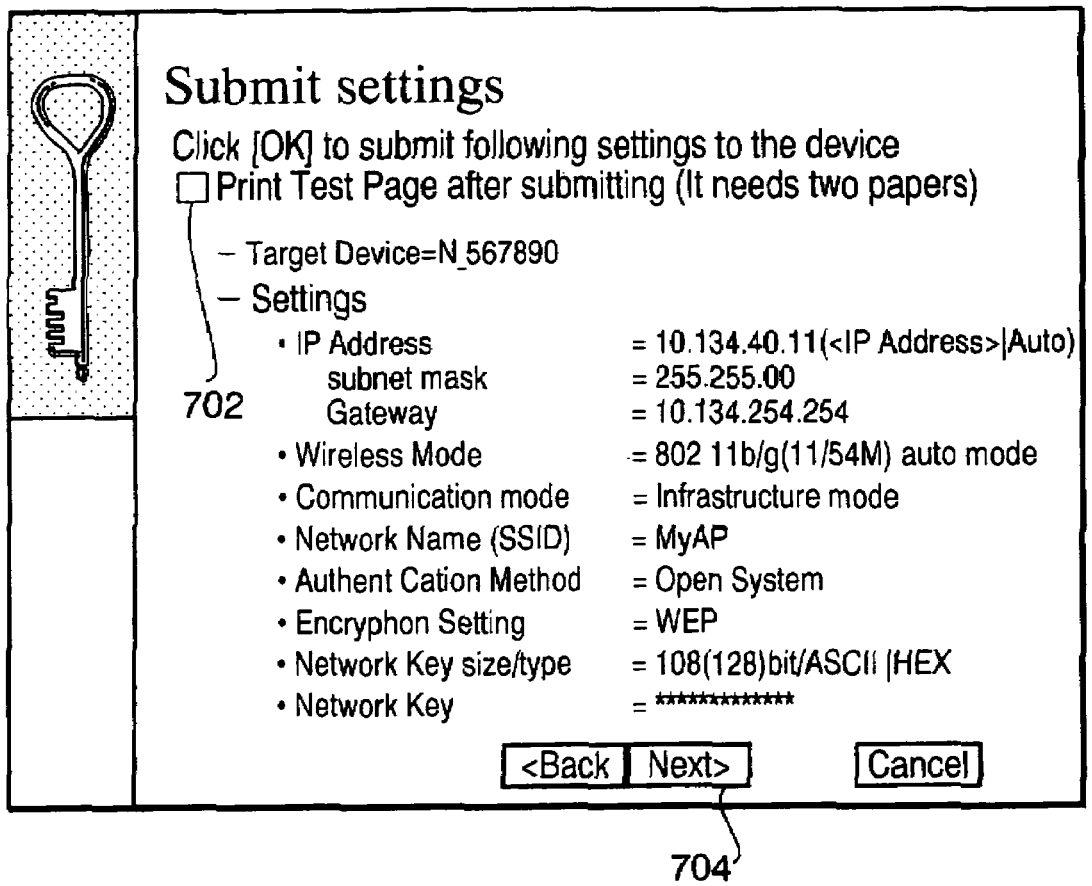
FIG. 23 shows an example of a setting confirmation screen.

Incidentally, in regard with the SNMP set packet transmitted in S806 of FIG. 23, by the process in S1180, the information stored in the RAM 33 by the processes in S600 and the information regarding the security are set, and the test printing is executed in accordance with the "test print information".

According to the PC 30 configured as above, in S502 (FIG. 11), control judges whether the target device (printer 20) has a function of executing a part of the setting procedure (i.e., the acquiring function), and based on the judging result, operation thereafter is varied. Since the pattern of commands can be varied in accordance with whether the target device has a function of modifying the settings thereof, it becomes possible to avoid the target device from being terminated after the command is transmitted from the PC 30.

The PC 30 can instructs the target device to obtain necessary parameter groups when it is determined to have acquiring function. Then, the PC 30 can obtain the thus collected parameter groups at the target device by request. In particular, the PC 30 can request for the parameter groups obtained by the target device at a timing when they are obtained, i.e., at the timing when the PC instructs the target device to obtain the parameter groups.

Further, the PC 30 can instruct the target device to change the setting items for the connection settings to have contents indicated by the parameter group of a user-selected wireless access point selected in S544 of FIG. 13.

Figure 24:
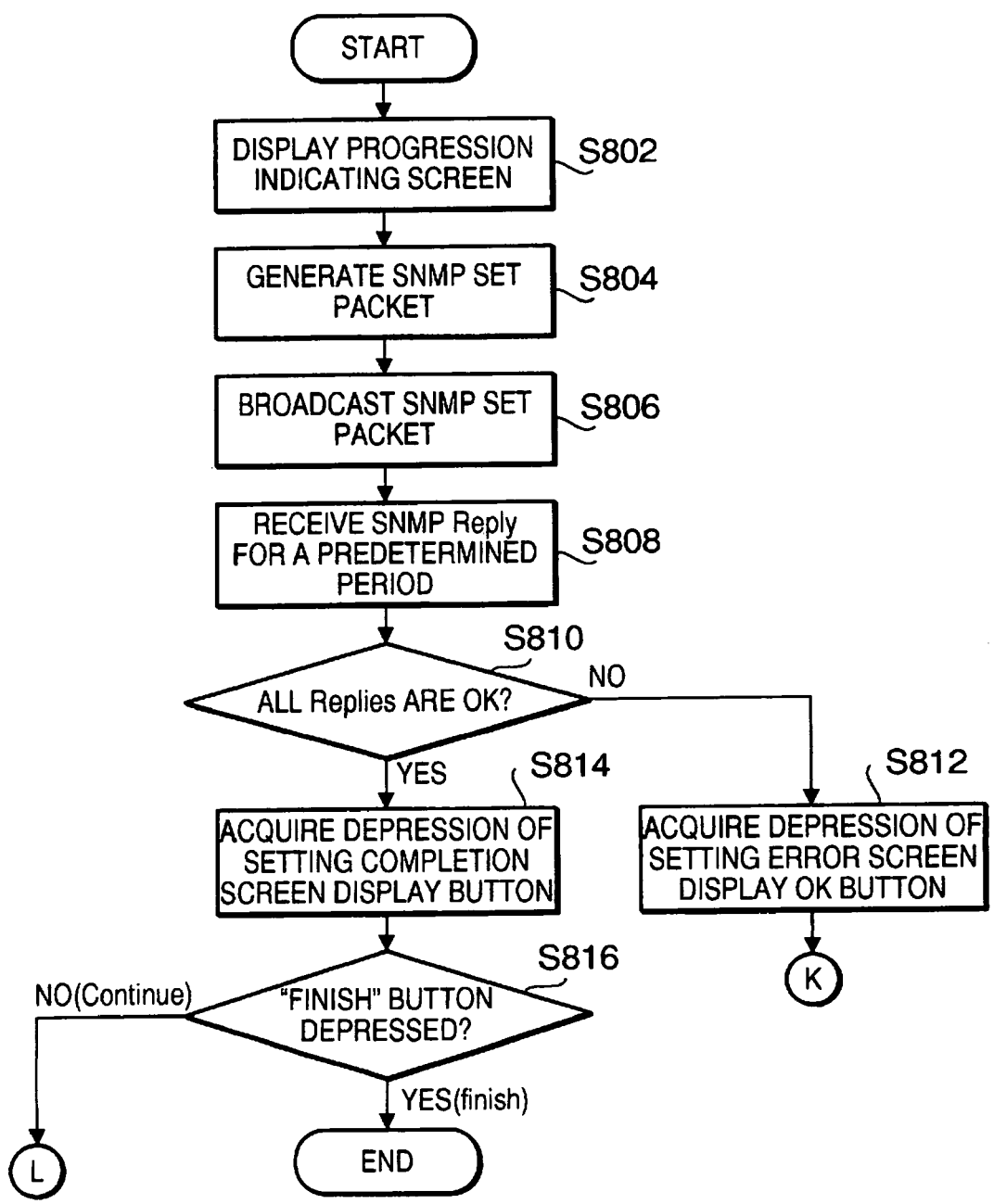
FIG. 24 is a flowchart illustrating a setting transmission procedure.

When the PC 30 determines that the target device does not have the acquiring function in S502 of FIG. 11, if in S552, "Direct Input" is selected, control proceeds to S568-S574 in which a part of the parameter group can be input by the user. Then, the PC 30 can change the connection settings of the target device to the settings according to the parameter group including parameters input by the user in S806 (FIG. 24).

Still further, even when the PC 30 determines that the target device does not have the acquiring function in S502 of FIG. 11, if the user selects the "Search by Computer" representing that an access point is selected from among one selected by the PC 30 (S552 of FIG. 15), the access points corresponding to ones obtained in S576-S588 of FIG. 19 are presented for user to select. Then, the PC 30 changes the items for the connection setting at the target device to the contents represented by parameter group of a user-selected wireless access point, which is selected by the user from among the parameter groups obtained by the PC 30.

Even when the PC 30 determines that the target device does not have the acquiring function in S502, if "Search by another BrDevice" has been selected in S552, it is possible to have the user select one of the wireless access points corresponding to the parameter groups obtained from other devices in S590-

S598 in FIG. 20. Then, the PC 30 changes the items for the connection setting at the target device to the contents represented by parameter group of a user-selected wireless access point, which is selected by the user from among the parameter groups obtained by the PC 30.

In S592-S598 (FIG. 20), PC 30 requests devices which can communicate with the PC 30 using the SNMP GET request packet to ask whether they have the acquiring function. Then, the PC 30 allows the user to select one of the devices which have returned the SNMP reply packets in response to the SNMP GET request packet, and obtains the parameters of the device selected by the user. In the above process, when letting the user to select the device, based on the availability of the acquiring function included in each SNMP packet to identify devices having the acquiring functions. Then, make such devices be subject to the selection.

AS above, a user-selected device can be used as a device for obtaining the parameter groups. Therefore, even if there are a plurality of devices that can perform data communication with the PC 30, it is ensured that the user-selected device is used for obtaining the parameter groups.

Further, according to the above configuration, it is possible to distinguish the device(s) having the acquiring function by inquiring and receiving the replies. Therefore, it is unnecessary to store data indicating which ones of the devices can perform the data communication with the PC 30 and further have the acquiring function in advance in the PC 30.

The device which is instructed to obtain the parameter groups sets the "count information" to −1 in S1030 (FIG. 27), and then starts the detection of the wireless access points (i.e., the parameter groups). Further, after the detection (i.e., the parameter groups have been obtained), the device registers the number of the detected wireless access points with the "count information".

Thus, if the device (which is instructed to obtain the parameter groups) receives a command requesting for the obtained parameter groups before it has not obtained the parameter groups, it returns the SNMP reply packet indicting that the "count information" is "−1" in S1100. If such an SNMP reply is received (that is, if the PC 30 instructs the device to obtain the parameter groups in S506, and receives the SNMP reply containing the "count information" having a value of "−1"), it returns control to S508 to re-request for the parameter groups.

As above, since the PC 30 can recognize whether the user-selected device has finished obtaining the parameter groups based on the value of the "count information", and if not, re-request for the parameter groups. Thus, it is ensured that the parameter groups can be collected after the device has finished obtaining the same.

The application software for the remote setup implemented in the PC 30 is configured to execute the remote setup using the wizard. In the setup process, images indicative of the progress of the setup process are displayed on the display 37 one after another in response to the confirming operation by the user. Thus, it is ensured that the user performs necessary steps for the connection setting one by one, without omitting/skipping a single necessary step.

In the printer 20 (or the PC 40), by means of the SNMP agent, acquisition of the parameter groups, transmission of the parameter groups and change of the setting items can be performed in accordance with the instructions represented by the SNMP GET request packet and/or SNMP set packet from the PC 30. Further, in response to the instructions contained in the SNMP GET request packet from the PC 30, the printer 20 (or the PC 40) can notify that it has the acquiring function (or does not have the same) by returning the SNMP reply packet.

If the printer 20 (or the PC 40) has not finished obtaining the parameter groups when it receives, from the PC 30, the request for the parameter in S1100 (FIG. 27), it returns the SNMP reply packet indicating the "count information" is set to "−1". That is, with the value of the "count information" (whether it is "−1" or not), whether the parameter groups have been obtained or not is notified to the PC 30.

According to the above-described embodiment, the data communication regarding the connection setting among the devices can be performed easily by use of the generally-used SNMP.

In the PC 30 configured as above, the parameter groups obtained from the wireless access points are displayed as a list in S532 (FIG. 13) and S582 (FIG. 19) based on the Access Point/Base Station list.

In the Access Point/Base Station list, the wireless access points whose SSIDs are closed to public are excluded when the parameter groups are registered with the list in S528 (FIG. 12) and S592 (FIG. 19). Therefore, for the wireless access points whose SSIDs are open to public, the parameter groups are listed, while the parameter groups are not displayed for the wireless access points whose SSIDs are not open to public.

Therefore, when a beacon signal is received from a wireless access point which transmits a beacon signal that does not include the SSID, other parameters included in this beacon signal will not be displayed. As a result, such a wireless point will not be selected by the user since it is not displayed in the list. With this configuration, the user will not be required to select the parameter corresponding to another wireless access point because of the selected one corresponds to the wireless access point whose SSID is closed to public. That is, with this configuration, unnecessary operation as above can be avoided.

In the first embodiment, the PC 30 performs the remote setup of the printer 20. In generally, according to the configuration of the first embodiment, the connection setting with respect to a communication terminal that can communicate with the PC 30 and functions as a wireless station can be made indirectly. Normally, a device like a printer does not have a user interface such as that of the PC 30, which has a relatively higher operability. According to the configuration described above, by use of the device (PC 30) having a user interface of high operability as a device that can perform data communication with the printer 20, the operability, in particular for configuring its communication setting, can be improved.

In the embodiment, PC 30 collects the parameter groups of the wireless access points (S516-S522 of FIG. 11 and S578-S580 of FIG. 19). Then, the PC 30 determines whether a predetermined parameter (e.g., SSID) of each parameter group has a value indicating that communication through the wireless access point is disabled (the wireless communication is inhibited), and then display the list in which the parameter groups which can communicate through the wireless access point (S526 of FIG. 12 and S581 of FIG. 19).

According to the first embodiment, the PC 30 collects the parameters input by the user as a parameter group in steps S541 onwards (FIG. 12). The thus collected parameter groups can be displayed as a part of the Access Point/Base Station list after the S576-S584 are executed. It should be noted that the user-input parameter groups can be displayed together with the parameter groups having already been registered in S581 and S582.

The PC 30 is capable of instructing to change the setting items of the connection setting of the target device (e.g., the printer 20) to the contents represented by the parameter group included in the SNMP set packet by transmitting such an SNMP set packet in S806 (FIG. 24).

The PC 30 can determine whether a predetermined parameter (e.g., SSID) included in the parameter group obtained in S577-S580 (FIG. 19) has a value representing that the communication through a wireless access point is disabled (inhibited) based on the parameter input by the user in S543 (FIG. 13), and then, performs the connection setting to realize the wireless connection.

The PC 30 is capable of instructing the target device (e.g., the printer 20) to obtain the parameter groups necessary for the connection setting (S506 of FIG. 11). Then, the PC 30 requests for the parameter groups collected by the devices, and obtains the same. In this case, the PC 30 can request for the parameter groups at a timing when it instructs to obtain the parameter groups (i.e., it instructs the target device to sent the parameter groups upon obtaining the same).

The PC 30 is capable of instructing, in S806 (FIG. 24), the target device to change the connection settings thereof to the contents represented by the parameter group of the wireless access point selected by the user in S543 (FIG. 13).

The PC 30 is capable of allowing the user to input a part of the parameter group in S568-S574 (FIG. 17) if the "Direct Input" is selected by the user in S552 (FIG. 15). Then, the PC 30 is capable of changing the setting items for the connection setting of the target device to the contents represented by the parameter group input by the user in the process up to S806 of FIG. 24.

The PC 30 allows the user to select a desired wireless access point from among the wireless access points corresponding to the parameter groups obtained by the PC 30 in S576-S580 (FIG. 19) if the "Search by Computer" is selected by the user in S552 (FIG. 15).

If the "Search by another BrDevice" is selected in S552 (FIG. 15), the PC 30 allows the user to select a wireless access point from among the wireless access points corresponding to the parameter groups obtained by another device in S590-S598 (FIG. 20). Then, the PC 30 changes the setting items for the connection setting of the target device to the contents represented by the parameter groups corresponding to one selected by the user from among the parameter groups the PC 30 obtained from the another device.

The application software for the remote setup implemented in the PC 30 is configured to perform the remote setup process in accordance with the wizard. Accordingly, the process for realizing the connection setting interrupted and images each notifying progress of the setting process are displayed on the display 37 one after another. After the user's confirmation is input, the process continues, and such an interruption and display of the notification image are repeated. With this configuration, it is ensured that the user performs the necessary process step by step, and that all the steps are performed without fail.

The above-described exemplary embodiment can be modified in various ways without departing from the scope of the invention.

In the first embodiment, the invention is applied to the printer and the PC. The devices to which the invention is applicable are not limited to those of the first embodiment, but to any device that functions as a wireless station (e.g., a copier, a scanner, a facsimile machine, a multi-function peripheral having a combination of more the one of such functions or file server), the invention can be applied.

In the first embodiment, each process is described to be realized as a program is executed by the CPU of the PC or printer. However, it is only an exemplary embodiment, and a part of or all of the process can be realized by hardware provided with logic circuitry.

In the first embodiment, the data communication regarding the connection settings among the devices is performed using the SNMP. However, any other communication standard and communication method can be employed when it realizes the similar effect. Such a standard may be: HTTP; HyperText TransferProtocol, SOAP; Simple Object Access Protocol, UDDI; Universal Description, Discovery and Integration, LDAP; Lightweight Directory Access Protocol, and SSDP; Simple Service Discovery Protocol. Such a communication method may include WSDL (Web Services Description Language) and bidirectional communication using Port 9100.

In the first embodiment, when the PC 30 receives the command inquiring whether the acquiring function is available, it replies to inform of whether the detection of the wireless access points is supported, based on the "availability of acquiring function" of the database (S1100-S1150). This process may be modified such that the reply is not made when the detection of the wireless access points is not supported. Such a modified configuration will be described hereafter in detail.

Figure 29:
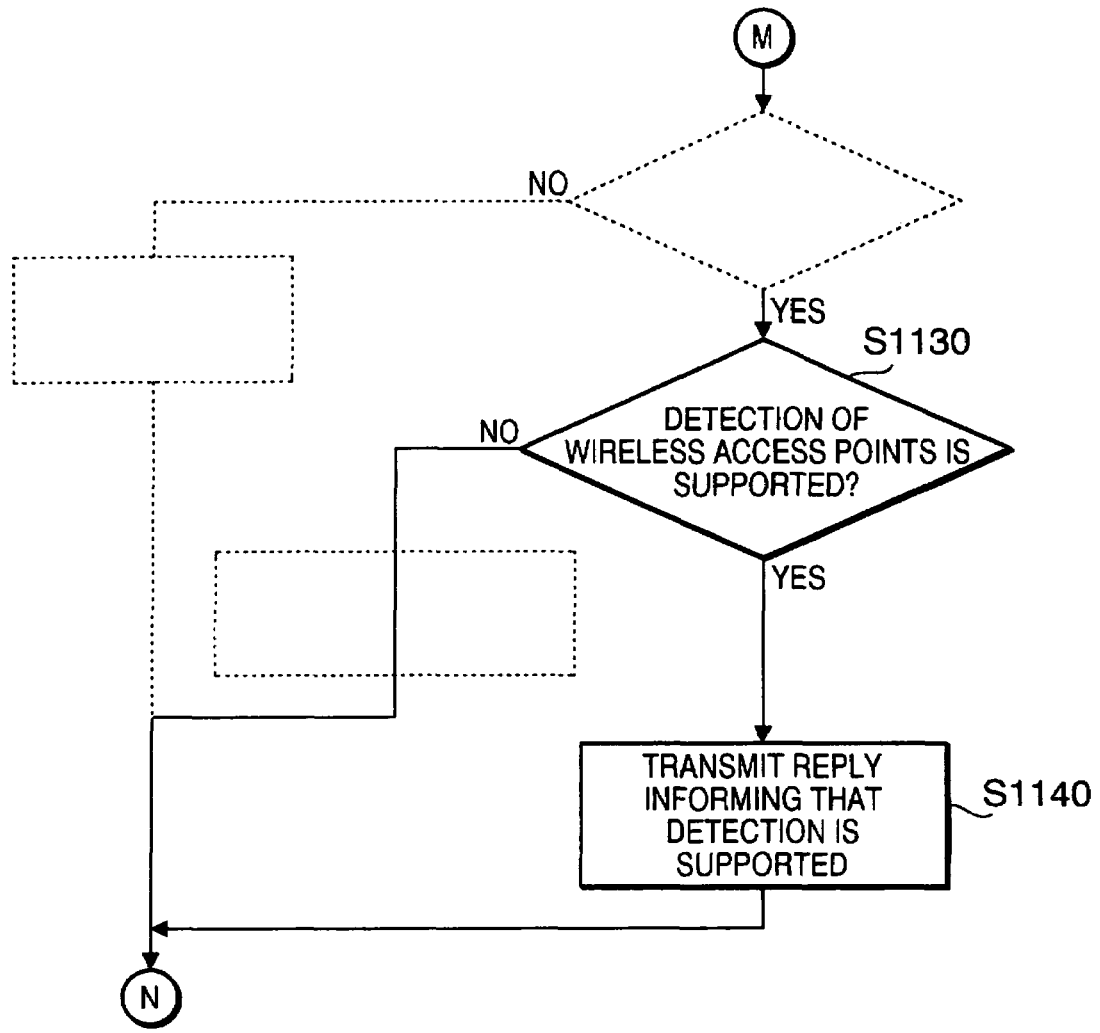
FIG. 29 shows a flowchart illustrating a difference of a command processing procedure according to a second embodiment.

FIG. 29 shows a flowchart according to the modification of the first embodiment. FIG. 29 replaces FIG. 28. As shown in FIG. 29, S1111 and S1120 of FIG. 28 are omitted, and S1130 is executed when control proceeds from S1110 (FIG. 27) to FIG. 29. Then, if control determines in S1130 that the detection of the wireless access points is not supported (S1130: NO), control returns to S1010 without executing S1140 (which exists in FIG. 28). According to this configuration, when the printer 20 (or the PC 40) does not have the acquiring function it does not return a reply. Therefore, according to the modification, the PC 30 determines that only the devices from which the replies are received have the acquiring function.

The procedure shown in FIG. 20 may be modified such that step S598 is executed for all the devices after step S592, without executing the S594, and S596, and then the information as is obtained in a process similar to that in S594 is displayed as a list. In this case, the user selects one of the listed device, which is determined as the wireless access point to which the target device is wirelessly connected.

The printer 20 in the first embodiment may be configured to have a function of the wireless access point. Such a configuration is convenient since it becomes unnecessary to change the connection setting with respect to the PC 30 before and after the remote setup process.

In the first embodiment, a data communication regarding the connection setting is executed with the PC 30 and PC 40 are wirelessly connected. This may be modified such that a wired connection is used for the data communication between the PC 30 and PC 40.

Transmission of the probe request in S578 in the first embodiment can be modified such that, if the PC 30 includes a plurality of wireless LAN controllers, a different wireless LAN controller is used only when the probe request is transmitted.

In the first embodiment, in S590-S598, the PC 40 is selected to detect the wireless access points. This process may be modified such that a printer (e.g., printer 50 in FIG. 1) having function similar to that of the printer 20 is selected, which is controlled to detect the wireless access points.

In the first embodiment, all the parameter groups of the wireless access points determined in S538 (FIG. 13) are stored in the RAM 33. This may be modified as follows. That is, an input screen similar to that shown in FIG. 18 is displayed before the execution of S500, and part of the parameter group manually input is stored in the RAM 33. Then, in the following processes, parameter groups including the manually input parameter as a part thereof are used. Only the parameters which are not manually input are determined in S538. With this modification, the number of decision branches during the process can be reduced.

In the first embodiment, the SNMP set packet is broadcast in S806, and based on the replay thereto, control diverges to S812 or S814.

In the first embodiment, the user should change the connection setting of the PC 30 so that the wireless communication with the printer 20 can be performed. This can be modified such that application stores the connection settings of such a wireless communication and enables the wireless communication with the printer 20, without requiring the user's operation to change the connection settings. Such a modification will be described hereinafter.

Figure 45:
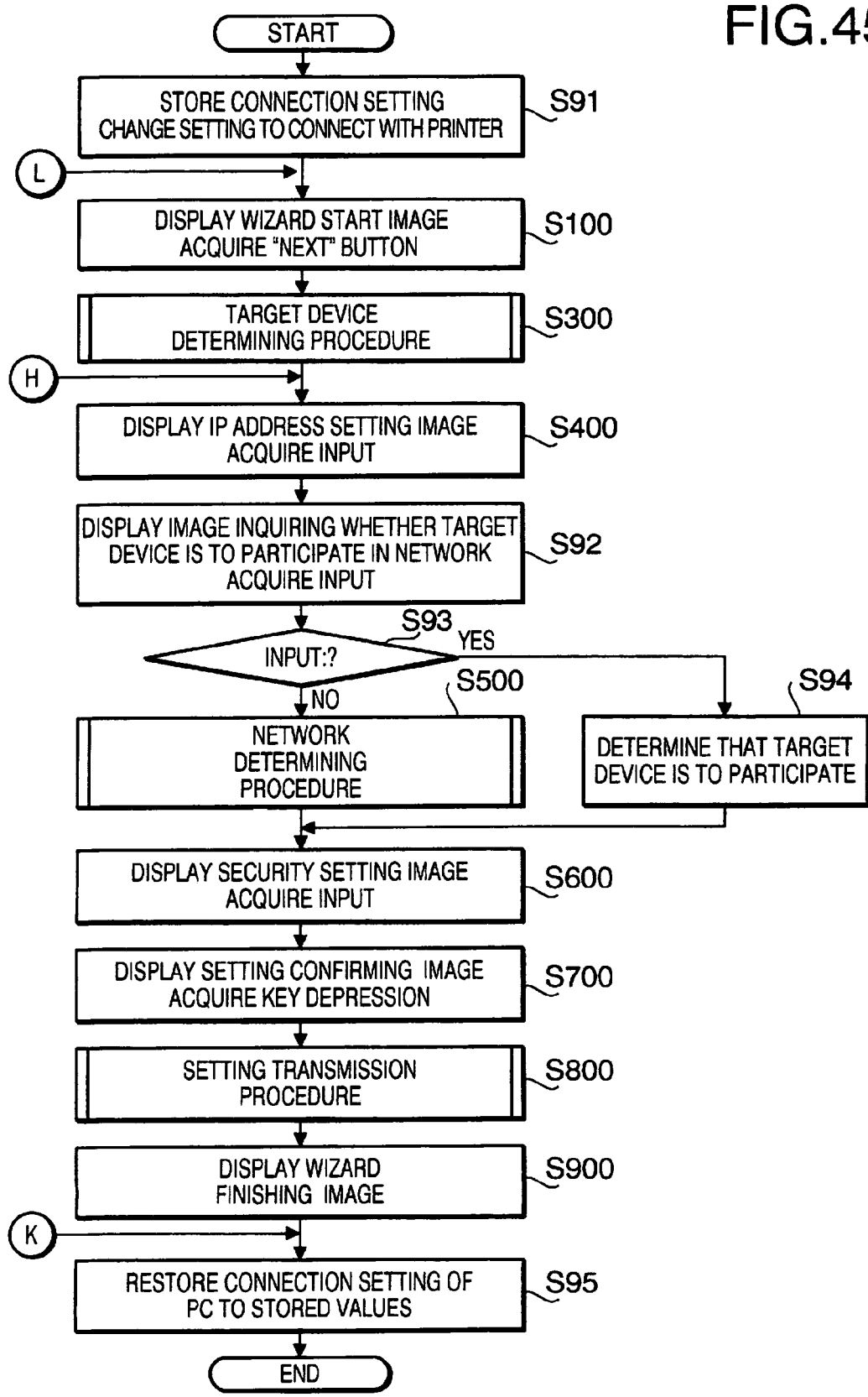
FIG. 45 shows a flowchart illustrating a remote setup procedure according to a first modification of the first embodiment.

FIG. 45 is a flowchart illustrating a remote setup procedure according to a first modification of the first embodiment. In this flowchart, the steps similar to those in FIG. 2 have the same step numbers, and description thereof is omitted.

When the remote setup procedure according to the first (or second) modification is started and application is started up, control executes S91, in which the current connection settings of the PC, which are stored in the ROM 32, are copied to the ROM 32 or RAM 33. Then, the values of the connection settings in the ROM 32 are rewritten so that the PC 30 can perform the wireless communication with the printer 20.

Figure 46:
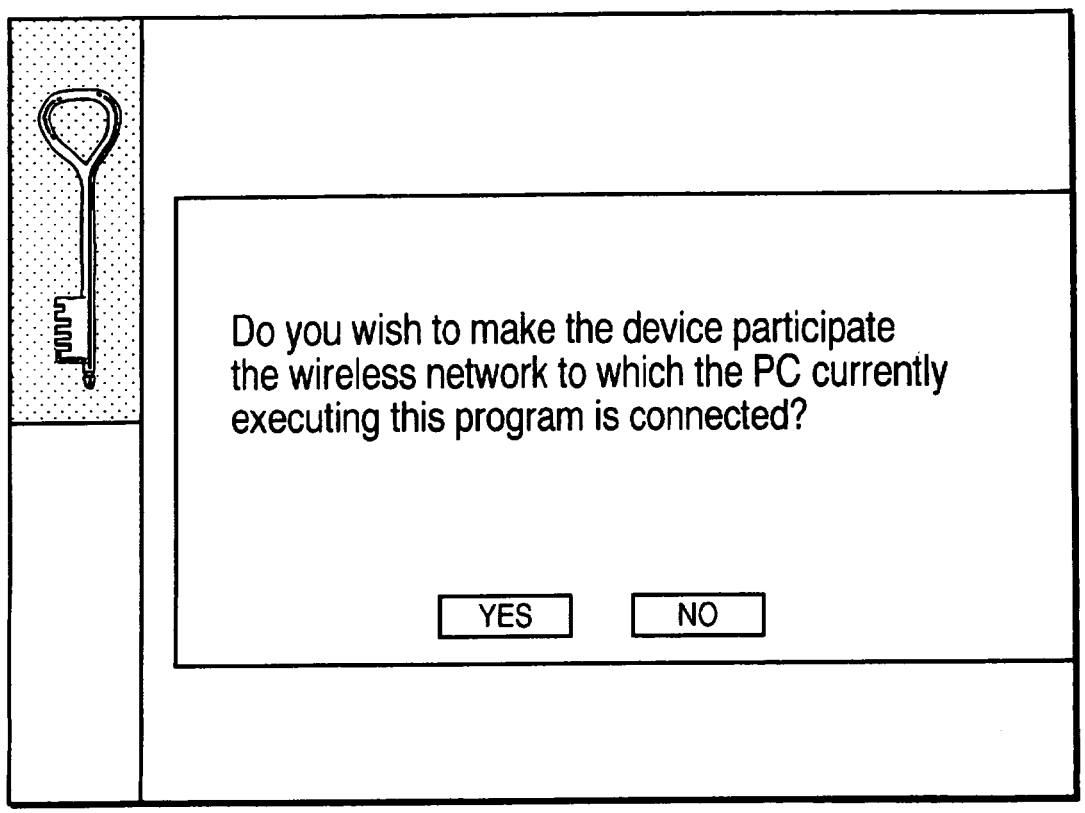
FIG. 46 shows an exemplary image inquiring the user whether the target device is to be participated in the network in which the PC is participating, and acquiring the user input during the procedure shown in FIG. 45.

After S100 and S200 are executed and the printer (target device) subjected to the remote setup and the IP address of the printer are determined, control displays an image as shown in FIG. 46 (S92) inquiring the user whether the target device is to be participated in the network in which the PC 30 is participating, and acquiring the user input.

If the user inputs "NO" (S93: NO), control proceeds to S500. If the user inputs "YES" (S93: YES), control proceeds to S94, where control stores the values of the connection settings in RAM 33, which will be used for the values of the settings to connect with the printer 20.

After S600-S900 have been executed and connection settings are transmitted to the printer 20 and end of the application is input (i.e., "Exit" button is depressed), the values copied in S91 are retrieved and the values in the ROM 32 are overwritten with the retrieved values. Thus, the connection settings in ROM 32 are returned to the values before the application is started up (i.e., before the procedure of FIG. 45 is executed).

According to the above modification, it becomes unnecessary for the user to manually switch the connection settings so that the communication between the PC 30 and the printer 20 can be performed. As the application is started up, the connection settings are automatically switched, and when the application is completed, the connection settings are restored to the values before the application is executed.

Further, according to the above configuration, it is very easy to make the printer join the network to which the PC 30 is connected.

It should be noted that, in the modification above, the security setting is input by the user (S600) as in the first embodiment. If the security settings of the PC 30 is copied in S91, and stored in the RAM 33 in S94 as the setting for the printer, step S600 can be omitted.

Next, a second modification of the first embodiment will be described.

In the first embodiment, when the "ADD" button is selected (FIG. 13, S541: YES), control requires the user to input the SSID of the access point (S542). Then, control confirms (examines) the existence of the access point having the user-input SSID (FIG. 11, S506-S530 and FIG. 19, S576-S583; and FIG. 20, S590-S598), and displays a list. If there is not an access point that has the user-input SSID, control may make the printer 20 join the ad hoc network using the user-input SSID. Such a configuration will be described as the second modification referring to FIG. 47.

Figure 47:
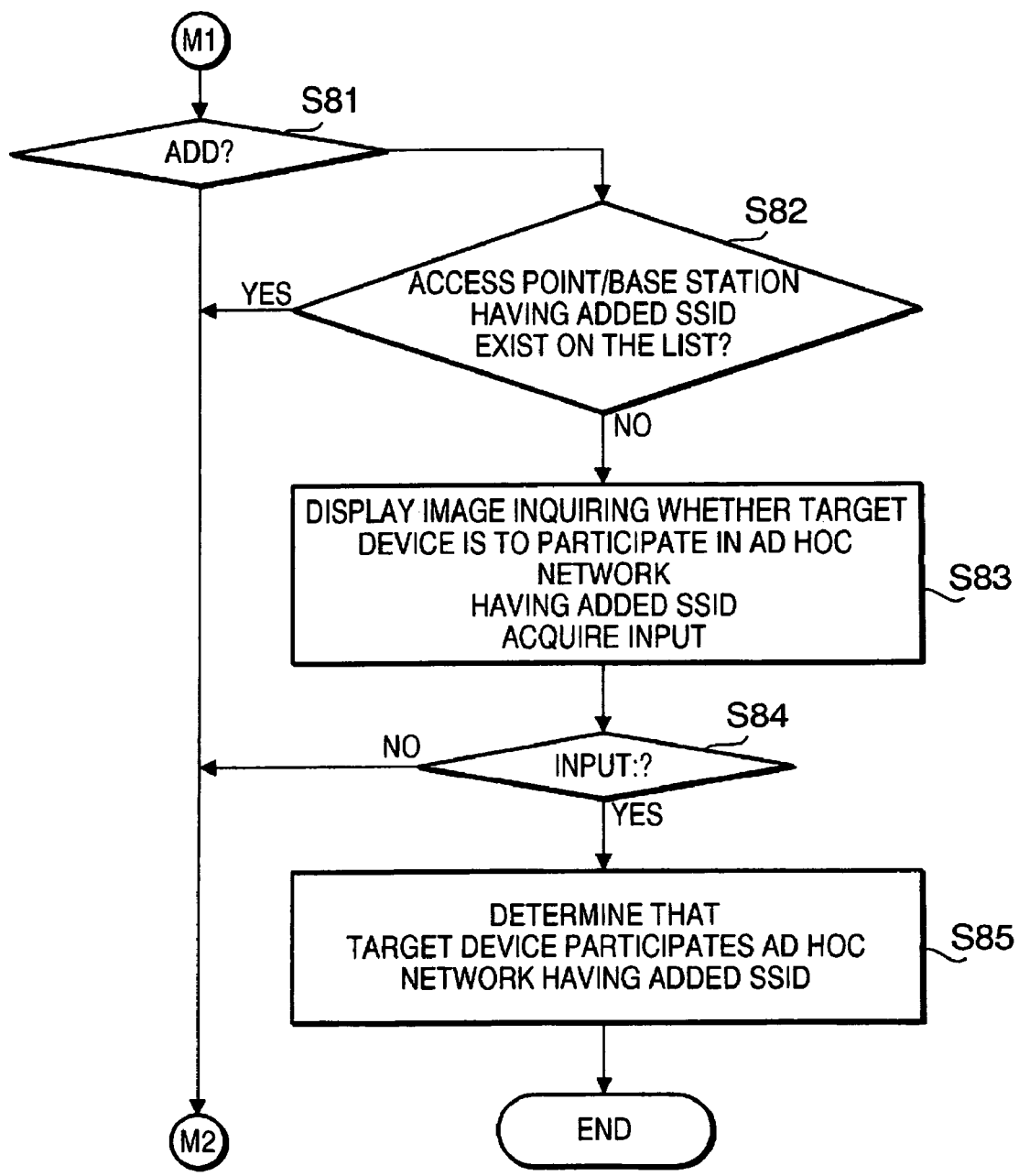
FIG. 47 shows a part of the procedure according to a second modification.

FIG. 47 shows a part of the procedure according to the second modification, which is to be inserted between S530 (FIG. 12) and S532 (FIG. 13), or between S583 and S584 (FIG. 20). That is "M1" follows S530 (FIG. 12) or S583 (FIG. 20), and "M2" is followed by S532 (FIG. 13) or S584 (FIG. 20).

If the user performs the "Add" operation (S541: YES), the application sets a flag indicating that the Add operation has been performed. In S506-S530 (FIG. 11) and S576-S583 (FIG. 19), control confirms the existence of the access point having the user-input SSID. Then, in S81 (FIG. 47), if the ADD flag is set (S81: YES), control proceeds to S82, where control judges whether the existence of the access point having the added SSID has been confirmed. If, in S81, control determines that the Add operation has not been performed (S81: NO), control proceeds to S532 (FIG. 12) or S584 (FIG. 19).

Figure 48:
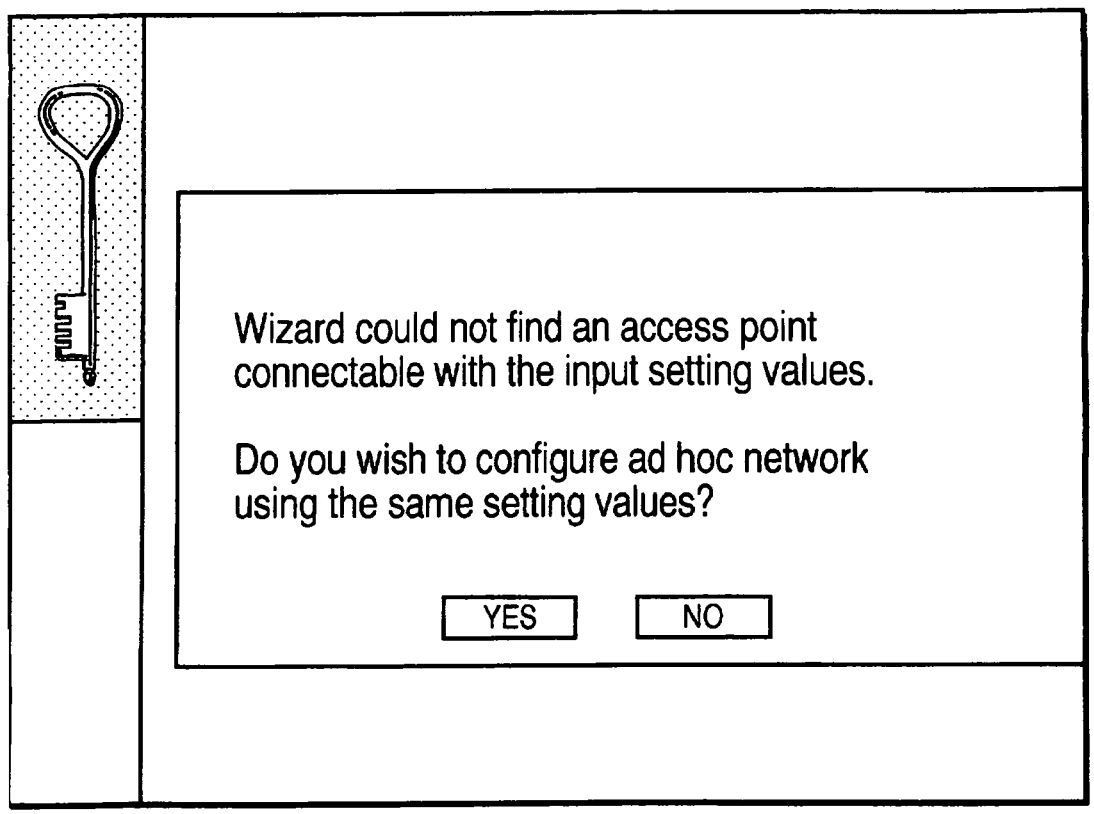
FIG. 48 shows an exemplary image inquiring whether the user wishes to make the target device join the ad hoc network, and acquiring the input by the user.

When the existence of the access point having the input SSID has not been confirmed (S82: NO), control displays an image (see FIG. 48) inquiring whether the user wishes to make the target device join the ad hoc network, and acquiring the input by the user (S83). When the existence of the access point having the input SSID has been confirmed (S82: YES), control proceeds to S532 or S584, similarly to the first embodiment.

If the user input is "YES" (S84: YES), control proceeds to S85, where control determines that the target device is to be joined in the ad hoc network, and stores the values of added SSID and channel, and a value indicative of participation in the ad hoc network in the RAM 33. If the user input is "NO" (S84: NO), control proceeds to S532 or S584.

With the above configuration, when the user input the SSID in which no access points exist, with a simple operation, it is possible to make the target device join the ad hoc network.

Second Embodiment

Figure 30:
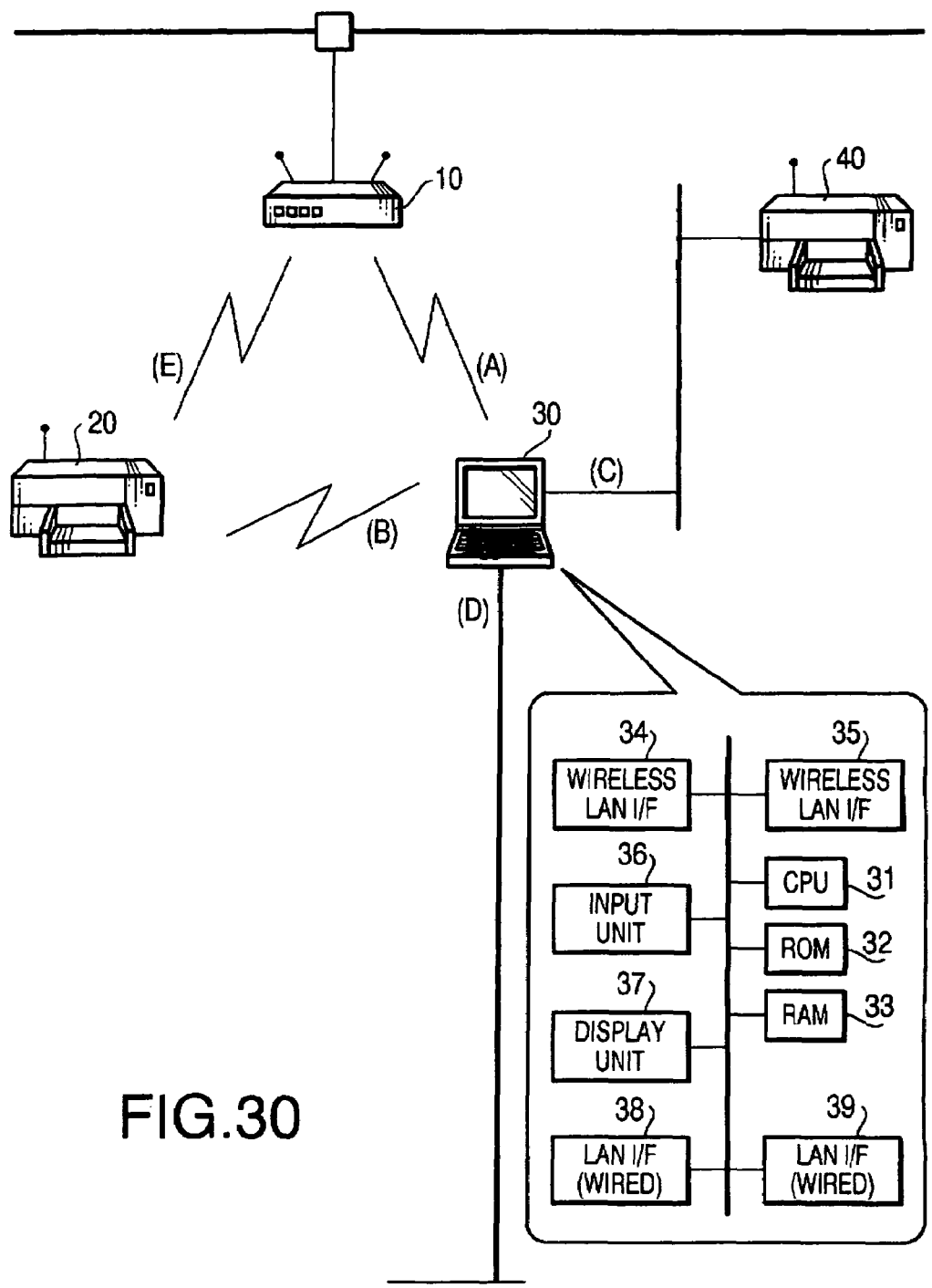
FIG. 30 shows a configuration of a network according to second (third and fourth) embodiment of the present invention.

FIG. 30 shows a configuration of a network system according to the second embodiment. As shown in FIG. 2, the network system includes an access point 10 and a network printer 20 (hereinafter, simply referred to as a printer) which is to be connected to the network, a personal computer (PC) 30 that can change the setting of the printer 20.

The access point 10 according to the second embodiment is a device complying with one of the wireless LAN standards, IEEE 802.11b/IEEE 802.1 g. The access point 10 operates in the infrastructure mode. The wireless network system is configured such that a plurality of wireless LAN terminals establish wireless communication with the access point 10, which functions as a relaying device.

The access point 10 is provided with wired LAN interfaces (I/F). Thus, by connecting a LAN cable of a wired LAN system, the wireless LAN and the wired LAN are connected through the access point 10.

The access point 10 is provided with a non-volatile memory (not shown) which stores the SSID as information of the wireless LAN to which the access point 10 belongs. When a predetermined encryption method is used in the wireless LAN (e.g., WEP: Wireless Encryption Privacy), an encryption key necessary for a encrypted communication (e.g., several bytes to several tens bytes of data string in the case of the WEP) is also stored in the non-volatile memory.

A wireless LAN terminal using an SSID different from the SSID stored in the access point 10 is regarded as a terminal belongs to another wireless LAN. In such a case, the access point 10 does not establish the wireless communication. When the encryption key is stored in the access point 10, even if a wireless LAN terminal has the SSID same as that stored in the access point 10, if the encryption keys do not match, the wireless communication with such a terminal is not established.

The printer 20 according to the second embodiment has a wireless LAN I/F complying with the standard IEEE 802.11b/IEEE 802.11g, which is the same as that employed in the access point 10. The printer 20 can operate in the infrastructure mode or in the ad-hoc mode.

When operating in the infrastructure mode and the wireless communication with the access point 10 is established, the printer 20 functions as a node on the network provided with the access point 10. In such a case, the printer 20 can print out print data transmitted from another node which is also a node of the same network (e.g., a PC wirelessly connected with the access point 10 and operates in the infrastructure mode).

When the printer 20 operates in the ad-hoc mode, by establishing a wireless communication with another wireless LAN terminal (e.g., the PC 30 operating in the ad-hoc mode), the printer 20 can print out the print data transmitted from the wireless LAN terminal.

The printer 20 has a non-volatile memory (not shown), which stores a communication mode (infrastructure mode/ad-hoc mode) of the printer 20, and the SSID as information related to the wireless LAN. When the encryption (e.g., WEP) is available in the wireless LAN, the encryption key is also stored in the non-volatile memory.

It should be noted that the information regarding the wireless LAN should be generally the same between two wireless stations. For example, when the wireless communication between the printer 20 and the access point 10 is to be established, the communication mode of both the printer 20 and the access point 10 is set to the infrastructure mode, and the SSDI and encryption key stored in the access point 10 should be used in the printer 20. If a wireless connection between the printer 20 and the PC 30 is to be established, the communication mode thereof is set to the ad-hoc mode, and the same SSID and encryption key are used therebetween.

The printer 20 complies with the SNMP, and is implemented with an SNMP agent which is software that operates to provide information in a management information base (MIB) inside the printer 20 to a requesting device in response to a request from the requesting device.

The PC 30 include, as shown in FIG. 30, CPU 31, ROM 32, RAM 33, wireless LAN interfaces 34 and 35, input unit 36, display 37, and wired LAN interfaces 38 and 3 as hardware thereof, and software for controlling each component of the hardware to realize various functions, which will be described hereinafter.

Each of the wireless LAN interfaces 34 and 35 according to the second embodiment complies with the wireless standard IEEE 802.11b/IEEE 802.11 g, which is the same as that employed in the printer 20 and the access point 10. The wireless LAN I/F 34 and 35 can operate in the infrastructure mode or the ad-hoc mode. When the wireless LAN I/F 34 or 35 operates in the infrastructure mode, the wireless connection with the access point 10 can be established, and the PC 30 functions as a node of the network having the access point 10. When the wireless LAN I/F 34 or 35 operates in the ad-hoc mode, the wireless connection with another wireless LAN terminal (e.g., the printer 20 operating in the ad-hoc mode), thereby the data communication between the PC 30 and the other terminal (e.g., transmission of the print data from the PC 30 to the printer 20) can be performed.

The input unit 36 is provided with a pointing device (e.g., a mouse) and keyboard. The display 37 is, for example, an LCD (Liquid Crystal Display) capable of displaying a color image.

Each of the wired LAN interfaces 38 and 39 is a device complying with a LAN standard IEEE 802.3/IEEE 802.3u (10 BASE-T/100 BASE-TX). By connecting a LAN cable with the wired LAN I/F 39 or 39, the PC 30 can be used as a node of the wired LAN. That is, between the PC 30 and a device on the wired LAN (e.g., the printer 40), data communication (e.g., transmission of print data from the PC 30 to the printer 40) can be performed.

In a non-volatile memory of the PC 30 (e.g., a flash memory which is a part of the ROM 32 and/or an NVRAM which is a part of the RAM 33), the communication mode of the PC 30 (infrastructure mode/ad-hoc mode) and the SSID are stored as information related to the wireless LAN to which the PC 30 belongs. If the encryption communication is employed (e.g., WEP) in the wireless LAN, the encryption key is also stored in the non-volatile memory. It should be noted that, as in the case of the printer 20 described above, the information related to the wireless communication is identical among the devices which are to communicate with each other.

According to the second embodiment, in order to establish the wireless communication ((A) in FIG. 30) between the PC 30, through the wireless LAN I/F 34, and the access point 10, the communication mode of the wireless LAN I/F 34 is set to the infrastructure mode, and the SSID and encryption key same as those stored in the access point 10 are used by the PC 30. Further, in order to establish the wireless communication ((B) in FIG. 30) between the PC 30, through the wireless LAN I/F 35, and the printer 20, the communication mode of the wireless LAN I/F 35 is set to the ad-hoc mode, and the seam SSID and encryption key are used by the PC 30 and the printer 20.

Among various pieces of software implemented with the PC 30, as an OS (Operating System), Windows® is employed. The fundamental operation of the PC 30 including I/O (input/output) control such as the input of commands and the like through the input unit 36, display of images on the display 37, communication commands for the wireless LAN interfaces 34 and 35 and wired LAN interfaces 38 and 39, and management of the hard disk and memories are provided by the OS. It should be noted that Windows® system is employed as an example, and any other OS such as Linux® or MacOS® may be implemented. Further, a plurality of network devices may be implemented with the same OS or different OSs.

As aforementioned, the PC 30 is implemented with the SNMP manager which is software functioning to request a device (e.g., the printer 20) on the network for information of the MIB managed inside the device, and receives the information which is transmitted from the device in response to the request.

Incidentally, in FIG. 30, all of the three possible wireless communication paths (A), (B) and (E) which can be established among the access point 10, the printer 20 and the PC 30. It should be appreciated that these three paths are not necessarily established simultaneously. Each of the three communication paths (A), (B) and (E) are established/disconnected in accordance with the progress of the setting procedures, which will be described below.

In the second embodiment, it is assumed that the access point 10, the PC 30 and the printer 40 are operating on the network. That is, at an initial stage of the procedures described hereafter, each device operates as a node of the network. On the other hand, the printer 20 is a device which is to be added to the network provided with the access point 10. At the initial stage, the printer 20 is connected with neither of the access point 10 and PC 30.

Prior to the setting procedure, it is necessary to establish the wireless communication ((B) in FIG. 30) between the printer 20 and the PC 30. According to the second embodiment, the printer 20 and the PC 30 are connected via the wireless LAN I/F 35. For this purpose, the connection settings of the wireless LAN I/F 35 are made to coincide with the initial wireless connection settings of the printer 20. The initial wireless connection setting of the printer 20 are, according to the second embodiment, such that the communication mode is the ad-hoc mode, the SSID is "Wireless" and the encryption is not employed. Therefore, the connection settings of the PC 30 are modified to coincide with the above. As a result, the wireless communication ((B) in FIG. 30) between the printer 20 and the PC 30 is established, and a condition for the setting procedures is ready.

Next, the setting procedure executed by the PC 30 for performing the remote setup of the printer 20 will be described.

The setting procedure is executed using interactive software known as the wizard. The user can complete the necessary settings by performing input operations in accordance with a guidance indicated on the screens displayed on the display 37 one after another.

The setting procedure is started when the setting procedure program is started up at the PC 30. The program is software that describes operations for enabling the PC 30 to function as a setting device. Such a program may be stored in a computer accessible recording medium such as a CD-ROM and distributed to the user. Alternatively or optionally, such a program may be distributed to the user through a network such as the Internet.

Figure 31:
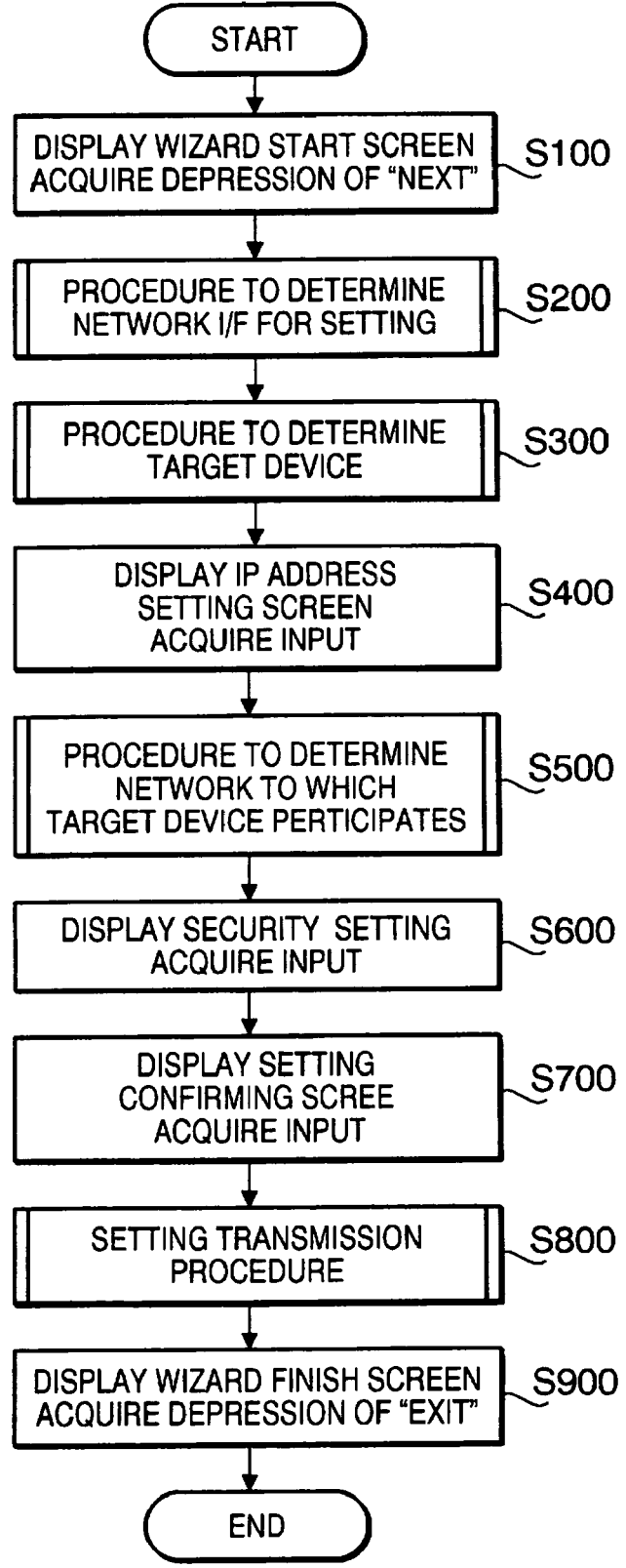
FIG. 31 shows a flowchart illustrating a setting procedure according to the second (third/fourth) embodiment.

The setting procedure will be describe with reference to FIG. 31. The flowchart shown in FIG. 31 is similar to FIG. 2 except that step S200 is inserted between S100 and S300, and connectors L, H and K are omitted. Therefore, the similar processes as in the first embodiment will be described briefly or omitted for the sake of brevity.

When the setting procedure is started, the PC 30 displays a wizard start screen (see FIG. 3), and allows the user to operate the "Next" button 102 or "Cancel" button.

When the "Next" button 102 is operated (clicked using the mouse or a equivalent short-cut key operation is performed), the PC 30 executes an network I/F determining procedure (S200) to determine a network I/F to be used for the remote setup. Details of the procedure in S200 will be described later. In S200, the PC 30 examines all the network I/Fs provided to the PC 30 to determine whether each network I/F can communicate with a target device. When a network I/F that can communicate with the target device is found, the network I/F is determined as the one to be used for the remote setup.

When the network I/F is determined in S200, the PC 300 executes the device determining procedure in which the target device is determined. That is, in this procedure, the PC 30 detects devices which are accessible through the network I/F determined in S200 and displays a list of the detected accessible devices on the display 37. After the list is displayed, the PC 30 allows the user to select one of the listed devices.

In the following description, it is assumed, as aforementioned, that the printer 20 is selected as the target device from the list of the accessible devices.

Figure 9:
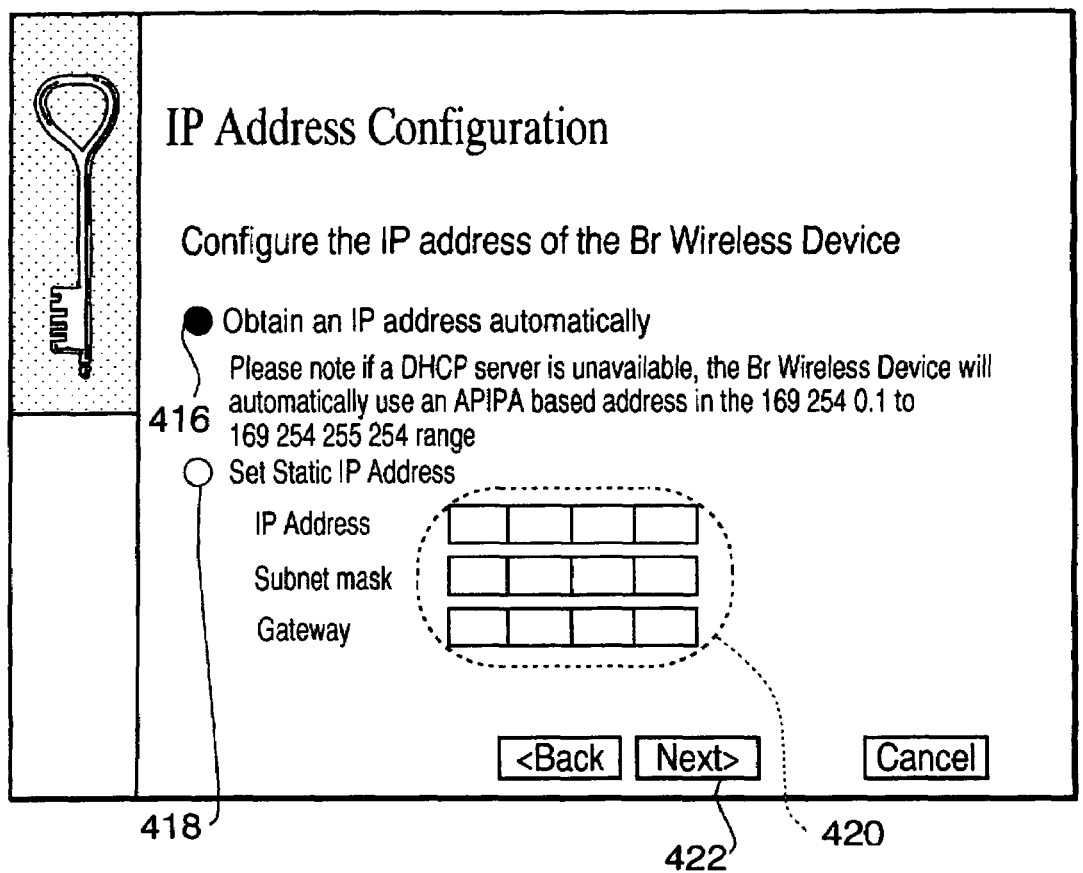
FIG. 9 shows an example of an IP address configuration screen.

When the target device is determined, the PC 30 displays the IP address input screen (see FIG. 9). The setting of the IP address is similar to that in the first embodiment.

Figure 32:
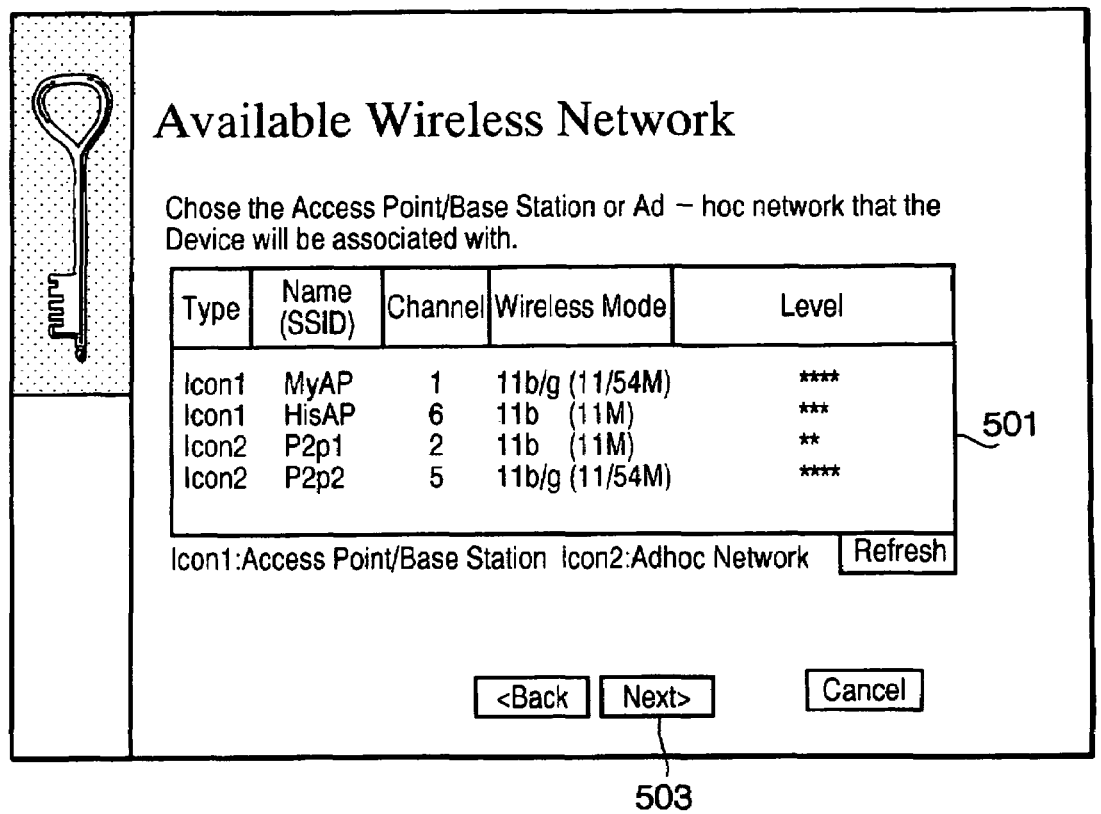
FIG. 32 shows an example of a network selection screen.
Figure 33A:
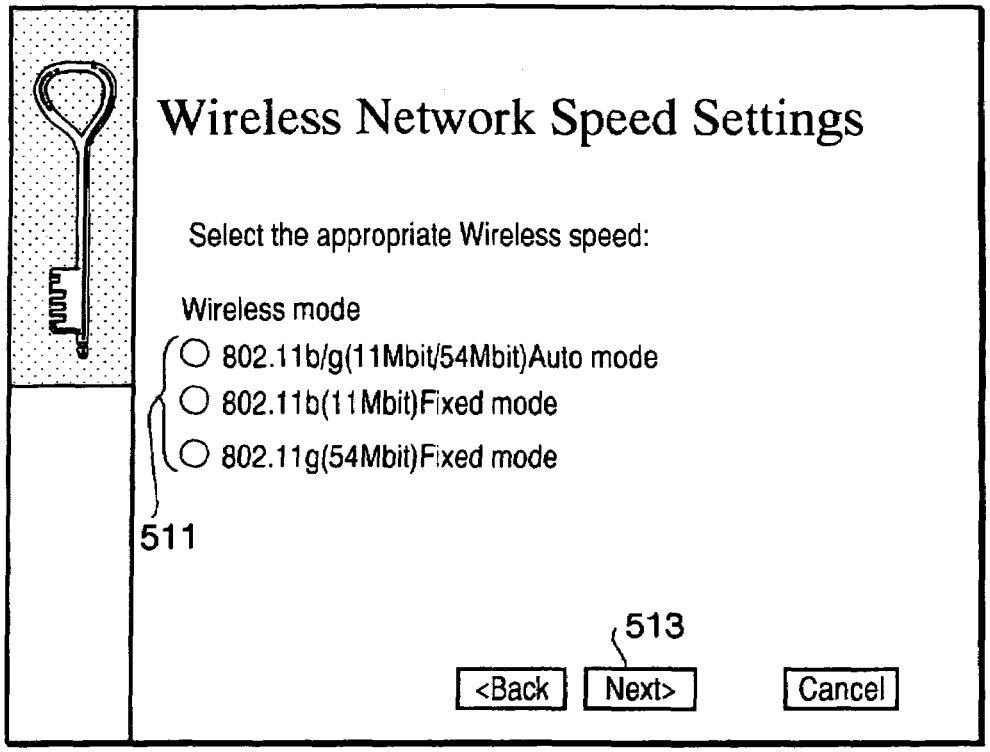
FIGS. 33A and 33B show examples of network setting screens.
Figure 33B:
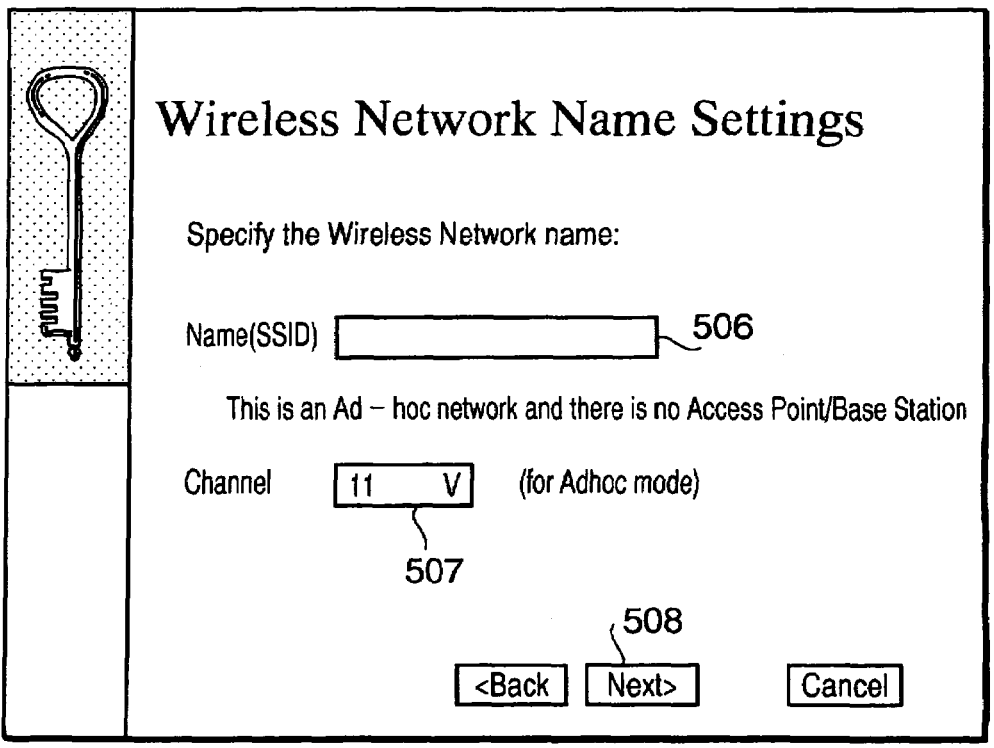

After the setting of the IP address is finished, the PC 30 executes the network determining procedure in S500. In the network determining procedure, the PC 30 displays the network selecting screen (see FIG. 32) or the network setting screens (see FIGS. 33A and 33B) on the display 37 and waits for the user's input.

The network selecting screen (FIG. 32) is displayed when an automatic detection of candidates of the network to which the target device is added is executed, and the network setting screens (FIGS. 33A and 33B) are displayed when the information of the network to which the target device is added is manually input. Whether the network selection screen is displayed or the network setting screens are displayed depends on whether the target device, PC 30 or other network devices has an automatic detection function of the network. Alternatively or optionally, is may be configured that the screens are designated by the user.

When the network selecting screen (FIG. 32) is displayed, the user can select one of the networks displayed in the selection box 501. After selecting one network (i.e., one network is highlighted on the screen), when the user operates the "Next" button, the selected network is determined as the network to which the target device is added.

When the network setting screen A (FIG. 33A) is displayed, the user can select the wireless mode by selecting one of the radio buttons 511. Thereafter, by operating the "Next" button 513, the network setting screen B (FIG. 33B) is displayed, which is similar to the screen shown in FIG. 14B. After the necessary information is input and the "Next" button 508 is operated, the network to which the target device is added through the access point 10 is determined.

In S600, the PC 30 displays the security setting screen (see FIG. 22) on the display 37. After inputting necessary information in the input boxes 602, the user operates the "Next" button 604.

In S700, the PC 30 displays the settings confirmation screen (see FIG. 23), which is similar to that displayed in the first embodiment. When the settings as displayed are confirmed, the user operates the "Next" button 704.

Then, the PC 30 executes the setting transmitting procedure in S800. In this procedure, the settings confirmed in the previous step are transmitted to the target device (i.e., the printer 20 in this embodiment), and the settings of the printer 20 are updated. Thus, the setting values input in the above steps S100-S700 are not transmitted to the printer 20 when they were input, but are transmitted to the printer 20 at a time in S800'.

When the setting transmitting procedure is finished, the PC 30 displays the wizard end screen (see FIG. 26) on the display 37, and allows the user to operate the "Exit" button 902 (S900). When the user operates the "Exit" button 902, the setting procedure shown in FIG. 30 is finished.

By executing steps S100-S900, the setting of the printer 20 is finished. As a result, the wireless communication ((E) in FIG. 30) between the printer 20 and the access point 10 is established.

Next, the procedure of determining the network I/F in S200 will be described in detail, referring to a detailed flowchart.

Figure 34:
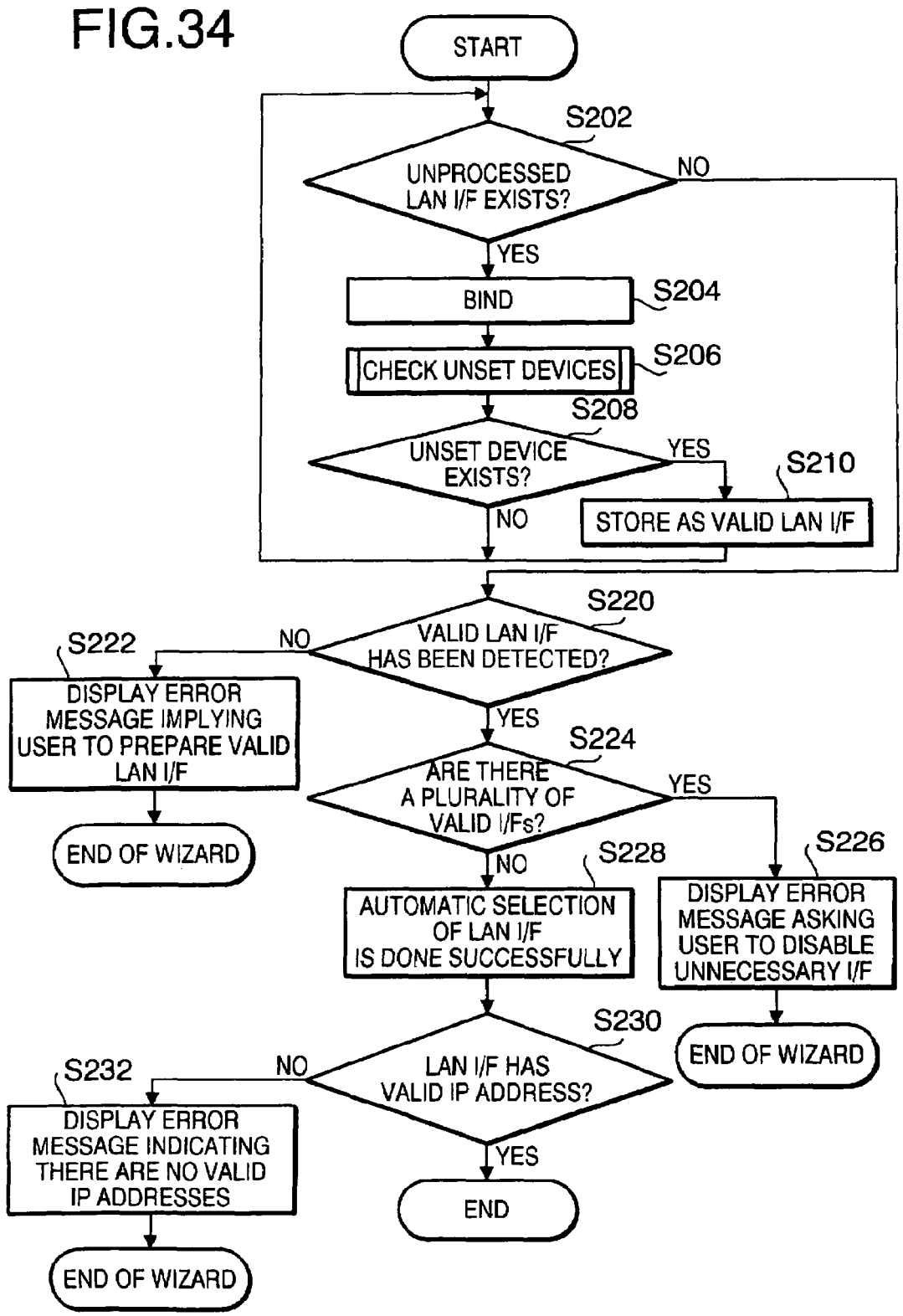
FIG. 34 shows a flowchart illustrating a network I/F determining procedure according to the second embodiment.

FIG. 34 shows a flowchart illustrating the network I/F determining procedure which is executed in S200.

When the network I/F determining procedure is started, the PC 30 judges whether there is a LAN I/F to which the network I/F determining procedure has not been applied, among the plurality of LAN I/F (i.e., the wireless LAN I/Fs 34, 35 and wired LAN I/Fs 38 and 39) provided to the PC 30 in S202.

At least in the first time when this procedure is executed, there exists an unprocessed LAN I/F (S202: YES). Therefore, control selects and binds an unprocessed LAN I/F (S204), and prepares for a communication by, for example, establishing communication channels among components (e.g., protocol driver, network adapter, etc.) used when the communication is performed. Next, in S206, control executes an unconfigured device checking procedure to examine whether the bound LAN I/F is an effective one for accessing the unconfigured device (i.e., the target device, or the printer 20 in this embodiment).

Figure 35:
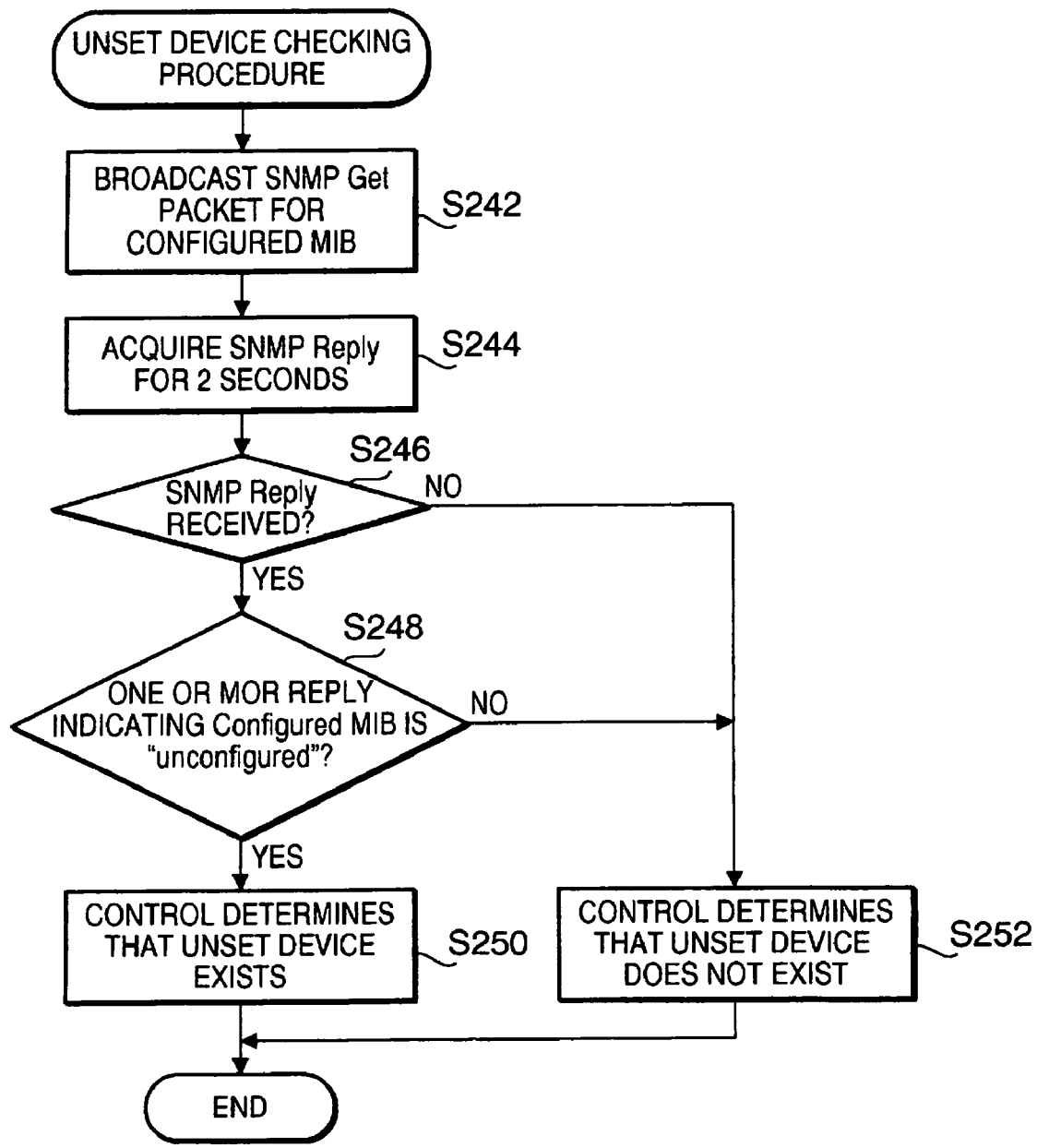
FIG. 35 shows a flowchart illustrating an unconfigured device checking procedure according to the second embodiment.

FIG. 35 shows a flowchart illustrating the details of the unconfigured device checking procedure executed in S206.

When the unconfigured device checking procedure is started, the PC 30 broadcast an SNMP Get packet requesting for the "Configured MIB" using the SNMP (S242), and receives the reply thereto for a predetermined period (two seconds in this embodiment) in S244.

The SNMP Get packet broadcast in S242 is transmitted through the LAN I/F which is the one selected when S242 is executed to all the devices on the network connected through the selected LAN I/F. If some of the devices that receive the SNMP Get packet can replay thereto, the devices transmit replies to the PC 30. The other devices which cannot reply to the SNMP Get packet simply destroy the received packet.

In the second embodiment, the printer 20 is assumed to be a device that can reply to the SNMP Get packet described above. Therefore, when the printer 20 received such a packet, it executes a replying procedure shown in FIG. 36 while the PC 30 pauses for two seconds in S244.

Figure 36:
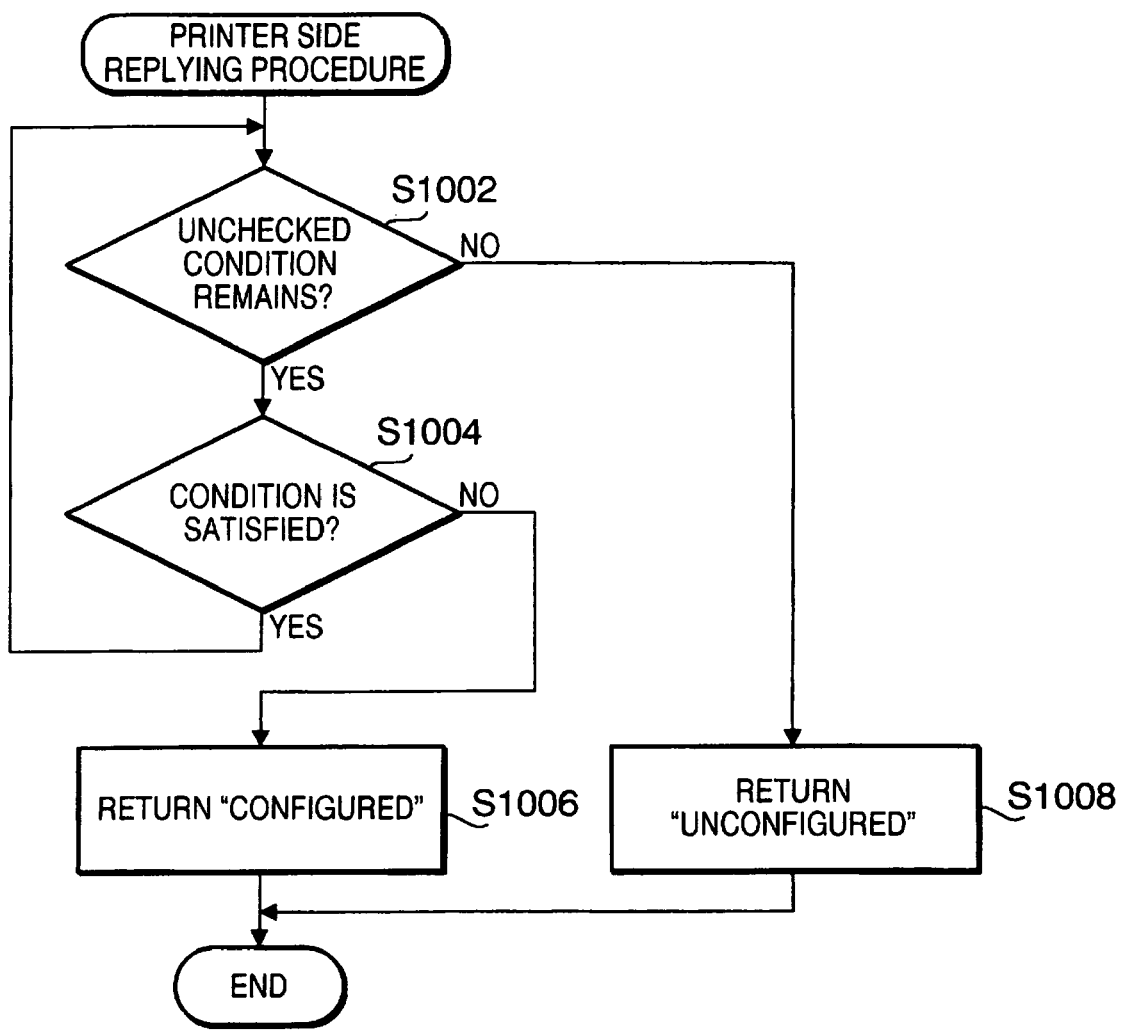
FIG. 36 shows a flowchart illustrating a replying procedure according to the second embodiment.

When the replying procedure shown in FIG. 36 is started, the printer 20 judges whether there is an unchecked condition from among a plurality of conditions for determining the printer 20 itself is unconfigured or configured (S1002).

The conditions for determining whether the printer 20 is configured or unconfigured include, according to the second embodiment, (1) whether the SSID has an initial value ("Wireless", in this embodiment), (2) whether the communication mode is an initial mode (i.e., the ad-hoc mode in this embodiment) and (3) whether the IP address is the initial value. Since the procedure is executed first time, there is an unchecked condition (S1102: YES), control selects one of the conditions above, and judges whether the selected condition is satisfied (S1004).

If the selected condition is not satisfied (S1004: NO), an SNMP packet in which the value of the "Configured MIB" is set to "configured" is transmitted to the PC 30 (S1006).

When one condition is satisfied (S1004: YES), control proceeds to S1002, and until all the conditions are examined (S1002: YES), steps S1002-S1004 are repeated, thereby the three conditions above are examined one by one. According to the second embodiment, since there are three conditions to be examined, when S1002 is executed fourth time, there is no condition to be examined (S1002: NO). In this case, an SNMP packet in which the value of the "Configured MIB" is set to "unconfigured" is transmitted to the PC 30, which is the source of the SNMP Get request (S1006).

As above, when all the three conditions are satisfied, the reply indicating "unconfigured" is transmitted from the printer 20 to the PC 30, while at least one of the three conditions is not satisfied, the reply indicating "configured" is transmitted from the printer 20 to the PC 30. In this regard, the value of "Configured MIB" serves as an unconfigured flag.

If the above described printer side replying procedure is executed while the PC 30 pauses for two seconds in S244, a replay (SNMP Reply) is transmitted from the printer 20 to the PC 30. Further, if there are devices compliant with the SNMP (not shown) other than the printer 20 exist on the network, replies are transmitted from such devices to the PC 30.

It should be noted that, when the system is configured such that the PC 30 is connectable only through the wireless LAN I/F 35, if the other LAN I/F (the wireless LAN I/F 34, the wired LAN I/F 38 or 39) is selected, the packet broadcast in S242 does not reach the printer 20. In such a case, the printer 20 does not executes the replying procedure described above, and the reply (SNMP Reply) is not transmitted from the printer 20 to the PC 30.

That is, the PC 30 receives the replay (SNMP Reply) to the PC 30 in S244 only when the printer 20 or equivalent devices which is compliant with the SNMP exists on the network which is accessible through the selected LAN I/F when S206 is executed.

After the process of S244 is finished, control judges whether an SNMP Reply is received (S246). If control determines that the SNMP Reply is received (S246: YES), control examines whether there is at least one SNMP Reply of which the "Configured MIB" has a value of "unconfigured" (S248). If there is at least one SNMP Replay in which the value of the "Configured MIB" is "unconfigured" (S248: YES), control determines that there is an unconfigured device (S250). If there is no SNMP Reply from the printer 20 (S246: NO), or none of the SNMP Reply packets indicates that the value of the "Configured MIB" is "unconfigured" (S248: NO), control determines that there is no unconfigured device (S252). The results of the unconfigured device checking procedure is stored as a flag value, which is referred to in a judging procedure in S208.

After the steps S242-S252 in FIG. 35 are finished, control proceeds to S208 to judge whether there is an unconfigured device. If there is an unconfigured device (S208: YES), control stores that the selected (examined) LAN I/F as an effective LAN I/F (S210). After S210 or when there is no unconfigured device (S208: NO), control returns to S202. Thus, as far as an unprocessed LAN I/F exists, steps S202-S210 are repeated so that the LAN I/Fs are processed (examined) one by one.

By repeating the above steps and all the LAN I/Fs are processed, there becomes no unconfigured LAN I/F (S202: NO). Then, control judges whether an effective LAN I/F is detected (S220).

Figure 37:
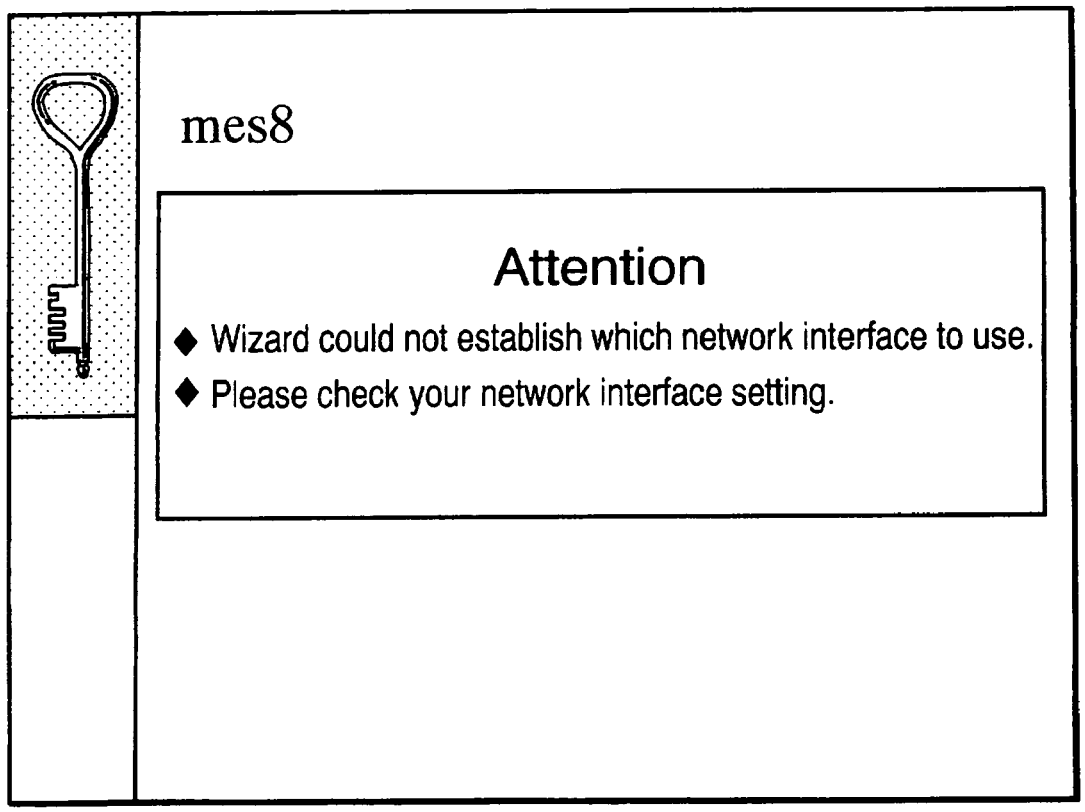
FIG. 37 shows an example of a message screen inducing a user to prepare an effective LAN I/F.

If the effective LAN I/F has not been detected (S220: NO), an error message screen inducing the user to prepare an effective LAN I/F (see FIG. 37) in S222, and control proceeds to finish the wizard. The process for finishing the wizard is for releasing resources utilized in the setting procedure and the like. Similar process is well known and widely used, therefore, description thereof will not be presented for the sake of brevity.

If the effective LAN I/F has been detected (S220: YES), control judges whether there are a plurality of effective LAN I/Fs (S224).

Figure 38:
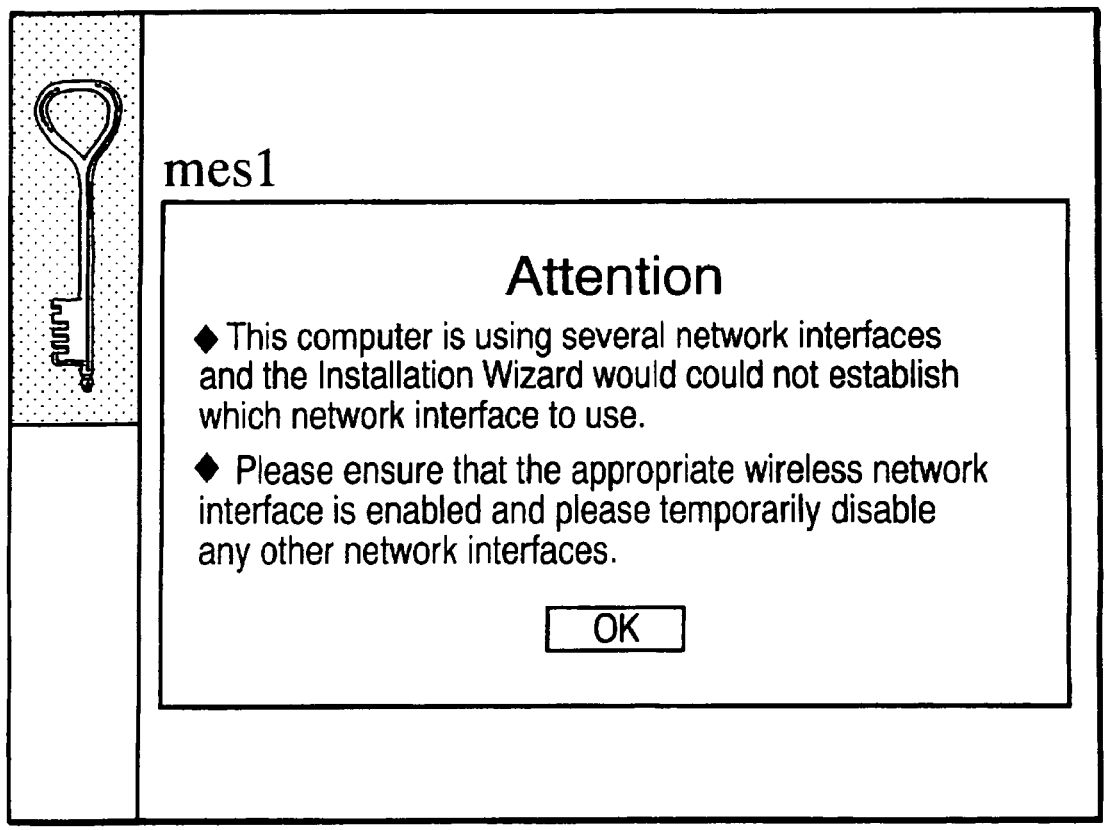
FIG. 38 shows an example of a message screen inducing the user to disable the unnecessary LAN I/F.

If there are a plurality of effective LAN I/Fs (S224: YES), control displays a message screen as shown in FIG. 38, which inducing the user to disable the unnecessary I/Fs, on the display 37 (S226). Then, control advances to a process for, finishing the wizard.

It should be noted that the message displayed in S226 may be one asking the user to turn OFF the devices (e.g., other printers on the same network the printer 20 belongs to) which cause the unnecessary LAN I/Fs to be detected as effective, and only the target printer is to be remained ON. That is, the message may notify the user to avoid the false detection by stopping the unnecessary communication I/Fs. Alternatively, the message may notify the user to avoid the false detection by stopping the network devices that cause the detection of the unnecessary communication I/Fs.

If only a single LAN I/F is detected (S224: NO), control determines that the automatic selection of the LAN I/F is successful (S228). In this case, the selected LAN I/F is examined to determine whether an effective IP address is assigned to the selected LAN I/F (S230).

Figure 39:
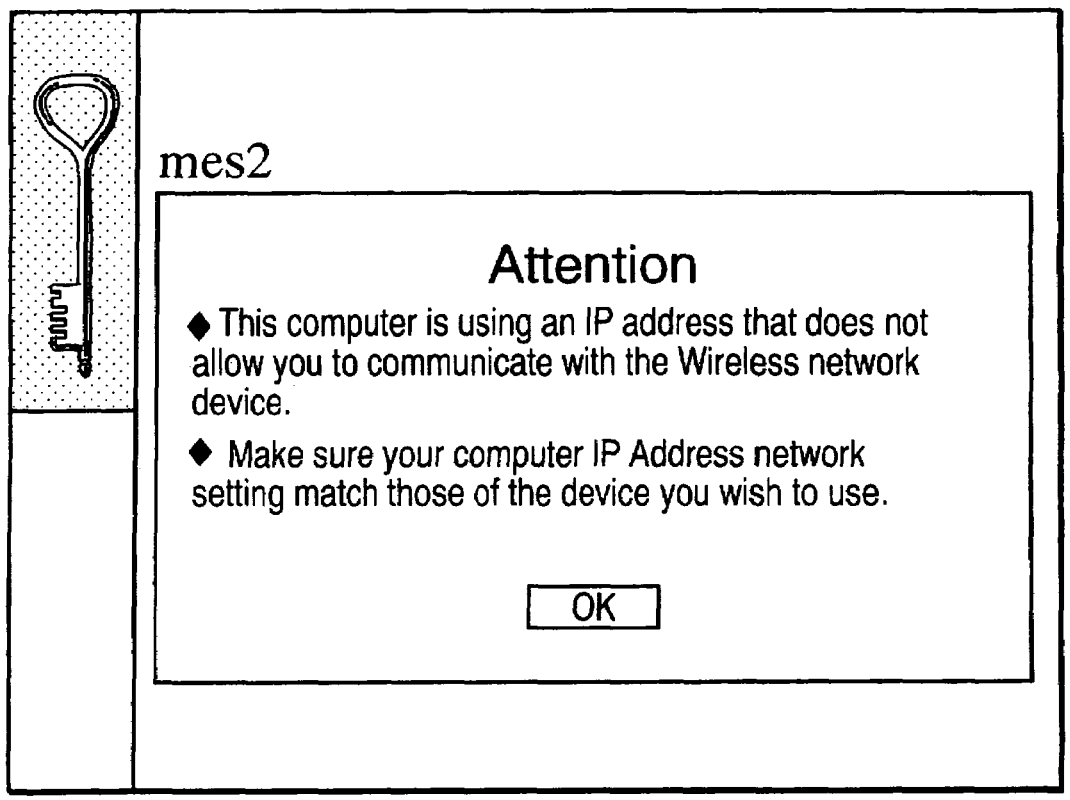
FIG. 39 shows an example of a message screen notifying that effective IP address is not available.

If the selected LAN I/F is not assigned with an effective IP address (S230: NO), an error message (see FIG. 39) indicating that the effective IP address is not assigned is displayed on the display 37 (S232), and control proceeds to perform the process for finishing the wizard.

If the effective IP address is assigned to the selected LAN I/F (S230: YES), control normally finishes the procedure shown in FIG. 34 as a single LAN I/F that can access the unconfigured device and the effective IP address is assigned thereto.

As described above, when the PC 30 executes the steps defined in the setting procedure program, the PC 30 examines whether it can communicates with the printer 20 using the plurality of LAN I/Fs 34, 35, 38 and 29 (S202-S210). Based on the results of the examining process above, the PC 30 determines one LAN I/F (35) which can communicate with the printer 20 (S220-S228). Then, the PC 30 accepts the user input regarding various setting values (S300-S700), and transmits the setting values input by the user to the printer 20 through the above-identified LAN I/F 35 to achieve the remote setup of the printer 20 (S800). Even if a plurality of LAN I/Fs are provided, during the steps S202-S210 and S220-S228, a single LAN I/F accessible to the printer 20 can be detected.

Therefore, as the procedure described above is performed by the PC 30, it becomes unnecessary for the user to find out an appropriate LAN I/F for performing the remote setup of the printer 20. With this configuration, it becomes possible to avoid a condition where the user selects a wrong LAN I/F and the remote setup is not executed or interrupted before completed.

On the PC 30 side, based on the information contained in the reply from the printer 20 (i.e., the value of the "Configured MIB"), it becomes possible to determine whether the printer 20 is an unconfigured device (i.e., a target device). Therefore, in comparison with a case where the network device does not have a function to reply containing the similar information, whether the device is the target device or not can be determined simply without fail in a relatively short period.

Further, the network device having been configured will not be determined as the target device. Therefore, even if a plurality of network devices are on the network, if only the printer 20 is the unconfigured device, it can be detected as the target device simply without fail.

If a plurality of LAN I/Fs are remained as devices that can communicate with the LAN I/Fs, for example, in a case where devices compliant with the SNMP and equivalent to the printer 20, by execution of S224 and S226, the user is informed of how to avoid the selection of the plurality of LAN I/Fs and to make a single LAN I/F be selected automatically.

Similar to the first embodiment, the remote setup procedure shown in FIG. 31 can be modified such that application stores the connection settings of such a wireless communication and enables the wireless communication with the printer 20, without requiring the user's operation to change the connection settings.

Figure 49:
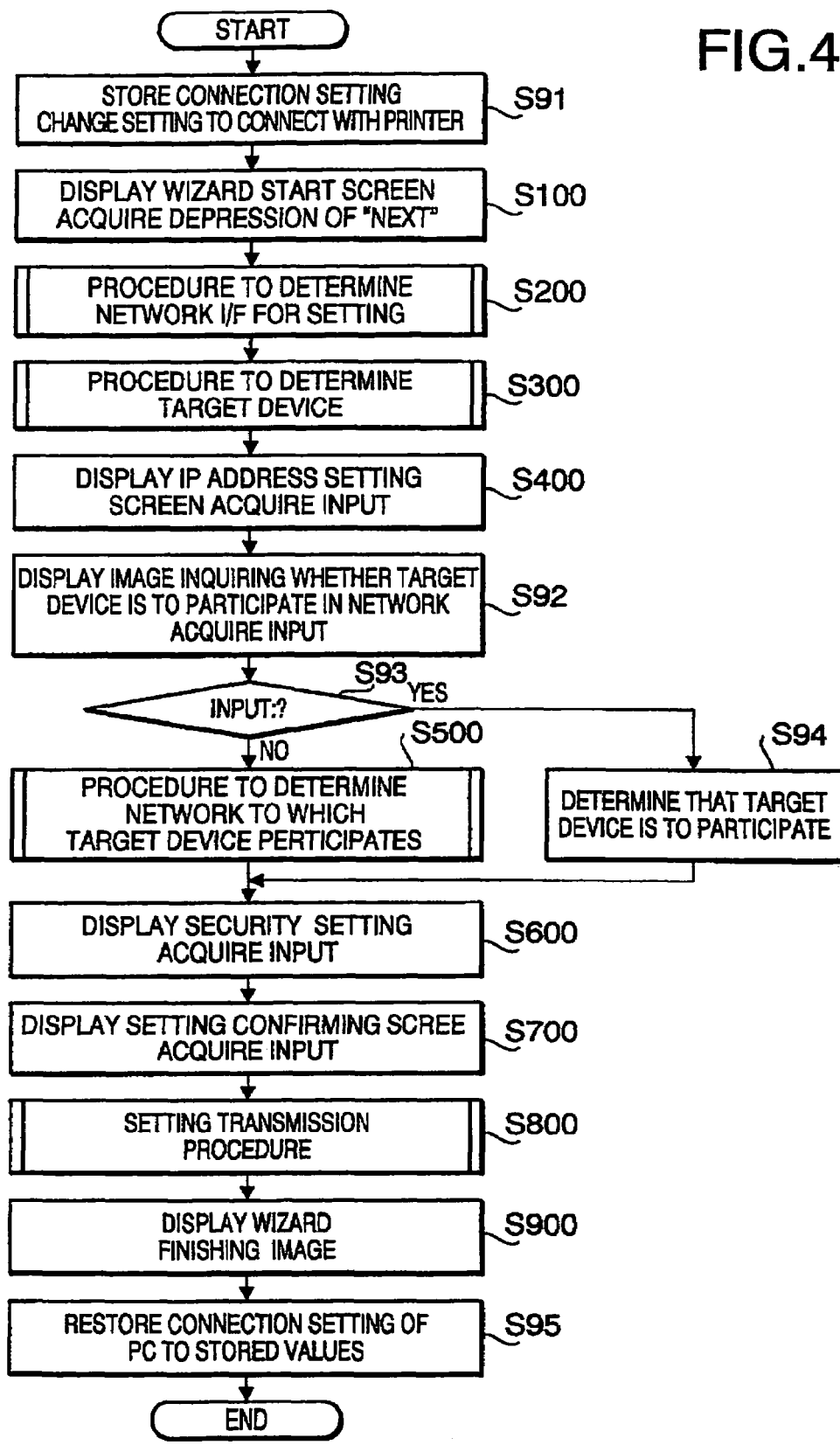
FIG. 49 shows a flowchart illustrating a remote setup procedure according to a third modification of the first embodiment.

FIG. 49 is a flowchart illustrating a remote setup procedure according to such a modification (i.e., a third modification) of the second embodiment. FIG. 49 is the same as FIG. 45 except that connectors L, H and K are omitted, description of each step is omitted for the sake of brevity.

According to the above modification, it becomes unnecessary for the user to manually switch the connection settings so that the communication between the PC 30 and the printer 20 can be performed. As the application is started up, the connection settings are automatically switched, and when the application is completed, the connection settings are restored to the values before the application is executed.

Further, according to the above configuration, it is very easy to make the printer join the network to which the PC 30 is connected.

It should be noted that, in the modification above, the security setting is input by the user (S600) as in the first embodiment. If the security settings of the PC 30 is copied in S91, and stored in the RAM 33 in S94 as the setting for the printer, step S600 can be omitted.

Third Embodiment

In the third embodiment, a process when the plurality of effective LAN I/F are detected (S224: YES) is different from that of the second embodiment. Thus, in the description below, only the different process will be described.

Figure 40:
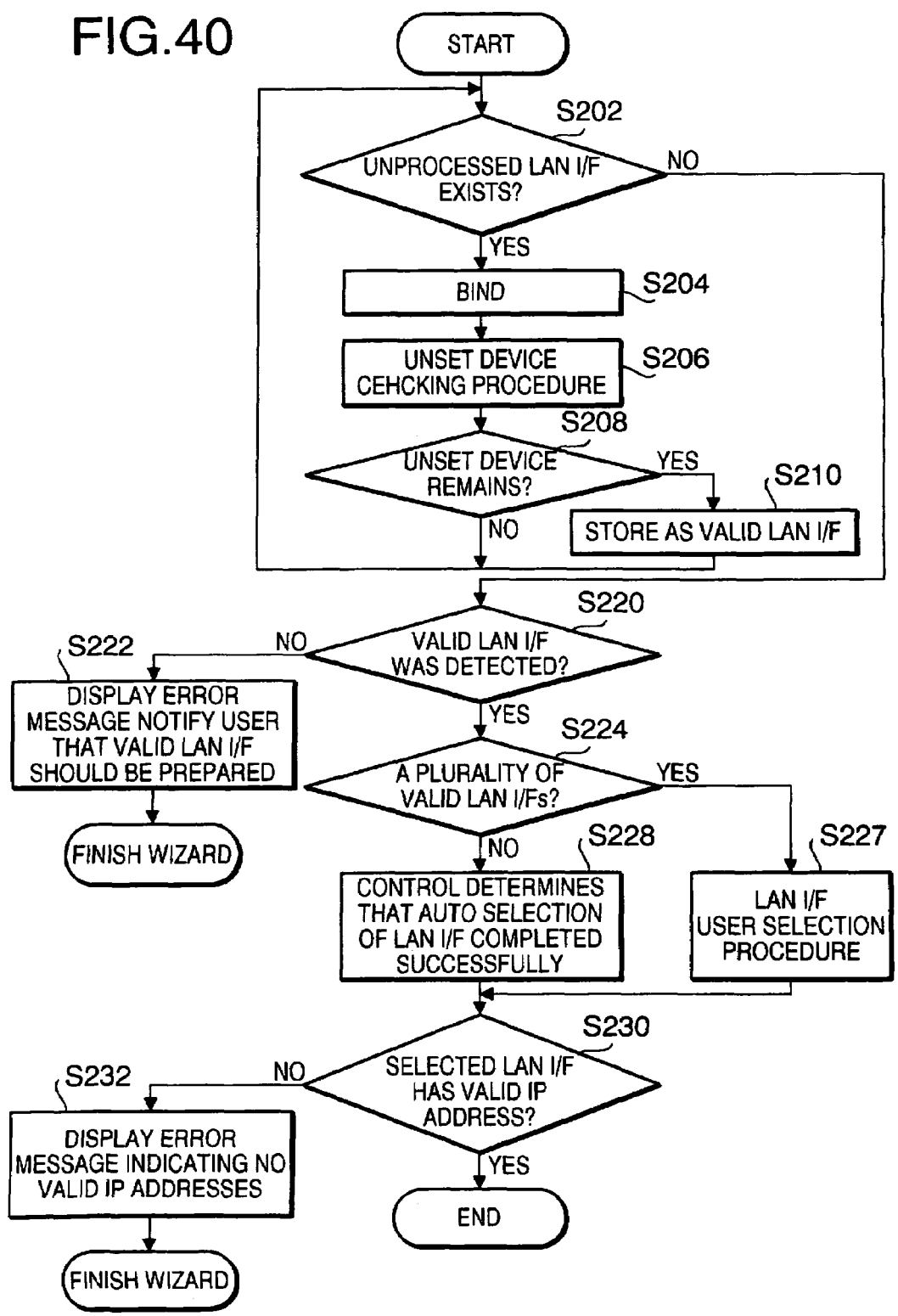
FIG. 40 shows a flowchart illustrating the network I/F determining procedure according to the third embodiment.

FIG. 40 shows a flowchart of the setting procedure according to the third embodiment. Steps S202-S224 of the third embodiment are similar to those of the second embodiment.

In S224, the PC 30 judges whether there are a plurality of effective LAN I/Fs. If there are a plurality of effective LAN I/Fs (S224: YES), control proceeds to S227 where a user selection procedure is executed.

Figure 41:
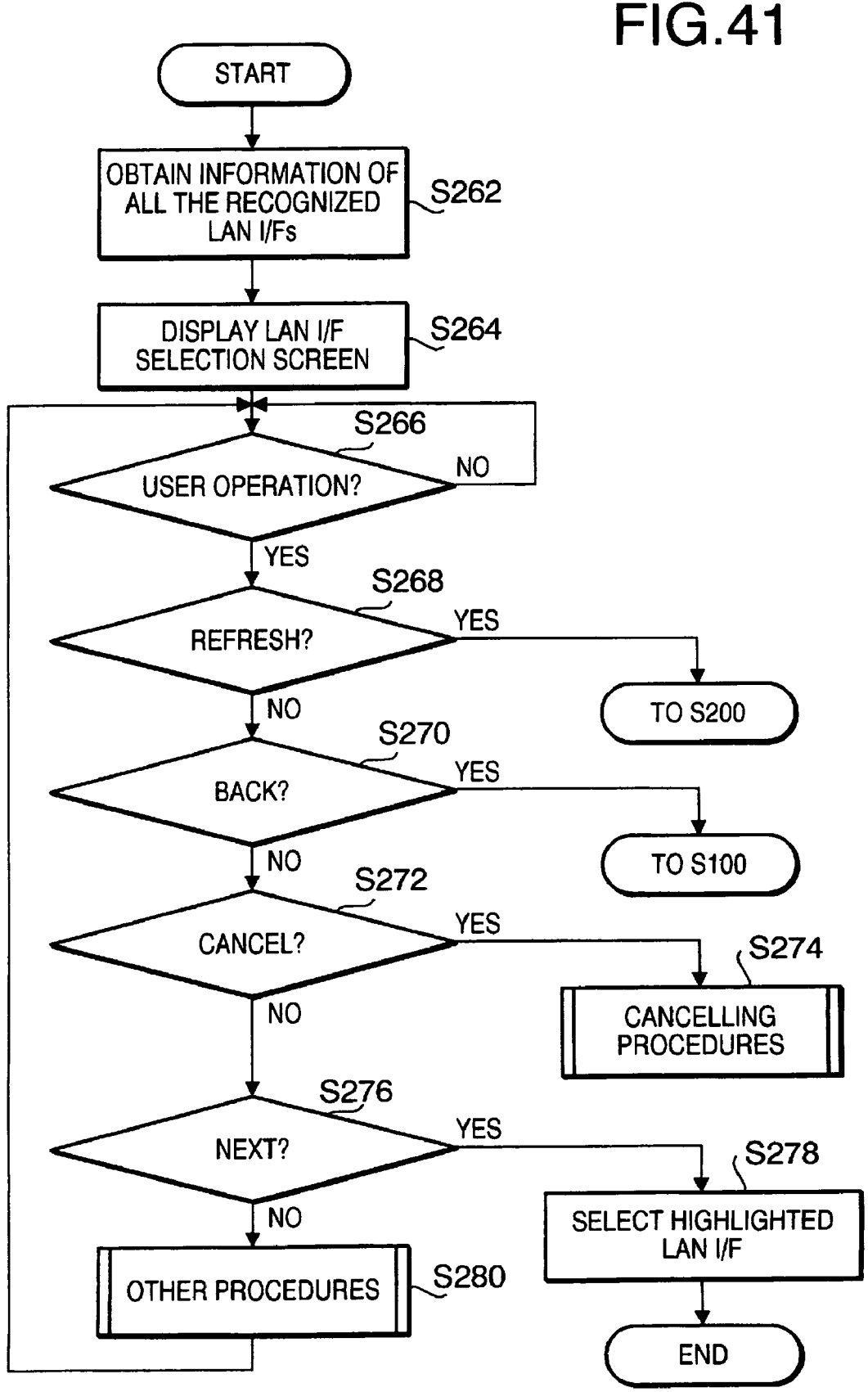
FIG. 41 shows a flowchart illustrating a user selection procedure according to the third embodiment.

FIG. 41 is a flowchart illustrating the user selection procedure (S227 of FIG. 40).

When the user selection procedure is started, the PC 30 obtains the information from the OS on all the LAN I/Fs which the OS recognizes (S262). Then, the PC 30 displays a LAN I/F selection screen (see FIG. 42) on the display 37 (S264).

In a LAN I/F selection box 211, information obtained in S262 is displayed. "Refresh" button 213, "Back" button 215, "Cancel" button 217 and "Next" button 219 are also displayed on the LAN I/F selection screen.

In S266, control pauses until the user performs an operation (S266: NO). When an operation of the user is detected (S266: YES), control proceeds to S268.

If the user has operated the "Refresh" button 213 (S268: YES) control returns to S200 and executes the process from the beginning. If the "Refresh" button 213 has not been operated (S268: NO), control judges whether the "Back" button 215 has been operated (S270). If the "Back" button 215 has been operated (S270: YES), control returns to S100 and executes the procedure from the beginning. If the "Back" button 215 has not bee operated (S270: NO), control judges whether the "Cancel" button 217 has been operated (S272). If the "Cancel" button 217 has been operated (S272: YES), control proceeds to a cancellation procedure (S274).

Figure 43:
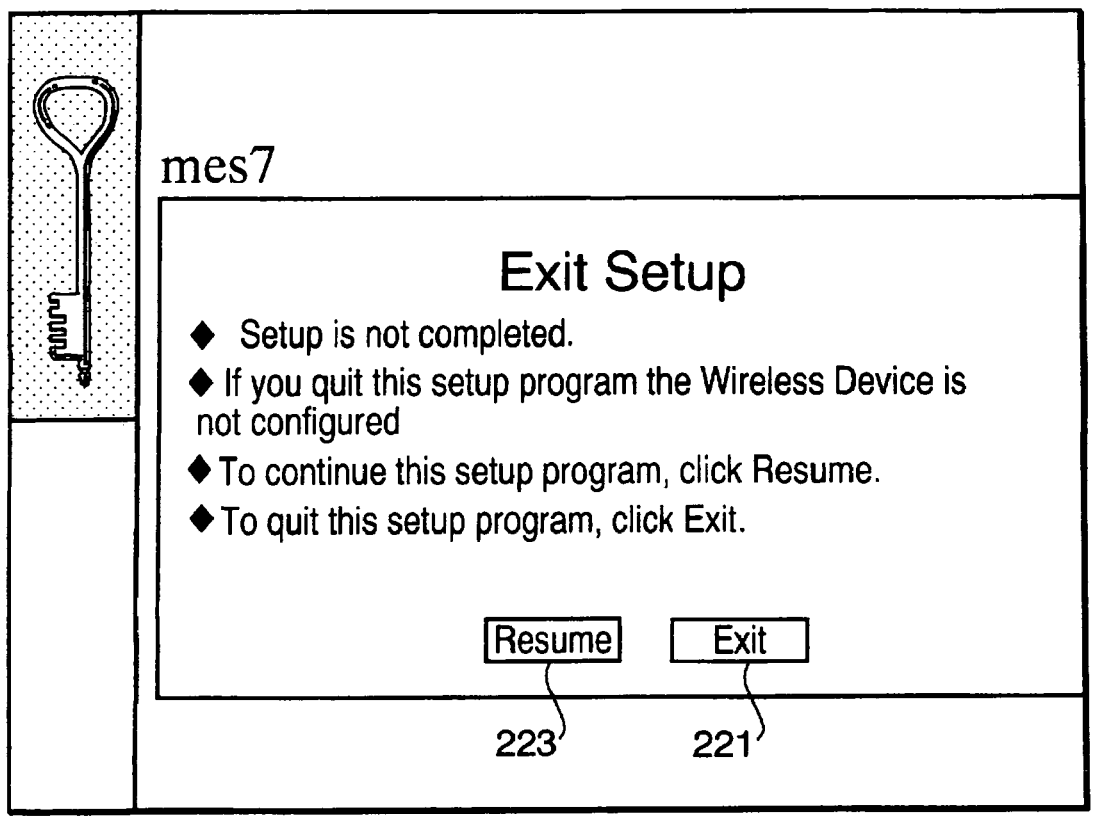
FIG. 43 shows an example of a message screen for confirming cancellation of the procedure.

When control proceeds to the cancellation procedure, a cancellation confirmation screen (FIG. 43) is displayed on the display 37. In the cancellation confirmation screen, an "Exit" button 221 and a "Resume" button 223 are displayed together with a message regarding the cancellation. If the user operates the "Exit" button 221, control proceeds to execute processes for interrupting the procedure including a process of releasing the resources utilized during the process. When the user operates the "Resume" button 223, control returns to a stage before the cancellation screen is displayed.

Figure 42:
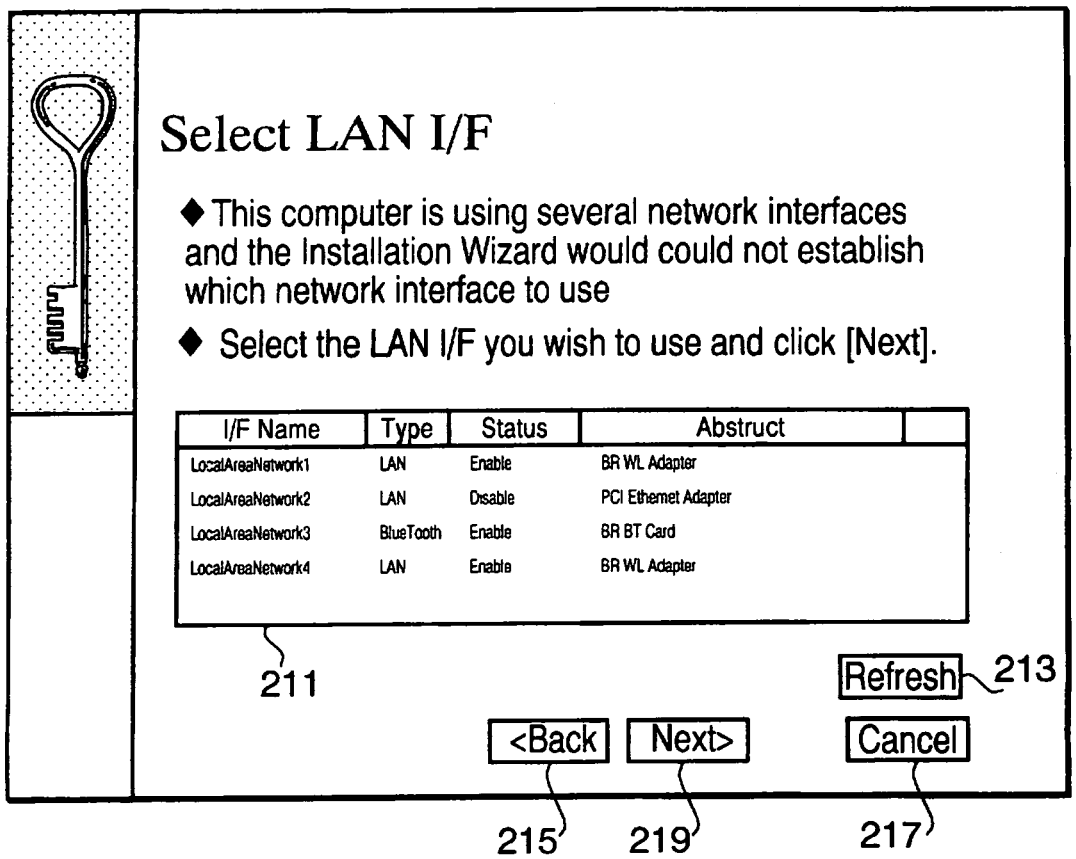
FIG. 42 shows an example of a LAN I/F selection screen.

If the user has not operated the "Cancel" button 217 (S272: NO), control judges whether the "Next" button 219 has been operated (S276). If the "Next" button 219 has been operated (S276: YES), a LAN I/F currently selected (i.e., highlighted) is selected (S278). As shown in FIG. 42, in the LAN I/F selection box 211, one or more pieces of information corresponding to the one of more LAN I/Fs are displayed, and only one LAN I/F is highlighted. In S278, the highlighted LAN I/F when the "Next" button 219 is operated is selected. When step S278 is executed, the user selection procedure is finished.

If the user has not operated the "Next" button 217 (S276: NO), operation corresponding to the operated button is executed (S280), and control returns to S266. The operation processed in S280 may be a process of changing the highlighted LAN I/F in the LAN I/F selection box 211. Such a process is well known and generally employed in this type of interactive program, and accordingly, detail description thereof will be omitted.

When the steps S262-S280 described above are normally finished and S278 is executed at the end of the procedure, S227 shown in FIG. 40 is finished. Then, control proceeds to S230. Steps S230 onwards are similar to those of the second embodiment, and thus description thereof will not be repeated.

When a plurality of LAN I/Fs are detected, according to the second embodiment, a message indicating the ways of handling is notified and the procedure is finished. According to the third embodiment, even when a plurality of LAN I/Fs are detected, based on the user's instruction, one LAN I/F that can communicate with the printer 20 is identified and process is continued.

Fourth Embodiment

A fourth embodiment is similar to the second embodiment except that the unconfigured device check procedure in S204 is different. The other procedures and hardware configuration are similar to those of the second embodiment. Therefore, in the description hereinafter, elements and steps of the procedures same as those of the second embodiment are indicated with the same reference numbers and step numbers, and description thereof is omitted.

Figure 44:
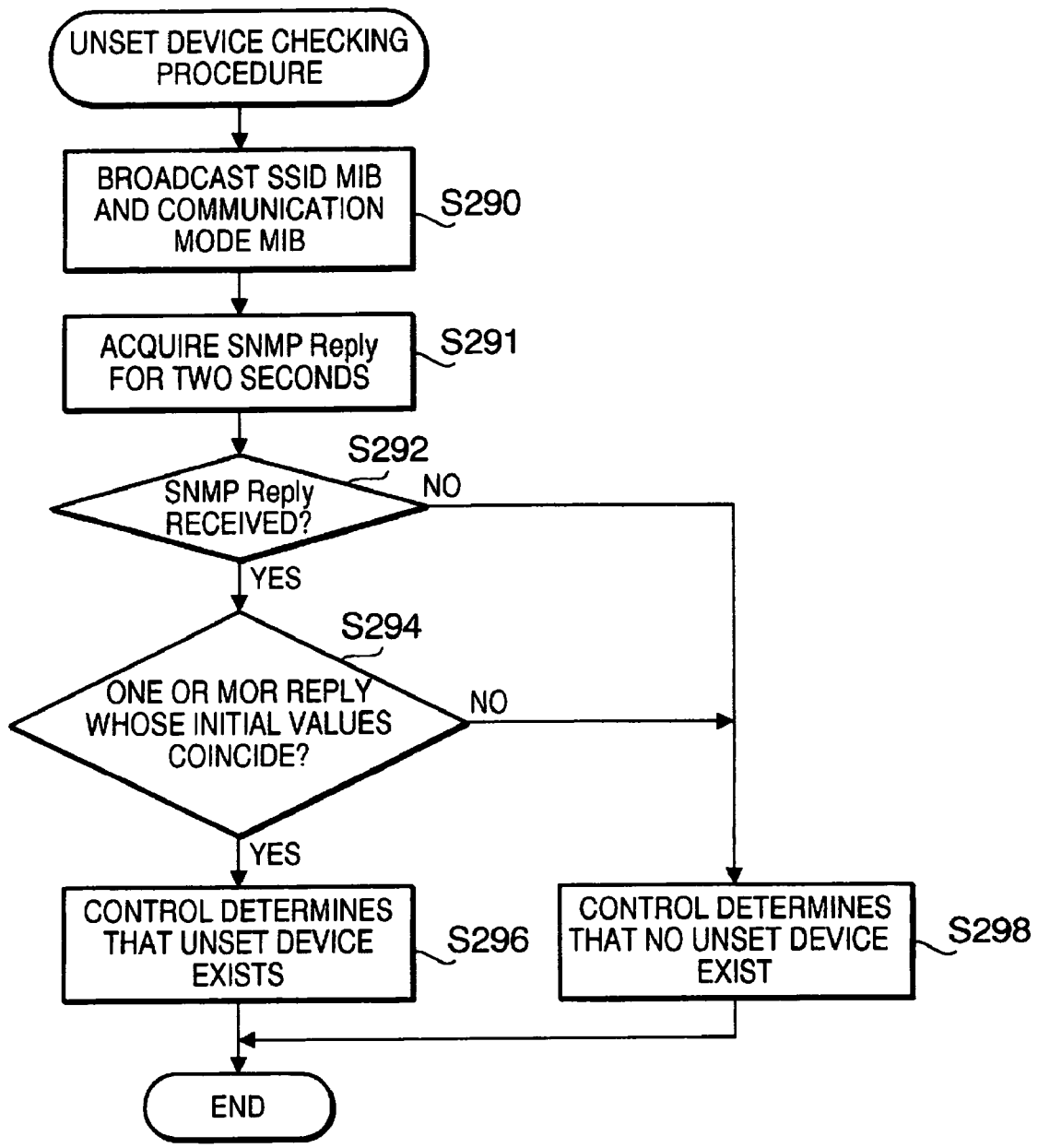
FIG. 44 shows a flowchart illustrating the unconfigured device checking procedure according to the fourth embodiment.

FIG. 44 is a flowchart of the unconfigured device checking procedure according to the fourth embodiment. FIG. 44 replaces FIG. 35, which corresponds to the second embodiment.

When the unconfigured device checking procedure shown in FIG. 44 is started, the PC 30 broadcasts an SNMP Get packet requesting for the "SSID MIB" and "communication mode MIB" in S290, and receives the Reply thereto for a predetermined period (two seconds, in this embodiment) (S291).

The SNMP packet broadcast in S290 is, similarly in the second embodiment, transmitted to all the devices existing on the network connected through the single LAN I/F having been selected on S242 is executed. If there are devices among the devices that receive the SNMP Get packet, they return the replies, respectively. The devices that cannot reply to the received SNMP packet destroy the received packet.

In this embodiment, the printer 20 is the device that can reply to the received packet. Thus, when the printer 20 received the packet, it returns the reply (SNMP Reply) to the PC 30. If the printer 20 is the unconfigured device, as the value of the "SSID MIB", the initial value "Wireless" is returned, and as a value of the "communication mode MIB", the initial value "ad-hoc mode" is returned.

The PC 30 judges, after execution of S291, whether SNMP Replies are received (S292). If the SNMP Replies are received (S292: YES), the PC 30 judges whether at least one of the SNMP Replies have values of the "SSID MIB" and "communication mode MIB" that coincide with the initial values (S294). If there is an SNMP Reply having the values of the "SSID MIB" and "communication mode MIB" that coincide with the initial values (S294: YES), the PC 30 determines that there is an unconfigured device (S296). If there is no SNMP Reply (S292: NO) or there are SNMP Replies but none of the SNMP Replies has values of the "SSID MIB" and "communication mode MIB" that coincide with the initial values (S294: NO), the PC 30 determines that there is no unconfigured device (S298). The determination is stored in the form of a flag, and is referred to in S208.

When the steps S290-S298 of FIG. 44 are finished, step S206 of FIG. 34 is finished.

According to the fourth embodiment, similarly to the second embodiment, the PC 30 can examine whether the PC 30 can communicate with the printer 20 through each of the LAN I/Fs. The fourth embodiment is, however, different from the second embodiment in the following points.

In the second embodiment, the printer 20 is configured to return the information indicating whether the printer 20 itself is unconfigured (i.e., the unconfigured flag), and the PC 30 recognizes that the printer is unconfigured based on the thus transmitted information. Therefore, if the device cannot return such information, the PC 30 cannot recognize that the device is an unconfigured device. According to the fourth embodiment, the printer 20 is not configured to return the information indicating that the printer 20 is an unconfigured device, but is configured to return the set values of the SSID and communication mode. The PC 30 recognizes that the printer 20 is the unconfigured device based on such information.

Thus, the PC 30 determines whether the device is an unconfigured device based on a plurality of items of the data transmitted from the device. Therefore, in comparison with the second embodiment in which only the value of the "Configured MIB" is checked, the judging procedure is somewhat complicated. However, the items included in the data need not be the dedicated data indicating the unconfigured device, and a plurality of items of data for other purposes can be used to determine whether the device is the unconfigured one.

In the second through fourth embodiments, among the settings of the wireless communication of the printer 20, the initial value of the communication mode is the ad-hoc mode. Therefore, by setting the communication mode of the PC 30 to the ad-hoc mode to comply with the communication mode of the printer 20, the wireless communication therebetween is established. The invention need not limited to such a configuration, and if the communication between devices are enabled, any communication mode can be employed depending on the specification of the devices which functions as nodes.

For example, if the printer 20 is configured to function as the access point 10 and can establish the wireless communication with a wireless terminal in the infrastructure mode, the communication setting of the PC 30 is set to the infrastructure mode to establish the communication between the printer 20 and the PC 30, and then the setting procedure is executed.

In the second through fourth embodiments, the wireless LAN standard IEEE 802.11b/IEEE 802.11g and the LAN standard IEEE 802.3/IEEE 802.3u are indicated. However, it is not necessary to limit the standards of the communication I/F. Any other communication standard, such as Bluetooth, IEEE 802.11a can be used instead of or in addition to the standards exemplified above.

In the third embodiment, in S262, the PC 30 obtains the information of all the LAN I/Fs recognized by the OS, all of which are listed as candidates of the user's selection. However, since the effective LAN I/Fs are stored in S210, information on only the effective LAN I/Fs may be obtained and indicated for the user. In such a case, since the LAN I/Fs determined not to be effective are excluded from the list, in comparison with a case where all the LAN I/Fs are listed, the user can select more appropriate LAN I/F.

In the above described embodiments, the printer is described as the target device. However, the invention need not be limited to such a configuration, and the invention can be applied to any other network devices such as copier, scanner, facsimile device, MFP (multi-function peripheral) having functions of two or more of such devices and file server. The invention is particularly effective for the devices which need initial settings but are not implemented with sufficient user interface.

The present disclosure relates to the subject matters contained in Japanese Patent Applications No. 2003-415456, No. 2003-415457 and No. 2003-415521, all filed on Dec. 12, 2003, which are expressly incorporated herein by reference in their entireties.

What is claimed is:

1. A computer-readable storage medium that stores a computer-executable program for a wireless LAN system which is configured such that connection settings necessary for a first communication terminal to connect with a wireless LAN access device are made in accordance with an instruction from a second communication terminal, wherein the wireless LAN access device is different from the first and second communication terminals, the second communication terminal being capable of performing data communication with the first communication terminal, the program being installed in the second communication terminal, the program comprising:

instructions for determining, by performing data communication with the first communication terminal, whether the first communication terminal is capable of realizing a predetermined process regarding the connection settings by itself;

instructions for sending the instruction for the connection settings to the first communication terminal in accordance with a result of the determination;

instructions for requesting, when the first communication terminal is determined to have the acquiring function, parameter groups obtained by the first communication terminal from the wireless LAN access device;

instructions for allowing a user to select one parameter group of one or more parameter groups transmitted from the first communication terminal to the second communication terminal in response to the request; and instructions for changing the connection settings of the first communication terminal to values represented by the one parameter group selected at the second communication terminal by the user;

wherein the instructions for determining include;

instructions for judging whether the first communication terminal has an acquiring function, between the first communication terminal and the wireless LAN access devices, that obtains setting items for the connection settings from wireless LAN access devices located around the first communication terminal.

2. The computer-readable storage medium according to claim 1, the program further comprising:

instructions for allowing a user to input a parameter group representing the setting items for the connection settings and corresponding to a specific wireless LAN access device when it is determined that the first communication terminal dose not have the acquiring function; and instructions for changing the setting items for the connection settings of the first communication terminal to values represented by the parameter group input by the user.

3. The computer-readable storage medium according to claim 1, wherein, when the second communication terminal has an acquiring function to obtain parameter groups representing setting items for the connection settings from wireless LAN access devices located around the second communication terminal, the program further comprising:

instructions for obtaining the parameter groups so that the second communication terminal obtains the parameter groups with the acquiring function thereof when it is determined that the first communication terminal does not have the acquiring function;

instructions for allowing the user to select one of the parameter groups in accordance with the parameter groups obtained by the second communication terminal; and instructions for changing the setting items for the connection settings of the first communication terminal to values represented by the parameter group selected by the user.

4. The computer-readable storage medium according to claim 1, the program further comprising:

instructions for requesting a third communication terminal which is capable of performing data communication with the second communication terminal and has the acquiring function to obtain parameter groups when it is determined that the first communication terminal dose not have the acquiring function;

instructions for requesting the third communication terminal for the parameter groups obtained in response to the request;

instructions for changing the setting items for the connection setting of the first communication terminal to values represented by a parameter group transmitted from the third communication terminal in response to the request; and instructions for making a user to select one of the parameter groups based on the parameter group transmitted from the third communication terminal in response to the request.

5. The computer-readable storage medium according to claim 4, the program further comprising:

instructions for transmitting an inquiry data to devices around the second communication terminal to inquire whether there are communication terminals that have the acquiring function and are capable of performing data communication with the second communication terminal, and instructions for determining a communication terminal transmitting reply data notifying that the terminal has the acquiring function in response to the inquiry data as the third communication terminal, and requests the third communication terminal to obtain the parameter groups.

6. The computer-readable storage medium according to claim 1, the program further comprising:

instructions for inquiring communication terminals which are different from the first and the second communication terminal whether an acquiring function is available and determining the communication terminal which replies in response to the inquiry as the communication terminal having the acquiring function.

7. The computer-readable storage medium according to claim 1, the program further comprising:
instructions for notifying a user of the progress of the connection settings by displaying images one by one with interrupting execution of the connection settings and allowing the user to perform a confirming operation, the connection settings being continued upon the confirming operation of the user, and the user selecting one parameter group among one or more parameter groups on a display of the second communication terminal.

8. A computer-readable storage medium that stores a computer-executable program for a wireless LAN system which is configured such that connection settings necessary for a first communication terminal to connect with a wireless LAN access device are made in accordance with an instruction from a second communication terminal, wherein the wireless LAN device is different from the first and the second terminals, the second communication terminal being capable of performing data communication with the first communication terminal, The program being installed in the first communication terminal, the program comprising:
instructions for obtaining a parameter group with an acquiring function, between the first communication terminal and the wireless LAN access device, to obtain a parameter group indicative of setting items for the connection settings from the wireless LAN access device when it receives the instruction to obtain the parameter group from the second communication terminal;
instructions for transmitting the obtained parameter group to the second communication terminal when the first communication terminal receives a request for the parameter group from the second communication terminal; and
instructions for changing setting items for the connection settings when it receives an instruction from the second terminal to change the setting items for the connection settings.

9. The computer-readable storage medium according to claim 8, the program further comprising:
instructions for transmitting information to the second communication terminal that the parameter group has not been obtained, when the first communication terminal receives a request for the parameter group from the second communication terminal and the parameter group has not been obtained.

10. A computer-readable storage medium that stores a computer-executable program installed at a communication terminal to perform a wireless LAN setting, the program comprising:
instructions for receiving inquiry data from another communication terminal inquiring whether the communication terminal has an acquiring function, between the communication terminal and a wireless LAN access device, that obtains parameter groups representing setting items for connection setting with wireless LAN access devices around the communication terminal from the wireless LAN access device, wherein the wireless LAN access device is different from the communication terminal and the other communication terminal and wherein the parameter groups are obtained from the wireless LAN access device in response to an instruction from the other communication terminal; and
instructions for indicating that the communication terminal has the acquiring function, if the communication terminal has the acquiring function.

11. A computer-readable storage medium that stores a computer-executable program installed at a communication terminal to perform a wireless LAN setting, the program comprising:
instructions for receiving inquiry data from another communication terminal inquiring whether the communication terminal has an acquiring function, between the communication terminal and a wireless LAN access device, that obtains parameter groups representing setting items for connection settings with wireless LAN access devices around the communication terminal from the wireless LAN access devices, wherein the wireless LAN access device is different from the communication terminal and the other communication terminal and wherein the parameter groups are obtained from the wireless LAN access device in response to an instruction from the other communication terminal; and
instructions for indicating that the communication terminal does not have the acquiring function, if the communication terminal does not have the acquiring function.

12. A computer-readable storage medium that stores a computer-executable program for configuring a wireless LAN system such that a computer functions as a communication terminal which makes settings for the wireless LAN having a plurality of wireless communication terminals and a wireless LAN access device relaying data communication among the communication terminals, the program comprising:
instructions for collecting, from the wireless LAN access device, parameter groups necessary to realize the relaying among the communication terminals;
instructions for displaying a list of the collected parameter groups;
instructions for determining whether each communication terminal can communicate through the wireless LAN access device by using the displayed parameter groups each including a predetermined parameter;
instructions for not displaying the parameter groups which do not contain the predetermined parameter;
instructions for requesting another communication terminal, which can perform data communication with the communication terminal, to obtain the parameter groups from the wireless LAN access devices located around the other communication terminal; and
instructions for collecting the parameter groups transmitted from the other communication terminal in response to the request for the parameter groups.

13. The computer-readable storage medium according to claim 12, the program further comprising:
instructions for displaying, from among the collected parameter groups, ones that contain the predetermined parameter representing that the communication terminal corresponding thereto can perform the data communication through the wireless LAN access device.

14. The computer-readable storage medium according to claim 12, the program further comprising:
instructions for allowing a user to input at least a part of the parameter group; and
instructions for checking whether a wireless connection of the communication terminal with the wireless LAN access device in accordance with the parameter group can be realized, wherein the parameter groups to be displayed are determined to realize the wireless connection with the wireless LAN access device.

15. The computer-readable storage medium according to claim 12, the program further comprising:
   instructions for allowing a user to select a desired wireless LAN access device with which wireless communication is to be established in accordance with the displayed parameter groups; and
   instructions for executing a connection setting to establish the wireless connection with the selected wireless LAN access device in accordance with the parameter group corresponding to the selected wireless LAN access device.

16. The computer-readable storage medium according to claim 12, the program further comprising:
   instructions for allowing a user to input at least a part of the parameter group;
   instructions for checking whether a wireless connection of the communication terminal with the wireless LAN access device in accordance with the parameter group can be realized; and
   instructions for realizing the wireless connection with the wireless LAN access device in accordance with the parameter group which is determined to enable the wireless connection with the wireless LAN access device.

17. The computer-readable storage medium according to claim 12, the program further comprising:
   instructions for notifying a user of the progress of procedures by displaying images one by one with interrupting execution of the procedures; and
   instructions for allowing the user to perform a confirming operation, the procedures being continued upon the confirming operation of the user.

18. A computer-readable storage medium that stores a computer-executable program for configuring a wireless LAN system such that a computer functions as a communication terminal which makes settings for the wireless LAN, the wireless LAN system having a plurality of wireless communication terminals and a wireless LAN access device relaying data communication among the communication terminals, wherein the wireless LAN access device is different from the wireless communication terminals, the program comprising:
   instructions for obtaining parameter group from the wireless LAN access device located around the communication terminal in response to an instruction transmitted from another communication terminal which is different from the wireless LAN access device and can perform a data communication with the communication terminal, the parameter group being necessary for realizing a wireless communication between the wireless LAN access device and the other communication terminal; and
   instructions for transmitting the obtained parameter group to the other communication terminal in response to a request for the parameter group transmitted from the other communication terminal.

19. The computer-readable storage medium according to claim 18, the program further comprising:
   instructions for transmitting information indicating that the parameter group has not been obtained to the other communication terminal, when the request for the parameter group is received from the other communication terminal and if the the parameter group has not been obtained.

20. The computer-readable storage medium according to claim 18, the program further comprising:
   instructions for transmitting, when a predetermined parameter group has not been obtained, parameter group as one with which the communication terminal cannot determine whether the wireless communication with the wireless LAN access device can be established, when the request for the parameter group is received from the other communication terminal.

21. A computer-readable storage medium for configuring a wireless LAN system such that a computer functions as a setting device which makes settings of a target device of at least one network device on the wireless LAN, the setting device having a plurality of communication interfaces respectively connectable to different networks, the setting device being capable of communicating with the at least one network device, the setting device being capable of connecting with the at least one network device through one of the plurality of the communication interfaces, the settings of the target network device being done by transmitting setting data from the setting device to the target device, the program being installed in the setting device, the program comprising:
   instructions for examining whether the setting device can communicate with the target device using each of the plurality of communication interfaces;
   instructions for identifying an interface capable of communicating with the target device;
   instructions for transmitting the setting data from the setting device to the target device through the identified interface; and
   instructions for displaying a data input screen and allowing a user to input the setting data using the data input screen;
   wherein the examining instructions include:
      instructions for transmitting a request for reply thereto to determine whether the target device is on a network using the plurality of interfaces; and
      instructions for receiving the reply to the request;
   wherein the identifying instructions include:
      instructions for determining whether a device that transmitted the received reply is the target device based on information contained in the received reply;
   wherein the transmitting instructions include:
      instructions for transmitting the setting data input by the user through the data input screen from the setting device to the target device, and
   wherein the identifying instructions include:
      instructions for identifying the communication interface capable of communication with the target device before the transmitting procedure is executed.

22. The computer-readable storage medium according to claim 21, wherein identifying instructions includes
   instructions for identifying an interface that is used for transmitting the reply request and for receiving the reply to the reply request as the interface capable of communicating with the target device.

23. The computer-readable storage medium according to claim 21, the program further comprising:
   instructions for notifying, when a plurality of interfaces are detected as the interfaces capable of communicating with the target device, that erroneous detection should be avoided by turning off unnecessary interfaces.

24. The computer-readable storage medium according to claim 21, wherein the identifying instructions identify the communication interface capable of communicating with the target device before the setting data inputting procedure is executed.

25. The communication-readable storage medium according to claim 21, the program further comprising:
    instructions for displaying a target device information displaying screen displaying the information regarding the target device to allow the user to confirm the target device information,
    wherein the transmitting instructions include instructions for transmitting the setting data from the setting device to the target device after the target device information displaying procedure is executed, and
    wherein the identifying instructions include instructions for identifying the communication interface capable of communicating with the target device before the target device information displaying procedure is executed.

26. A computer-readable storage medium that stores a computer-executable program for configuring a wireless LAN system such that a second terminal on the wireless LAN executes a connection setting of a first terminal of the wireless LAN, each of the first terminal and the second terminal being connectable with the wireless LAN via a wireless LAN access device, wherein the wireless LAN access device is different from the first and the second terminals, the program comprising:
    instructions for determining whether the first terminal has an acquiring function, between the first terminal and the wireless LAN access device, that obtains setting items for the connection setting from the wireless LAN access device located around the first terminal;
    instructions for effecting a connection setting of the second terminal so that the second terminal communicates with the first terminal via wireless communication, when it is determined that the first terminal does not have the acquiring function;
    instructions for setting a connection setting necessary for the first terminal to connect with the wireless LAN access device of the wireless LAN via data communication between the second terminal and the first terminal; and
    instructions for restoring a connection setting of the second terminal to the setting before effecting the connection setting of the second terminal.

27. A computer-readable storage medium that stores a computer-executable program for configuring a wireless LAN system such that a second terminal sets a connection setting of a first terminal of the wireless LAN, the first terminal being connectable with the wireless LAN via a wireless LAN access device, wherein the wireless LAN access device is different from the first and the second terminals, the program comprising:
    instructions for determining whether the first terminal has an acquiring function, between the first terminal and the wireless LAN access device, that obtains setting items for the connection setting from the wireless LAN access device located around the first terminal;
    instructions for inputting at least part of the connection setting of the first terminal which is necessary for the first terminal to connect with the wireless LAN access device of the wireless LAN, when it is determined that the first terminal does not have the acquiring function;
    instructions for confirming whether there exists the wireless LAN access device to which the first terminal can connect using the connection setting; and
    instructions for setting a connection setting necessary for a first access point to connect with an ad hoc network using the connection setting via data communication between the first terminal and the second terminal if it is not confirmed the existence of the wireless LAN access device to which the first terminal can connect using the connection setting.

* * * * *